United States Patent [19]

Silverstein et al.

[11] 3,793,631

[45] Feb. 19, 1974

[54] DIGITAL COMPUTER APPARATUS OPERATIVE WITH JUMP INSTRUCTIONS

[75] Inventors: Steven L. Silverstein, Pittsburgh; Kenneth E. Daggett, Monroeville, both of Pa.

[73] Assignee: Westinghouse Electric Corporation, Pittsburgh, Pa.

[22] Filed: Sept. 22, 1972

[21] Appl. No.: 291,490

[52] U.S. Cl. .......... 340/172.5
[51] Int. Cl. .......... G06f 9/00
[58] Field of Search .......... 340/172.5

[56] References Cited

UNITED STATES PATENTS

| | | | |
|---|---|---|---|
| 3,551,895 | 12/1970 | Driscoll, Jr. | 340/172.5 |
| 3,559,183 | 1/1971 | Sussenguth | 340/172.5 |
| 3,614,747 | 10/1971 | Ishihara et al. | 340/172.5 |
| 3,553,655 | 1/1971 | Anderson et al. | 340/172.5 |
| 3,570,006 | 3/1971 | Hoff et al. | 340/172.5 |
| 3,573,854 | 4/1971 | Watson et al. | 340/172.5 |
| 3,713,108 | 1/1973 | Edstrom et al. | 340/172.5 |

*Primary Examiner*—Paul J. Henon
*Assistant Examiner*—John P. Vandenburg
*Attorney, Agent, or Firm*—R. G. Brodahl

[57] ABSTRACT

Disclosed is a digital computer system including a programmed microprocessor system of the type used in real time systems, in industrial process control and in small scale data processing. The system can be extended and reduced in processing capabilities and in memory capabilities without any change in the data buses and the control line buses thereof, and without internal changes in the units which are added or removed. In particular, the system may include a basic microprocessor system having a basic macroprocessor, a small number of registers and a read-only memory, or it may be extended by adding, in succession, an extended processor and a read-write memory, a direct memory access unit, additional memories, and a maintenance panel which can monitor or control any system functions which can be monitored or controlled by the basic or extended microprocessors. Any of the units other than the basic system can be removed or added at any time, by plugging and unplugging, to change the size and capabilities of the system to suit particular needs. Microprocessor speed is optimized by allowing for overlap of microprocessor functions, such as overlap between instruction execution and instruction fetch, and between writing the result of the current instruction while decoding the next instruction. Timing in the system is fast pipeline timing without artificial delays. The system provides a diversified set of instructions, and particularly bit manipulation instructions in what is basically a byte oriented machine. A designator register is provided for increasing instruction diversity. The system organization allows the full instruction set of the system to be operable on input/output hardware connected to the system through regular system registers and is thus particularly suitable for industrial process control applications, and for other monitoring and control applications.

8 Claims, 33 Drawing Figures

LEGEND

ELEMENT OF EXTENDED PROCESSOR ONLY

ELEMENT COMMON TO BASIC AND EXTENDED PROCESSORS

DIGITAL COMPUTER APPARATUS OPERATIVE WITH JUMP INSTRUCTIONS

CROSS REFERENCE TO RELATED APPLICATIONS

The present application is related to the following concurrently filed patent applications which are assigned to the same assignee as the present application:

Ser. No. 291,488, which was filed on Sept. 22, 1972 by G. L. Kilgore and L. S. Smith;

Ser. No. 291,516, which was filed on Sept. 22, 1972 by G. L. Kilgore, L. S. Smith and S. L. Silverstein;

Ser. No. 291,473, which was filed on Sept. 22, 1972 by K. E. Daggett;

Ser. No. 291,515 which was filed on Sept. 22, 1972 by S. L. Silverstein and L. S. Smith.

BACKGROUND OF THE INVENTION

The disclosed system relates to the fields of programmed digital computer systems and data processing. More specificially, it relates to processor apparatus of the type used in real time systems, such as in industrial process control, and to other apparatus, such as microprocessors, minicomputers, small scale data processors, communication control processors, and the like.

One common application of systems of the type to which the subject system relates is in industrial process control where data is gathered from sensors, conditioned to proper form (such as to adjust the variable range to within specified values or to convert AC voltage to DC voltage), multiplexed, converted from analog-to-digital values, and then finally inputed to a processor. The processor then operates on the data thus gathered to perform such tasks as limit tests, smoothing, linearizing, combining with other data, and performing arithmetic computations. Programs stored in the processor may evaluate the results and generate at the proper time responses to alert displays, cause printouts, or deliver output control words as the programs define. The output control words, if required to operate output analog devices, may be routed to digital-to-analog converters, and the resulting analog voltage, now in the required form, may be transferred to output devices.

The particular environments in which processors of this type may have to operate and the problems presented to such processors vary greatly. For example, a processor may be used to control a simple process with only a few variables which change slowly or a processor may be used to control a complicated real time system such as a military aircraft where a great number of variables are monitored and controlled, and response time must be fast. This variation in needs and expectations presents a conflict between operating efficiency and per-unit cost of processors. On the one hand, if a processor is built to suit one particular environment, the operating efficiency of that processor is likely to be high but its cost is also likely to be high. On the other hand, if a number of identical processors are built, the per-unit cost of processor would be lower, but the operating efficiency is also likely to be low, at least for a substantial number of the environments in which these processors are utilized. It is desirable therefor to have processors which are flexible in size, complexity and cost, as for example, by being modular, so that the same processors or the same processor components can be combined or used in different manner for different environments to optimize efficiency and per-unit cost. A major aspect of the subject system is, therefore, directed to optimizing flexibility, i.e., to providing a system which is based on several standard components which remain unchanged, but which can be combined in different configurations to accommodate differing requirement for size, processing capability and versatility.

Another desirable goal in systems of the type to which the subject system is directed relates to processing speed. High processing speed is desirable, particularly for real time systems, but is generally associated with higher costs, because the conventional way of achieving high speed is to provide parallel hardware functions. Another aspect of the subject system is therefore directed to optimizing the tradeoffs between high processing speed and low cost by providing for overlapping of operations which do not interfere with each other, and by providing unique sequencing and timing.

Another desirable feature of processors of the type to which the subject system is directed is a maintenance and control panel which can access all or most of the functions accessible to the control section of the processor. However, many process control systems rarely require maintenance and supervision, and it is difficult to justify the cost of sophisticated maintenance and control panels for such systems. Another aspect of the subject system, therefore, relates to providing a processor with a sophisticated maintenance and control panel which, however, is not essential to every day operation of the processor and can be removed or added at will.

Still another desirable goal in processors of the type to which the subject system is directed is the ability to vary the size of the memory section and the mix of memory types as particular needs may require. It is desirable that this be done without the need to modify the control or any other section of the system. Another aspect of the subject system therefore relates to providing a system in which the size of the memory section and the mix of the memory types in the memory section may be varied without any modification in the control section of the system.

Prior art processors of the type disclosed herein are discussed in a book by Eadie, D. entitled Modern Data Processors and Systems and published by Prentice-Hall Inc. in 1971. Particular attention is directed to chapter 8 of the book which discusses real time systems. Another book of interest is by Husson, S.S. and is entitled Microprogramming Principles and Practices and published by Prentice-Hall in 1970.

SUMMARY OF THE INVENTION

A basic feature of the disclosed system is that it optimizes trade-offs between operating efficiency and low per-unit cost in processors suitable to a wide variety of applications, such as a wide variety of industrial process control applications.

To this end, a specific embodiment of the disclosed system comprises a high speed basic microprocessor system providing a diversified set of instructions and having a read only memory (ROM) and directly addressable registers whose number can vary, as specific needs may require, from a few to many registers, without the need for any modifications in the remaining parts of the basic microprocessor system. The registers can be used either by the microprocessor, for data processing functions, or by external devices, for communicating with the microprocessor. If additional processing capabilities are desired, such as if it is desired to use a read-write memory, or to modify stored programs conveniently, or to use longer programs, such additional processing capabilities can be provided by an extended microprocessor which plugs in as an extra panel, and by a plug-in read/write memory and memory interface units. The added extended microprocessor units do not duplicate any of the capabilities of the basic microprocessor, but only add to these capabilities, by providing capabilities such as access to the read/write memory, interrupt handling and the like. The extended microprocessor units can be removed at any time (by unplugging) to return the system to the basic microprocessor capabilities, and can be reinserted, as changing demands of a particular use may require. Thus, the subject microprocessor system can grow from a basic microprocessor system with only a few system registers through which input/output functions can be carried out, to a larger basic microprocessor system with a greater number of registers and hence a greater capability for input/output control or processing, and to an extended microprocessor system with relatively sophisticated data handling and interrupt handling.

The same concept of high level of flexibility is carried through in the utilization of a maintenance and control panel which can be used with any configuration or size of the basic or the extended microprocessor systems. A removable plug-in maintenance panel can be added to monitor any portion of the system without at all degrading system performance. It can also be used to lock out the microprocessor and to take over the control of system functions. When the maintenance panel is added, all that is accessible to the basic and extended microprocessors is accessible to the maintenance panel as well, so as to provide a uniquely full range of monitoring and control capabilities. A specific novel aspect of the maintenance panel is that it provides an address stop function to stop the sequential reading of instructions from the memory section of the system when the address of the current instruction reaches or exceeds a predetermined address.

Another aspect of the disclosed system relates to allowing a mix of memories which may vary between different system configurations without any modifications of the microprocessor parts of these systems. This is particularly desirable in the general context of providing optimal flexibility such that a system embodying the invention can be easily changed in size and capabilities to suit differing needs.

Another aspect of the disclosed system relates to optimizing processing speed at given system cost. In particular, a system embodying the invention provides for time overlap of system functions which are not mutually dependent. Thus: (1) the next instruction is fetched from memory while the current instruction is being executed; (2) the result of a current instruction is being written into the destination register while the next instruction is being decoded; and (3) the system operates basically in pipeline timing, with signals progressing from element to element with only inherent element delays and without additional, artificially created delays.

Another aspect of the disclosed system which relates to optimizing speed is the so-called jump-continue capability. This relates to the branch and LPC instructions in which a branch is taken to non-sequential next instruction if a specified event occurs, no branch is taken (i.e., the following adjacent instruction is executed) if the specified event does not occur or an LPC occurs unconditionally. In the disclosed system, the next sequential instruction is fetched from memory during the execution of the branch and LPC instructions so that there is time saving overlap of current instruction execution and next instruction fetch as discussed in the preceding paragraph, and there is no waste of a cycle while waiting to find out if a jump should be taken or not. If a jump is to be taken (i.e., if the specified condition does occur or the instruction is LPC), then the already initiated fetching of the next sequential instruction is aborted, and the instruction to which the jump is to be taken is fetched instead.

Another aspect of the disclosed system relates to providing bit manipulation capabilities in a basically byte oriented machine, and providing such capabilities in an efficient manner insuring optimal speed of bit manipulation operations.

Still another aspect of the disclosed system relates to the provision and utilization of a designator bit (condition code) register whose contents may be changed either as the contents of a regular addressable register, or by means of special signals changing selected designator bits.

Another aspect of the system relates to system organization which allows the full instruction set of the system to be operable on input-output hardware connected to the system through the regular registers.

DETAILED DESCRIPTION

In order to optimize flexibility and suitability to a variety of environments, a specific embodiment of the subject microprocessor system may be structured modularly not only in terms of storage capability but also in terms of control and processing capabilities. Thus, such system can be used as a small, high speed, read-only memory, programmable microprocessor system intended, for example, to replace relay logic, for industrial process control applications, to control peripherals, or as a communications controller. This small system may comprise only three basic units: a basic microprocessor including an arithmetic and logic unit ALU; a read-only memory ROM; and a small set of addressable registers. The allowable operations of such small system may comprise data tests, and transfers between the addressable registers of data on which modifications can be done in the ALU. The ROM can store instructions which are fetched while a previously decoded instruction is executed, and the decoding of an instruction can proceed while the result of the previous instruction is being written into the registers.

For handling problems requiring greater control and processing capability, an extended microprocessor and a random access read-write memory such as a core memory may be plugged into the system to provide for greater processing capability and for storage of data as well as of instructions. An optional maintenance panel may be plugged into the system for testing and for manual control of the system. The system capability may be extended further by adding greater memory capacity. A direct memory access section may be plugged in to provide direct, high rate data transfer between external devices and the system memory. When needs change, the processor capabilities may be reduced by removing added sections. It is important to note that added sections do not duplicate and do not degrade existing capabilities of the system, and do not require internal modifications in existing system sections. The bus structure of the system remains unchanged. The only physical changes are plugging in and unplugging additional units.

Figure 1:
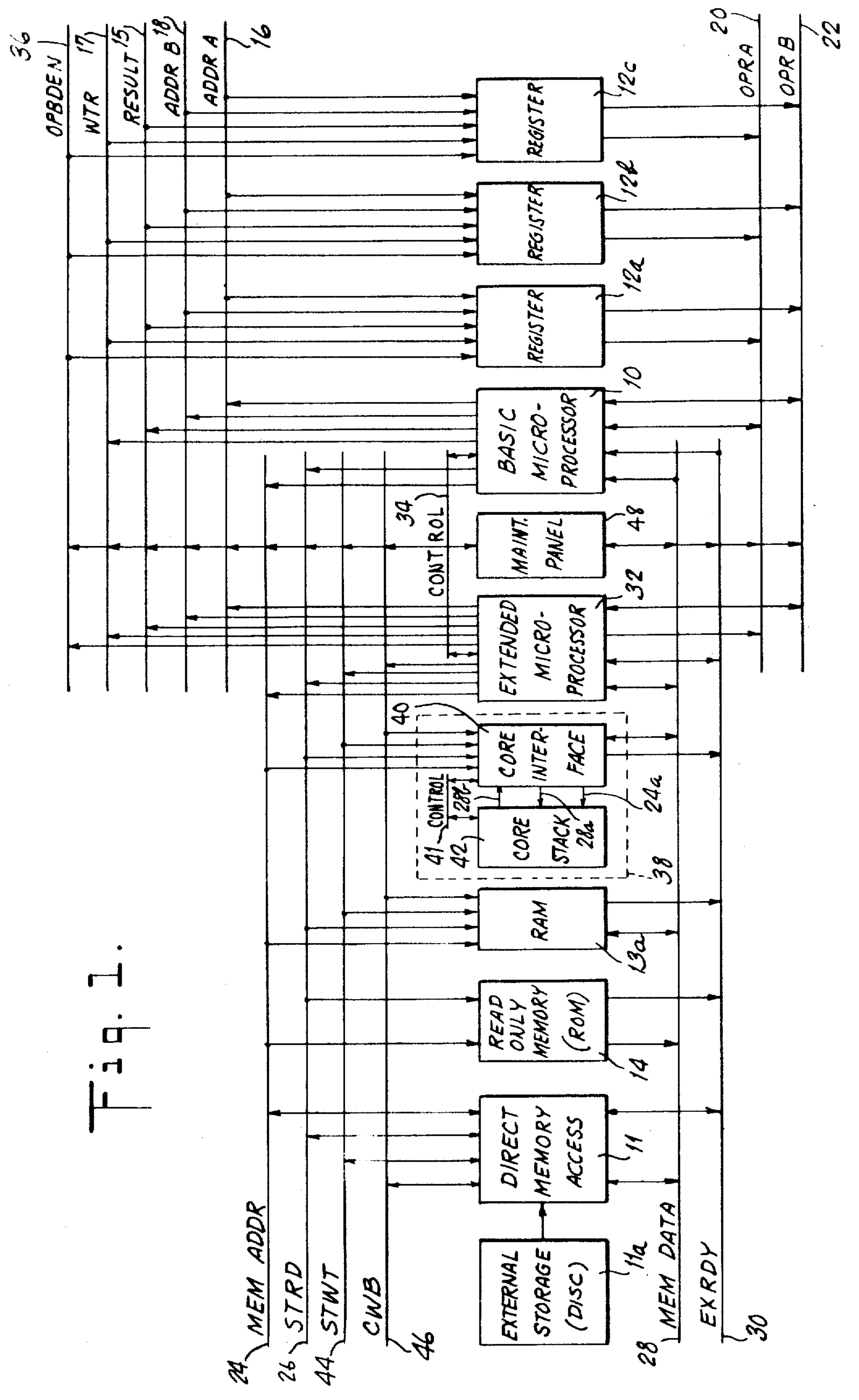
FIG. 1 is a block diagram showing the architecture of the disclosed microprocessor system.

Referring to FIG. 1 which shows the general architecture of the disclosed system, the basic system comprises a basic mircoprocessor 10, registers 12 (12*a*, 12*b*, 12*c* . . . ) and a read-only memory 14. Each of the registers 12 is addressable by the basic microprocessor 10 over an address-A bus 16 and an address-B bus 18 respectively, where A and B refer to the A and B fields of an instruction. Information is transferred from the registers 12 to the basic microprocessor 10 over an operand-A bus 20 and an operand-B bus 22. Additionally, the basic microprocessor 10 communicates with each of the registers 12 over a result bus 15 for transferring thereto the results of an arithmetic operation, and over a control line 17 for transmitting a control signal WTR to cause the loading of an addressed register 12. The read-only memory 14 is addressed by the basic processor 10 over a memory address bus 24 and a control line 26 which provides a control signal STRD to initiate readout from the ROM 14, and memory data is transferred from the read-only memory 14 to the basic microprocessor 10 over a memory data bus 28, while a control signal EXRDY, indicating that the contents of a specified address location in the read-only memory 14 are available in the bus 28, is provided over a control line 30.

For the purpose of extending the processing and storage capabilities of the system, an extended microprocessor 32 may be added. The extended micriprocessor 32 is a plug-in unit and connects with the basic processor controller 10 by means of control lines 34. It also communicates with the same result bus 15, address-B bus 16, address-A bus 18, operand-A bus 20 and operand-B bus 22 and in the same manner as the basic microprocessor 10. The extended microprocessor 32 also connects with the same memory address bus 24, memory data bus 28 and control lines 26 and 30 and in the same manner as the basic microprocessor 10. Additionally, the extended microprocessor 32 connects with the registers 12 over a control line 36 carrying a control signal OPBDEN (the basic microprocessor 10 does not have this connection).

When the system includes the extended microprocessor 32, a read-write memory 38 is also added. The memory 38 comprises a core memory interface 40 and a core stack 42. The purpose of the core memory interface 40 is to provide an interface between the extended microprocessor 32 and the core stack 42, and to provide a limited amount of read-only memory. The extended microprocessor 32 communicates with the memory 38 over the same memory address bus 24, memory data bus 28 and control lines 26 and 30 which are used for communication with the read-only memory 14 both by the extended microprocessor 32 and by the basic microprocessor 10. In addition to the basic microprocessor 10, the extended microprocessor 32 communicates with the read-write memory 38 over a control line 44 for a STWT control signal, and over a control line 46 for a CWB control signal. The extended microprocessor 32 communicates with the core memory interface 40 over the control lines 24, 26, 44 and 46. The core memory interface 40 and the core stacks 42 are interconnected by means of control lines 41, an address bus 24*a*, a data-in bus 28*a* and a data-out bus 28*b*.

An optional maintenance panel 48 may be plugged into the system. The maintenance panel 48 connects to all buses and control lines to which the basic and extended microprocessors 10 and 32 connect.

If additional memory capacity is required, an additional random access memory RAM 13 may be plugged in and interconnected with the buses 24 and 28 and with the control lines 26, 30, 44 and 46 in the same manner as the read-write memory 38.

A direct memory access unit 11 may be interconnected with the memory address bus 24 and the memory data bus 28, and with the control lines 26, 30 44 and 46 to provide the capability of high rate data transfer from an external storage device 11*a*, such as disk storage, into the memory 38 or into the memory 13.

Figure 2:
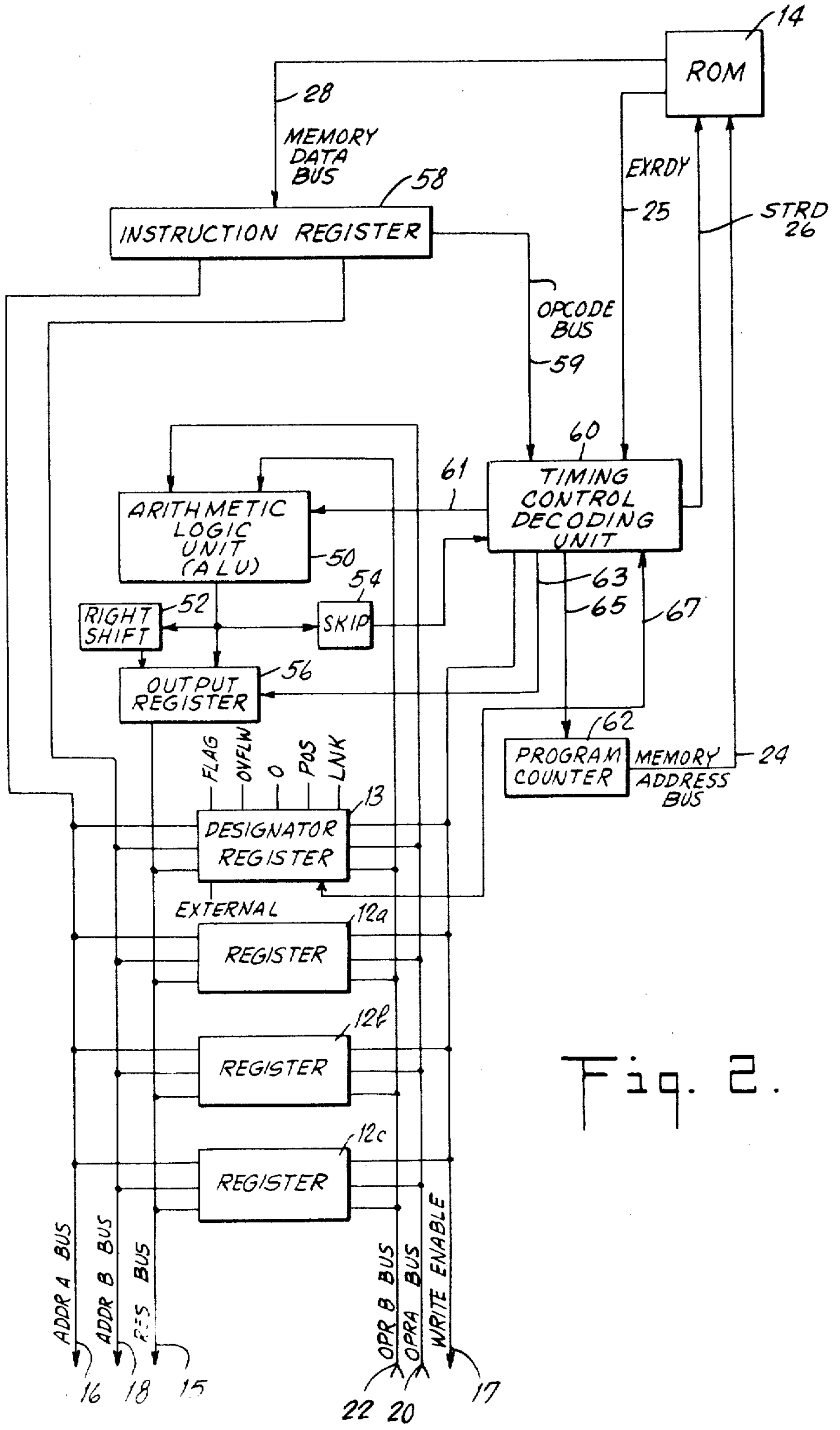
FIG. 2 is a block diagram of a basic microprocessor system forming a part of the system shown in FIG. 1.

A more detailed block diagram of the basic microprocessor 10 (when cooperating with the registers 12 and the ROM 14) is shown in FIG. 2. Referring to FIG. 2, the basic microprocessor 10 comprises an arithmetic and logic unit ALU 50, a right shift logic unit 52, a skip logic unit 54, an output register 56, an instruction register 58, a timing, control and decoding logic unit 60, and a program counter 62. In one specific embodiment of the basic processor, operations consist of data tests and transfers between 32 addressable 8-bit registers of data which may be operated on in the ALU 50. Sixteen bit instructions are stored in the read-only memory 14 and are fetched in parallel with the execution of a previously decoded instruction. Five of the 32 registers 12 are internal and up to 27 other registers 12 may be connected to the buses 15, 16, 18, 20 and 22 and the control line 17. One of the internal registers is used as a designator register 13 to store designator bits (condition codes). As seen by the basic processor controller 10, the external registers 12 look identical to the five internal registers. Interfacing with external devices is by incorporating the proper circuitry at the back end of one or more selected external registers 12. Thus, a user of the basic system illustrated in FIG. 2 need acquire only those particular registers 12 necessary for immediate use, without being concerned that the future mix of input/output capabilities may be limited.

Referring to FIG. 2, the read only memory 14 is addressed as specified by a 16-bit address contained in the program counter 62 and supplied to the read-only memory 14 over the 16-bit memory address bus 24. It is noted that for the basic microprocessor system, the read-only memory 14 contains only instructions. The instruction specified by the current address in the program counter 62 is read out of the read only memory 14 in conjunction with a control signal STRD which is issued by the timing, control and decoding unit 60 and is transferred to the read-only memory 14 over the control line 26. The 16-bit instruction read out of the read-only memory 14 is transferred to a 16-bit instruction register 58 over the memory data bus 28.

In one exemplary case, an instruction comprises a 6-bit operation code, a 5-bit operand-A field and a 5-bit operand-B field. The 6-bit operation code stored in the instruction register 58 is transferred to the timing, control and decoding unit 60 over the operand code bus 59, the operand A-field appears on the operand A address bus 16, and the operand B-field appears on the operand B address bus 18. The 5-bit address supplied over the address A and address B buses 16 and 18 respectively identify uniquely two of the registers 12, and the contents of these registers are read out on the operand A bus 20 and the operand B bus 22 respectively. The registers 12 are 8-bit parallel operation registers, and the two 8-bit bytes read from the two registers addressed by means of the 5-bit fields on the address A and the address B buses 16 and 18 are supplied to the ALU 50 over the operand A and operand B buses 20 and 22. The ALU 50 performs on the two operands supplied thereto over the buses 20 and 22 the operation specified by the 6-bit operation code which is decoded by the unit 60 and converted to a control signal supplied to the ALU 50 over a control line 61. When instructed by a control signal over the control line 63 from the timing, control and decoding unit 60, the result of the operation performed by the ALU 50 is stored in the output register 56, and the output register 56 places the result of the operation carried out by the arithmetic logic unit 50 and the result bus 15, and the result is stored in the 8-bit register 12 identified by the register address on the address B bus 18. With each cycle through the arithmetic logic unit 50, the program counter 62 is incremented such that another instruction is read out of the read-only memory 14.

For the purpose of minimizing the cycle time necessary for the execution of an instruction, several functions are carried out in parallel. In particular, still referring to FIG. 2, and still referring to the exemplary instruction discussed above, a cycle starts when the memory 14 receives a request to read out an instruction and issues an EXRDY control signal to indicate that the contents of the addressed memory location are available on the memory data bus 28. The instruction read out of the ROM 14 is loaded into the instruction register 58. The address A and the address B fields of the instruction are placed on the address A and address B buses 16 and 18 respectively, and decoding of the operation code of the instruction is started in the timing, control and decoding unit 60. The addresses on the address A and address B buses 16 and 18 drive two of the registers 12, and the content of the registers 12 are placed on the operand A and operand B buses 20 and 22. At this time the program counter 62 is incremented to start fetching the next instruction from the read-only memory 14. By this time the arithmetic logic unit 50 has received from the timing, control and decoding unit 60 the decoded operation code of the instruction in the instruction register 58, and performs the indicated operation on the contents of the registers 12 placed on the operand A and operand B buses 20 and 22. The result of the operation performed by the arithmetic unit 50 is temporarily stored in the output register 56, and then the result stored in the output register 56 is transferred into the register 12 specified by the address on the address B bus 16. Since the result in the output register 56 is not needed at the beginning of the next cycle, the next cycle may be started safely after the contents of the two selected registers 12 are placed on the operand A and operand B buses 20 and 22, and the result thereof is in register 56.

In qualitative terms, the sequence of the major operations within a cycle of the basic microprocessor system shown in FIG. 2 is as follows: before a cycle starts, a STRD control signal appears on the control line 26. If the microprocessor has been reset, the memory address in the program counter 62 is 0000. Thus, the STRD control signal on the control line 26 calls the first instruction from the ROM 14, and the ROM 14 generates an EXRDY control signal and places it on the control line 25.

If an instruction is being executed, the STRD signal is issued during the execution of that instruction, and calls the next sequential instruction from the ROM 14, and the ROM 14 issues the EXRDY signal.

This EXRDY control signal starts a cycle of the basic microprocessor shown in FIG. 2. The cycle consists of instruction execution, a parallel instruction fetch and an overlapping write into register. In particular, when the EXRDY control signal is generated by the ROM 14, this means that the contents of the memory location identified by the contents of the program counter 62 have been placed on the memory data bus 28 and can be loaded into the instruction register 58. Thus, the first instruction which is present on the memory data bus 28 is read into the instruction register 58. Next, the operation code of this first instruction is transmitted to the timing, control and decoding unit 60 over the operation code bus 58, and the A and B fields of the instruction are placed on the address A and address B buses 16 and 18. This starts the execution of this first instruction. Next, the program counter 62 is incremented in conjunction with a control signal over the line 65 from the timing, control and decoding unit 60, and the timing, control and decoding unit 60 issues a second STRD control signal over the control line 26 to the ROM 14 to initiate the reading of the next instruction, e.g., the second instruction, from the ROM 14. It is noted that at this time the first instruction is still being executed. After the inherent time delay of read-only memory 14, it issues the EXRDY signal over the control line 25 to indicate that the second instruction is on the memory data bus 28. Meanwhile the execution of the first instruction is progressing, and the result of the operation specified by the first instruction is output from the ALU 50 and is on the result bus 15. While the result of the first instruction is being loaded into a specified register 12, the second instruction is loaded into the instruction register 58. After the result of the first instruction is loaded into the selected register 12, the cycle of the first instruction is completed. It is noted that at this time the cycle of the second instruction has progressed to the point of the second instruction being in the instruction register 58. Thus, there is an overlap between the execution of one instruction and the fetching of the next instruction from the ROM 14. Additionally, there is an overlap between loading a register 12 with the result of one instruction and loading the next instruction into the instruction register 58 and decoding it in the unit 60.

The intracycle timing is essentially pipeline timing depending on gate propagation delays. There are only five major timing marks per cycle of the basic microprocessor shown in FIG. 2. The specific overlap of control signals and the specifics of the timing are discussed below in this specification, in connection with FIGS. 27*a*–27*g*.

Figure 3:
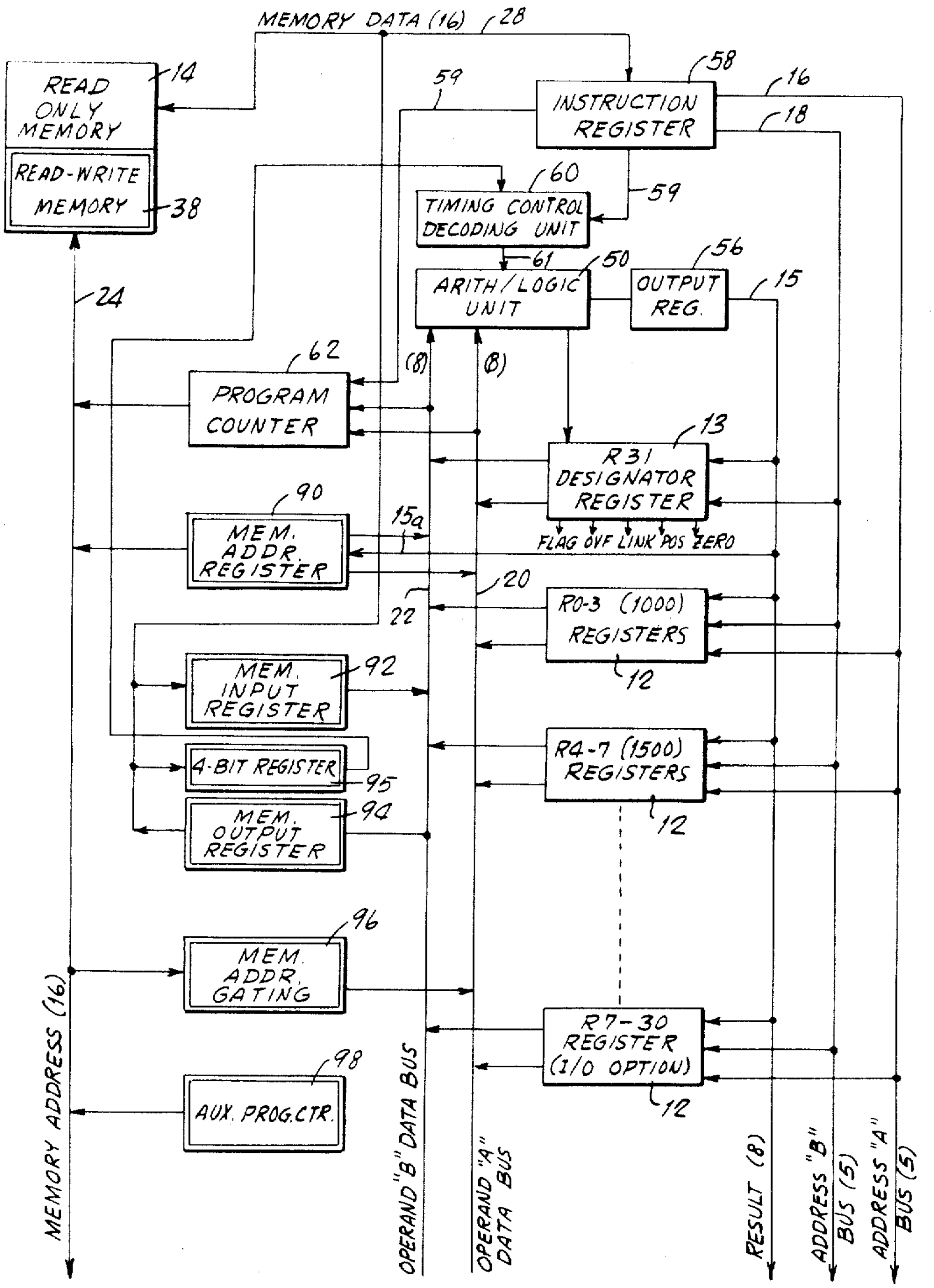
FIG. 3 is a block diagram of an extended microprocessor system forming a part of the system shown in FIG. 1.

In order to extend the processing capabilities of the basic microprocessor system shown in FIG. 2, the disclosed system provides a plug-in extended microprocessor 32 (FIG. 1) which allows the processor system to utilize the read-write memory 38, adds additional instructions, and adds an interrupt capability. The extended system resulting from the addition of the extended microprocessor 32 and the addition of the read-write memory 38 is shown in block diagram form in FIG. 3. In addition to the basic microprocessor system unit shown in FIG. 2, the extended system shown in FIG. 3 includes the read-write memory 38, memory access registers for utilizing the read-write memory 38 and for performing operations which are not possible with the basic system, and a timing, control and decoding unit 60 which has additional capabilities. In FIG. 3, the units which are in addition to the units utilized by the basic microprocessor system of FIG. 2 are shown in double border blocks.

In particular, the extended microprocessor system shown in FIG. 3 includes, in addition to the functional units shown in FIG. 2, a memory address register 90, a memory input register 92, a memory output register 94, a 4-bit register 95, a memory address gating unit 96, an auxiliary program counter 98, and the read-write memory 38. The memory address register 90 stores a 16-bit address which may be transmitted to the read-write memory 38 over the memory address bus 24 to specify the 16-bit location in the memory 38 to which a word supplied thereto over the memory data bus 28 is to be written in or from which a 16-bit word is to be read out on the memory data bus 28. The memory input register 92 is a 16-bit register which receives, over the memory data bus 28, a word read out of the memory 38 or out of the read only memory 14. The memory output register 94 is a 16-bit parallel register which can store a 16-bit word which can be transferred over the memory data bus 28 into the read-write memory 38 to be stored therein. The 4-bit register 95 receives bits 11–14 of the instruction in the instruction register 58 and supplies these bits for decoding to the timing, control and decoding unit 60. The memory address gating 96 is used to gate selectively the contents of the memory address bus 25 to the operand A and operand B buses 20 and 22. The auxiliary program counter 98 is a 4-bit counter which is used in handling interrupts.

The extended microprocessor system shown in FIG. 3 can perform all operations which the basic microprocessor system of FIG. 2 can perform. In addition to the basic microprocessor system of FIG. 2, the extended microprocessor system of FIG. 3 can perform so-called memory reference instructions which include several types of jump instructions and several types of loading and storing instructions which involve loading a byte or a word from the memory 38 into a selected register 12 or storing the contents of selected registers 12 into a selected location in the memory 38. When the system of FIG. 3 is executing an instruction which only the extended processor 32 can handle, the basic processor 10 interprets that instruction as a no-operation instruction, still places the contents of the register 12 addressed by the A and B fields of the instruction on the buses 20 and 22, but does not write any result thereof in a register 12.

The function of the extended microprocessor units shown in FIG. 3 may be illustrated qualitatively by describing an instruction which is possible only with the extended microprocessor system. This exemplary instruction is: JUMP TO SUBROUTINE. The instruction is a 16-bit instruction where bits 0–4 are an operand B-field, bits 5–9 are an operand A-field, bits 10 and 11 are a mode field and bits 12–15 are an operation code. The function of this instruction is to (1) load the program counter 62 with a 16-bit memory address determined by the double register specified by the operand A-field of the instruction and by the address mode field of the instruction, and (2) store the address of the next sequential instruction in the double register specified by the operand B-field of the instruction. For simplicity, it is assumed that the mode field identifies a so-called register direct instruction in which the operand address is contained in the double register specified by the operand A-field of the instruction.

In carrying out the JUMP TO SUBROUTINE instruction, the instruction is read out of the ROM 14 (or out of the memory 38) and is transferred via the memory data bus 28 to both the instruction register 58 and to the memory input register 92 where it is stored. The operation code field of the instruction is transferred to the 4-bit register 95 (only bits 11–14) and to the timing, control and decoding unit 60 where it is decoded. Since the current contents of the program counter 62 are to be saved, the first operation is to transfer these contents to the double register 12 specified by the B-field of the instruction in the instruction register 58. A double register consists of two adjacent registers 12 where the odd register of the pair forms the most significant half of the 16-bit register while the even register forms the least significant half. For example, if the registers 12 in FIG. 3 are sequentially numbered from 0 to 31, double register 5 consists of registers 5 and 4 taken as a pair. In the course of transferring the contents of the program counter 62 to the double register 12 specified by the B-field of the instruction in the instruction register 58, the lower end upper half of the contents of the program counter 62 are transferred through the memory address bus 24 and the memory address gating 96 onto the operand A bus 20 as two sequential 8-bit bytes. Each of the two bytes transferred sequentially to the operand A bus 20 is added in the ALU 50 to the zeroed contents of the operand B bus 22, and the result of the addition to zero is placed on the result bus 15 and is stored in the double register 12 identified by the B-field of the instruction in the instruction register 58. Now the contents of the program counter 62 have been properly stored elsewhere, and it is ready to accept the contents of the double register 12 specified by the A-field of the instruction in the instruction register 58. To this end, the contents of the double register 12 specified by the A-field of the instruction are placed on the operand A and the operand B buses 20 and 22, and are transferred directly therefrom to the lower and upper half of the program counter 62. The program counter 62 now contains the memory address of the instruction to which a jump is to be taken, while the double register 12 specified by the B-field of the instruction in the instruction register 58 contains the address in memory which is next to the address of the instruction from which a jump was taken. It is noted that an instruction of the extended microprocessor system shown in FIG. 3 may include one or more cycles of the basic microprocessor system shown in FIG. 2.

Five classes of instructions are available with the basic microprocessor system shown in FIG. 2. These classes are illustrated in FIG. 4 and are identified by the labels "dual operand," "literal," "single operand," "bit manipulation," and "short jump." A sixth class is possible only with the extended microprocessor system shown in FIG. 3; it is the instruction class which is labelled "memory reference" in FIG. 4.

It is noted that all instructions which the basic processor system can perform can also be performed by the extended processor system. Thus, when the disclosed system consists only of the basic processor system, all instructions come from the read-only memory 14; but when the extended processor system is included, the instructions may come from the ROM 14, or from the read-write memory 38, or from some other source, such as an external storage device.

Figure 4:
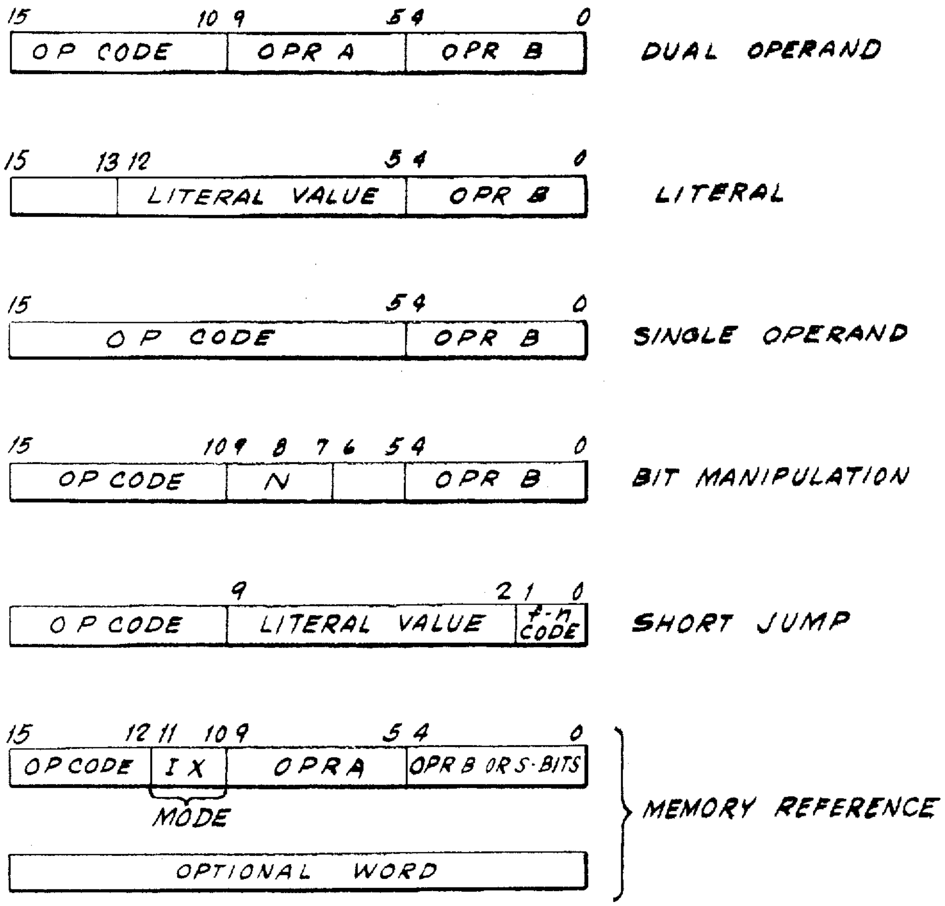
FIG. 4 is an illustration of the classes of instructions carried out in the system shown in FIG. 1.

Referring to FIG. 4, the dual operand instruction is a 16-bit instruction in which bits 0 through 4 are the operand B-field (or B-field) and identify by number a register 12 in which an operand B is stored. If there are a total of up to 32 registers numbered from 0 to 31, the five bits in the B-field of the instruction uniquely identify one of these 32 registers. Bits 5 through 9 of the dual operand instruction are the operand A-field (or A-field) and uniquely identify a register 12 in the same manner as the B-field of the instruction. Bits 10 through 15 of the dual operand instruction are the operation code which identifies the operation to be performed on the contents of the registers identified by the A and B fields of the instruction.

The dual operand class of instructions includes: nine arithmetic instructions comprising four different types of addition, four different types of subtraction and a negation; five logical instructions; two testing instructions; and one branch instruction. Before proceeding with discussing each of the instructions and how it is carried out in the disclosed system, it is appropriate to discuss in greater detail the designator register 13, because its contents may be changed by certain of the dual operand instructions, or its contents may be used in certain of the dual operand instructions.

Referring to FIG. 2, the designator register 13 is an 8-bit register like the registers 12, and is connected with the address A and address B buses 16 and 18, to the operand A and operand B buses 20 and 22, to the result bus 15, and to the write enable control line 17 in the same manner as the registers 12, such that the designator register 13 may be loaded and read out in the same manner as the registers 12. In contrast to the registers 12, however, the designator register 13 communicates over a bus 67 with the timing, control and decoding unit 60 and through there with the arithmetic and logic unit 50 such that selected bits from the designator register 13 can be applied directly to the ALU 50, and selected bits in the designator register 13 can be set depending on outputs of the ALU 50. The designator register 13 has five bits which may be used in the course of executing dual operand instructions. There are: zero, positive, link, overflow and flag. The five designator bits are sometimes referred to as condition codes $C_0$ through $C_4$ respectively.

Referring to FIG. 4, and to the dual operand class of instructions in particular, the arithmetic type dual operand instructions include four addition instructions, four subtract instructions, and a negate instruction. In each of these instructions, the A-field of the instruction designates a source register 12 and the B-field of the instruction designates a destination register 12.

The four addition instructions include an ADD instruction, in which the contents of the source register (the register 12 identified by the A-field of the instruction) are added in a two's complement addition to the contents of the destination register (the 8-bit register 12 specified by the B-field of the instruction), and the result of the addition is placed in the destination register. In the designator bits: the zero bit is set if the result of the addition is zero, otherwise it is cleared; the positive bit is set if the result of the addition is greater than or equal to zero, otherwise it is cleared; the link bit is set if a carry is generated by bit 7 of the adder, otherwise it is cleared; the overflow bit is set if the addition of two numbers of like sign gives a result of the opposite sign, but cannot be cleared by this instruction; and the flag bit is left unchanged. This instruction takes one cycle of the basic microprocessor system.

The other three addition instructions are: ADD, SKIP ON RESULT ZERO; ADD WITH LINK; and ADD WITH LINK, SKIP ON RESULT ZERO. The ADD, SKIP ON RESULT ZERO instruction operates in the same manner as the ADD instruction, except that the next sequential instruction stored in the ROM 14 is skipped if the result of the addition is zero. The designator bits are the same as with the ADD instruction, and the instruction takes one cycle of the basic microprocessor system if there is no skip, but takes two cycles if there is a skip. The ADD WITH LINK instruction operates in the same manner as the ADD instruction except that a carry is introduced into the adder if the link bit of the designator register 13 is in its set state. The designator bits are the same as with the ADD instruction, except that the zero bit cannot be set by this instruction, but is cleared if the result of the addition is not zero. The ADD WITH LINK, SKIP ON RESULT ZERO instruction operates in the same manner as the ADD WITH LINK instruction except that the next sequential instruction in the ROM 14 is skipped if both of the following two conditions occur: the result of the addition is zero, and the zero bit in the designator register 13 is in its set state. The designator bits are the same as with the ADD WITH LINK instruction.

The subtract instructions of the dual operand arithmetic instructions are: SUBTRACT; SUBTRACT, SKIP ON RESULT ZERO; SUBTRACT WITH LINK; and SUBTRACT WITH LINK, SKIP ON RESULT ZERO. The SUBTRACT instruction uses as a source the 8-bit register 12 identified by the A-field of the instruction and uses as a destination the 8-bit register 12 specified by the B-field of the instruction. It performs a two's complement subtraction of the contents of the source register from the contents in the destination register and stores the result of the subtraction in the destination register. The designator registor 13 bits are the same as with the ADD instruction except that the overflow bit is set if the subtraction of two numbers of unlike sign gives a result of opposite sign to the original sign of the destination register, and the overflow bit cannot be cleared by this instruction. This instruction takes one cycle of the basic microprocessor system. The SUBTRACT, SKIP ON RESULT ZERO instruction is the same as the SUBTRACT instruction except that the next sequential instruction in the ROM 14 is skipped if the result of the instruction is zero. The designator bits are the same as with the SUBTRACT instruction. The SUBTRACT WITH LINK instruction is the same as the SUBTRACT instruction, except that a carry is introduced into the adder 50 if the link bit in the designator register 13 is set. The designator bits in the designator register 13 are the same as with the SUBTRACT instruction except that the zero bit can be cleared but cannot be set by this instruction. The SUBTRACT WITH LINK, SKIP ON RESULT ZERO instruction is the same as the SUBTRACT WITH LINK instruction except that the next sequential instruction in the ROM 14 is skipped if both of the following conditions occur: the result of the instruction is zero and the zero bit in the designator register 13 is set. The designator bits in the designator register 13 are the same as with the SUBTRACT instruction, except that the zero bit can be cleared but cannot be set by this instruction.

The last instruction of the dual operand arithmetic instructions is NEGATE. The NEGATE instruction performs the two's complement of the contents in the source register, and places the result into the destination register. The contents of the source register are unchanged. The designator bits in the designator register 13 are the same as with the ADD instruction except that the overflow bit is set if the contents of the source register 12 are the decimal number −128, and cannot be cleared by this instruction.

The logical instructions of the dual operand class of instructions are: LOGICAL AND; EXCLUSIVE OR; INCLUSIVE OR; MOVE TRUE VALUE; and MOVE COMPLEMENT VALUE. All logical instructions use as a source the 8-bit register 12 identified by the A-field of the instruction and use as a destination the 8-bit register 12 identified by the B-field of the instruction. The logical AND instruction ends logically, bit by bit, the contents of the source and the destination register 12 and places the result in the destination register. The contents of the source register are unchanged. The designator bits in the designator register 13 are as follows: the zero bit is set if the result in the destination register is equal to zero and is otherwise cleared; the positive bit is set if the results in the destination register is greater than or equal to zero and is otherwise cleared; and the link, overflow and flag bits are left unchanged. The EXCLUSIVE OR instruction performs the EXCLUSIVE OR logical function of the contents of the source and destination registers, on bit by bit basis, and places the result in the destination register. The contents of the source register are unchanged. The designator bits in the designator register 13 are the same as with the LOGICAL AND instruction. The INCLUSIVE OR instruction performs the same operation as the EXCLUSIVE OR instruction in all respects, except that the bit-by-bit operation on the corresponding order bits on the source and destination registers is the INCLUSIVE OR logical function. The MOVE TRUE VALUE instruction moves the contents of the source register into the destination register and leaves unchanged the source register contents. The designator bits in the designator register 13 are the same as with the LOGICAL AND instruction. The MOVE COMPLEMENT VALUE instruction is the same as the MOVE TRUE VALUE instruction in all respects, except that the data moved into the destination register is the one's complement of the data in the source register.

The test type instructions of the dual operand class of instructions are for the purpose of manipulating the flag designator bit in the designator register 13. The test instructions are: SET FLAG IF EQUAL and RESET FLAG IF EQUAL. Both instructions use as a source the 8-bit register 12 specified by the A-field of the instruction and as a destination register the 8-bit register 12 specified by the B-field. The set flag if equal sets the flag bit in the designator register 13 if the contents of the source and the destination registers are equal. The contents of the two registers are left unchanged, and all other designator bits are left unchanged. The RESET FLAG IF EQUAL instruction resets the flag designator bit in the designator register 13 if the contents of the source and destination registers are equal. It cannot set the flag bit. The contents of the two registers are left unchanged and all other designator bits in the designator register 13 are left unchanged.

The last instruction of the dual operand class of instructions is the LOAD PROGRAM COUNTER instruction. This instruction loads the lower 8 bits of the program counter 62 with the contents of the register specified by the A-field of the instruction, and loads the upper 8 bits of the program counter 62 with the contents of the register specified by the B-field of the instruction. The contents of the two registers are left unchanged. The contents of the program counter 62 must always be an even number (see discussion of the memory 14 below). Hence, the lowest order bit of the register 12 specified by the A-field of the instruction is ignored. The designator bits in the designator register 13 are left unchanged.

Referring to FIG. 4, there is only one instruction of the literal class of instructions, and this is an arithmetic type operation called ADD LITERAL VALUE. This instruction performs a two's complement addition of the data in the destination register identified by the operand B-field of the instruction and the 8-bit literal value contained within the instruction word, and places the result in the destination register. The designator bits in the designator register 13 are the same as with the ADD instruction.

Again referring to FIG. 4, a third class of instructions is the single operand instruction class. The single operand instruction contains in bit positions zero through 4 an operand B-field (which identifies the destination register for this class of instructions) and contains in bit positions 5–15 an operation code. The single operand instructions are used for purposes such as to modify the designator bits in the designator register 13, to modify the contents of the destination register 12, and for shifting the contents of the destination register 12. In particular, the single operand class of instructions includes: four different types of instructions for modifying the designator bits; 12 different instructions for modifying the contents of the destination register, and 16 different shift instructions.

The single operand instructions for modifying the designator bits in the designator register 13 are: DESIGNATE AND SET LINK; DESIGNATE, SET LINK, SKIP ON ZERO; DESIGNATE AND RESET LINK; and DESIGNATE, RESET LINK, SKIP ON ZERO.

The DESIGNATE and SET LINK single operand instruction does the following: (1) the zero bit in the designator register 13 is set if the contents of the destination register 12 are zero, otherwise it is cleared; (2) the positive bit in the designator register 13 is set if the contents of the destination register 13 are greater than or equal to zero, otherwise it is cleared; and (3) the link bit in the designator register 13 is unconditionally set. The contents of the destination register 12 are unchanged and the overflow and flag designator bits in the designator register 13 are unchanged. The instruction takes one cycle of the basic processor system. The DESIGNATE, SET LINK, SKIP ON ZERO instruction operates in the same manner as the immediately preceding instruction, except that the next sequential instruction in the ROM 14 is skipped if the contents of the destination register are zero. The instruction takes one cycle if there is no skip and takes two cycles if there is a skip. The DESIGNATE AND RESET link instruction does the following: sets the zero bit in the designator register 13 if the contents of the destination register 12 are zero, otherwise it clears the zero bit; sets the positive bit in the designator register 13 if the contents of the destination 12 are greater than or equal to zero, otherwise it clears the positive bit; and clears unconditionally the link bit in the designator register 13. The contents of the destination register 12 and the overflow and flag designator bits are left unchanged. The DESIGNATE, RESET LINK, SKIP ON ZERO INSTRUCTION operates in the same manner as the immediately preceding instruction, except that the next sequential instruction in the ROM 14 is skipped if the data in the destination register 12 is zero. While the immediately preceding instruction takes one cycle of the basic microprocessor system, this instruction takes one cycle if there is no skip and two cycles if there is a skip.

The single operand class of instruction include six incrementing operations for incrementing the contents of the destination register either unconditionally or on various condition. These incrementing instructions are: INCREMENT; INCREMENT, SKIP ON RESULT ZERO; INCREMENT NEGATIVE VALUE; INCREMENT NEGATIVE VALUE, SKIP ON ZERO, INCREMENT ON LINK; and INCREMENT ON LINK, SKIP ON ZERO.

In the INCREMENT single operand instruction, one is added to the contents of the destination register and the result is placed back into the destination register. In this instruction, the zero designator bit in the designator register 13 is set if the result of the instruction is zero and is otherwise cleared, the positive designator bit is set if the result is greater than or equal to zero and is otherwise cleared, the link designator bit is set if a carry is generated and is otherwise cleared, the overflow designator bit is set if the result of the instruction overflows and cannot be cleared by this instruction, and the flag designator bit is left unchanged. The INCREMENT, SKIP ON RESULT ZERO single operand instruction operates in the same manner as the INCREMENT instruction except that the next sequential instruction in the ROM 14 is skipped if the result of the operation specified by the instruction is zero. The designator bits are the same as with the INCREMENT instruction. The INCREMENT NEGATIVE VALUE instruction adds one to the contents of the destination register, if, and only if the initial contents of the destination register are negative. This instruction does not affect a positive number. The next sequential instruction in the ROM 14 is then read out whether or not an increment under this instruction occurs. The INCREMENT NEGATIVE VALUE, SKIP ON ZERO instruction operates in the same manner as the INCREMENT NEGATIVE VALUE instruction, except that the next sequential instruction from the ROM 14 is skipped if the result of this instruction is zero. A skip test is made whether or not the increment specified by this instruction occurs, and a subsequent instruction is read out from the ROM 14 whether or not the increment specified by this instruction occurs. The designator bits for this instruction are the same as with the INCREMENT instruction. The INCREMENT ON LINK instruction adds one to the contents of the destination register if and only if the link designator bit is set. The designator bits for this instruction are the same as with the INCREMENT instruction, except that the zero designator bit cannot be set by this instruction and is cleared if the result of this instruction is not zero. The INCREMENT ON LINK, SKIP ON ZERO instruction operates in the same manner as the INCREMENT ON LINK instruction, except that the next sequential instruction in the ROM 14 is skipped if both of the following two conditions occur: (1) the result of this instruction going to the destination register is zero, and (2) the zero designator bit is set. The designator bits for this instruction are the same as for the INCREMENT instruction, except that the zero designator bit can not be set by this instruction, and is cleared if the result of this instruction is not zero, and the overflow designator bit can not be reset by this instruction. The program counter 62 (FIG. 2) is incremented and a skip test is made whether or not the increment specified by this instruction occurs.

There are six types of decrementing single operand instructions: DECREMENT; SKIP ON ZERO; DECREMENT POSITIVE VALUE; DECREMENT POSITIVE VALUE, SKIP ON ZERO; DECREMENT ON NO LINK; and DECREMENT ON NO LINK, SKP ON ZERO.

The DECREMENT instruction subtracts 1 from the contents of the destination register and places the result back into the destination register. The designator bits for this instruction are the same as for the INCREMENT instruction. The DECREMENT, SKIP ON ZERO instruction operates in the same manner as the DECREMENT instruction, except that the next sequential instruction in the ROM 14 is skipped if the result of this instruction is zero. The designator bits are the same as for the DECREMENT instruction. The DECREMENT POSITIVE VALUE instructions subtracts one from the contents of the destination register if and only if the initial contents of the destination register are positive. This instruction does not affect a negative number in the destination register. The instruction results in incrementing the program counter whether or not the decrementing of the contents of the destination register occurs. The designator bit in the designator register 13 are the same as with the DECREMENT instruction. The DECREMENT POSITIVE VALUE, SKIP ON ZERO instruction operates in the same manner as the DECREMENT POSITIVE VALUE instruction, except that the next sequential instruction in the ROM 14 is skipped if the result of this instruction is zero. The program counter 62 is incremented and a skip test is made whether or not the decrement specified by this instruction occurs. The designator bits in the designator register 13 are the same as with the DECREMENT instruction. The DECREMENT ON NO LINK instruction subtracts 1 from the contents of the destination register if and only if the link bit in the designator register 13 is not set. The designator bits for this instruction are the same as for the DECREMENT instruction except that the zero designator bit can not be set by this instruction and is cleared if the result of this instruction is not zero. The DECREMENT ON NO LINK, SKIP ON ZERO single operand instruction operates in the same manner as the DECREMENT ON NO LINK instruction, except that the next sequential instruction in the ROM 14 is skipped if both of the following two conditions occur: (1) the result of the operation is zero, and (2) the zero designator bit is set. The designator bits in the designator register 13 are the same as for the DECREMENT instruction except that the zero bit can be cleared but cannot be set by this instruction. In particular, the zero designator bit is cleared if the result of this instruction is not zero. The program counter 62 is incremented when this instruction is executed, and a skip test is made whether or not the decrement specified by this instruction occurs.

There are eight left shift instructions in the class of single operand instructions. These are LEFT SHIFT CIRCULAR; LEFT SHIFT CIRCULAR, SKIP ON BIT OUT ZERO; LEFT SHIFT, FILL WITH LINK; LEFT SHIFT, FILL WITH LINK, SKIP ON BIT OUT ZERO; LEFT SHIFT, FILL WITH ONE; LEFT SHIFT, FILL WITH ONE, SKIP ON BIT OUT ZERO; LEFT SHIFT, FILL WITH ZERO; and LEFT SHIFT, FILL WITH ZERO, SKIP ON BIT OUT ZERO.

The LEFT SHIFT CIRCULAR single operand instruction performs a 1-bit-position left circular shift of the contents of the destination register such that the least significant bit of the destination register is filled with the bit shifted out of the most significant bit position of the destination register. The bit shifted out is also put in the link designator bit position of the designator register 13. The zero designator bit is set or cleared depending on the result of this instruction, the positive designator bit is set or cleared depending on the result of this instruction, the link designator bit is set or cleared depending on the bit shifted out of the destination register, and the overflow and flag designator bits in the designator register 13 are left unchanged. The LEFT SHIFT CIRCULAR, SKIP ON BIT OUT ZERO instruction operates in the same manner as the LEFT SHIFT CIRCULAR instruction, except that the next sequential instruction in the ROM 14 is skipped if the bit shifted out of the destination register as a result of this instruction is zero. The designator bits in the designator register 13 are the same as with the LEFT SHIFT CIRCULAR instruction. The LEFT SHIFT, FILL WITH LINK instruction shifts the contents of the destination register one bit position to the left, with the least significant bits of the destination register being filled with the link designator bit from the designator register 13. The bit shifted out of the destination register as a result of this instruction replaces the previous link designator bit in the designator register 13. The designator bits in the designator register 13 are the same as with the LEFT SHIFT CIRCULAR instruction, except that the zero designator bit is cleared if the result of this instruction is not zero, but cannot be set by this instruction. The LEFT SHIFT, FILL WITH LINK, SKIP ON BIT OUT ZERO instruction operates in the same manner as with the LEFT SHIFT, FILL WITH TANK instruction except that the next sequential instruction in the ROM 14 is skipped if both of the following two conditions occur: (1) the bit shifted out of the destination register by this instruction is zero, and (2) the zero designator bit in the designator register 13 is set. The designator bits with this instruction are the same as with the LEFT SHIFT CIRCULAR instruction, except that the zero designator bit is cleared if the result of this instruction is not zero but cannot be set by this instruction. The LEFT SHIFT, FILL WITH ONE single operand instruction shifts the contents of the destination register one place to the left. The least significant bit of the destination register is filled with logical 1. The bit shifted out of the destination register is placed in the link designator bit position of the designator register 13. The zero designator bit is unconditionally cleared and the position overflow and flag designator bits are the same as for the LEFT SHIFT CIRCULAR instruction. The LEFT SHIFT, FILL WITH ONE, SKIP ON BIT OUT ZERO single operand instruction operates in the same manner as the LEFT SHIFT, FILL WITH ONE instruction, except that the next sequential instruction in the ROM 14 is skipped if the bit shifted out of the destination register as a result of this instruction is zero. The designator bits for this instruction are the same as the designator bits for the LEFT SHIFT, FILL WITH ONE instruction. The LEFT SHIFT, FILL WITH ZERO instruction shifts the contents of the destination register one place to the left and fills the least significant bit of the destination register with zero. The bit shifted out of the destination register as a result of this instruction is placed in the link designator bit position of the designator register 13. The designator bits for this instruction are the same as the designator bits for the LEFT SHIFT CIRCULAR instruction. The last single operand left shift instruction is LEFT SHIFT, FILL WITH ZERO, SKIP ON BIT OUT ZERO. This instruction operates in the same manner as the LEFT SHIFT FILL WITH ZERO instruction except that the next sequential instruction in the ROM 14 is skipped if the bit shifted out of the destination register as a result of this instruction is a zero. The designator bits in the designator register 13 for this instruction are the same as for the LEFT SHIFT CIRCULAR instruction.

The single operand class of instructions includes eight right shift instructions: RIGHT SHIFT CIRCULAR; RIGHT SHIFT, SKIP ON BIT OUT ZERO; RIGHT SHIFT, FILL WITH LINK; RIGHT SHIFT, FILL WITH LINK, SKIP ON BIT OUT ZERO; RIGHT SHIFT ARITHMETIC; RIGHT SHIFT ARITHMETIC, SKIP ON BIT OUT ZERO; RIGHT SHIFT, FILL WITH ZERO; and RIGHT SHIFT, FILL WITH ZERO, SKIP ON BIT OUT ZERO.

The RIGHT SHIFT CIRCULAR instruction performs a one bit position right circular shift on the contents of the destination register such that the most significant bit is filled with the bit shifted out of the least significant bit position of the destination register. The bit shifted out is also placed in the link designator bit position of the designator register 13. The zero designator bit is set or cleared on the result of this instruction, the positive designator bit is set or cleared on the result of this instruction, the link designator bit is set or cleared on the bit shifted out as a result of this instruction, and the overflow and flag designator bits are left unchanged. The RIGHT SHIFT CIRCULAR, SKIP ON BIT OUT ZERO instruction operates in the same manner as the RIGHT SHIFT CIRCULAR instruction, except that the next sequential instruction in the ROM 14 is skipped if the bit shifted out of the destination register as a result of this instruction is zero. The designator bits for this instruction are the same as for the RIGHT SHIFT CIRCULAR instruction. The RIGHT SHIFT, FILL WITH LINK instruction shifts the contents of the destination register one place to the right, with the most significant bit position of the destination register filled with the link designator bit. The bit shifted out of the destination register as a result of this operation replaces the previous link designator bit in the designator register 13. Otherwise, the designator bits for this instruction are the same as for the RIGHT SHIFT CIRCULAR INSTRUCTION, except that the zero designator bit is cleared if the result of this instruction is not zero, and can not be set by this instruction. The RIGHT SHIFT, FILL WITH LINK, SKIP ON BIT OUT ZERO instruction operates in the same manner as the RIGHT SHIFT, FILL WITH LINK instruction except that the next sequential instruction in the ROM 14 is skipped if both of the following two conditions are satisfied: (1) the bit shifted out of the destination register is zero, and (2) the zero designator bit of the designator register 13 is set. The zero designator bit is cleared if the result of this instruction is not zero and can not be set by this instruction. Otherwise, the designator bits for this instruction are the same as for the RIGHT SHIFT CIRCULAR instruction. The RIGHT SHIFT ARITHMETIC instruction performs a one place arithmetic right shift on the contents of the destination register. Sign extension is provided such that the most significant bit is filled with the original most significant bit. The bit shifted out is placed in the link position in the designator register 13. The designator bits are the same as with the RIGHT SHIFT CIRCULAR instruction. The RIGHT SHIFT ARITHMETIC, SKIP ON BIT OUT ZERO instruction operates in the same manner as the RIGHT SHIFT ARITHMETIC instruction, except that the next sequential instruction is skipped if the bit shifted out is zero.

Referring again to FIG. 4, another class of instructions is the bit manipulation class. The bit manipulation instructions are 16-bit instructions where bits 0–4 are a B-field which identifies a destination register 12, bits 5 and 6 and bits 10–15 are an operation code and bits 7, 8 and 9 are an N-field which identifies that bit of the destination register 12 which is to be modified. The bit manipulation instructions are used to modify selected bits in a selected register 12 or selected bits in the designator register 13 or specifically the flag bit in the designator register 13.

There are three bit manipulation instructions which are used to modify selected bits in a selected register 12 or in the designator register 13. These are: SET BIT N; RESET BIT N; and INVERT BIT N. For these three instructions, the B-field of the instruction always identifies a register which is the destination register. The destination register may be one of the registers 12 or it may be the designator register 13. It is noted that the bit manipulation instructions allow manipulating individual selected bits in what is basically a byte oriented microprocessor system. This is a unique feature of the subject invention, and it is described in greater detail later in this specification.

The SET BIT N instruction sets that bit in the destination register 12 which is identified by the 3-bit N-field of the instruction. The designator bits in the designator register 13 (FIG. 2) are left unchanged unless the destination register specified by this instruction is the designator register 13. The RESET BIT N instruction resets that bit in the destination register which is identified by the 3-bit N-field of the instruction. The designator bits in the designator register 13 are left unchanged by this instruction unless the destination register identified by the operand B-field of the instruction is the designator register 13. The INVERT BIT N instruction inverts that bit of the destination register which is identified by the 3-bit N-field of the instruction. The designator bits in the designator register 13 are left unchanged by this instruction unless the destination register specified thereby is the designator register 13.

Another four bit manipulation instructions relate to selectively modifying the flag designator bit in the designator register 13. These instructions are: SET FLAG IF BIT TRUE, RESET FLAG IS BIT TRUE, SET FLAG IF BIT FALSE, and RESET FLAG IF BIT FALSE. The destination register in these four bit manipulating instructions is always the register 12 identified by the operand B-field of the instruction.

The SET FLAG IF BIT TRUE instruction sets the flag designator bit in the designator register 13 if that bit in the destination register which is identified by the 3-bit N-field on the instruction is a logical 1. The contents of the destinationation register are unchanged and the other designator register 13 bits are also unchanged. The RESET FLAG IF BIT TRUE instruction resets the flag designator bit in the designator register 13 if that bit in the destination register which is specified by the 3-bit N-field of the instruction is a logical 1. The contents of the destination register are unchanged and the other designator register 13 bits are also unchanged. The SET FLAG IF BIT FALSE instruction sets the flag designator bit in the designator register 13 if that bit in the destination register which is specified by the 3-bit N-field of the instruction is a logical 0. The contents of the destination register and the other designator bit in the designator register 13 are left unchanged. The RESET FLAG IF BIT FALSE instruction resets the flag designator bit in the designator register 13 if that bit in the destination register 12 which is specified by the 3-bit N-field on the instruction is a logical 0. The contents of the destination register 12 are unchanged and the other designator bits in the designator register 13 are also unchanged.

Referring to FIG. 4, there is a fifth class of instructions. It includes the short jump instructions which consist of a 2-bit function code in bits 0 and 1, an eight-bit literal field in bits 2–9, and a six-bit operation code bits 10–15. The short jump instructions are used for altering the normal increment-by-one-word sequence of the program counter 62 (FIG. 2).

There are three short jump instructions: BRANCH UNCONDITIONALLY; BRANCH ON FLAG TRUE; and BRANCH ON FLAG FALSE. The BRANCH UNCONDITIONALLY instruction alters the normal sequence of program flow by changing the contents of the program counter 62 in a specified manner. In particular, the number contained in the 8-bit literal field of the BRANCH UNCONDITIONALLY instruction is multiplied by 2 and replaces bits 0 through 8 of the program counter 62. Bits 9 through 15 in the program counter 62 are not disturbed. Since the least significant bit position in the program counter 62 is always a zero (the program counter number is always an even number) it remains a zero after the execution of this instruction. The BRANCH ON FLAG TRUE short jump instruction operates in the same manner as the BRANCH UNCONDITIONALLY instruction except that the bits 0–8 of the program counter 62 are replaced by the contents of the literal field of the instruction if and only if the flag designator bit in the designator register 13 is set. Otherwise the next sequential instruction of the ROM 14 is read out and executed. The BRANCH ON FLAG FALSE instruction operates in the same manner as the BRANCH UNCONDITIONALLY instruction, except that the bits 0–8 of the program counter 62 are replaced if and only if the flag designator bit in the designator register 13 is reset. Otherwise the next sequential instruction in the ROM 14 is read out.

Referring back to FIG. 4, a sixth class of instructions is labelled MEMORY REFERENCE. This class can be carried out only on the extended processor illustrated in FIG. 3. The MEMORY REFERENCE instructions have a B-field in bit positions 0–4, and A-field in bit positions 5–9, a mode field in bit positions 10 and 11, and an operation code in bit positions 12–15. Before proceeding with explaining the function of the memory reference instructions, a brief description should be given of the type of memory organization in the described embodiment of the invention. A more detailed description of the memory appears later in this specification.

The registers 12, as described earlier, are 8-bit positions parallel registers which can be numbered sequentially from 0–31. A "double register" consists of two sequentially numbered registers taken as a pair to form a 16-bit register. The odd register of the pair forms the most significant halt of the 16-bit register while the even register of the pair forms the least significant half of the 16-bit word. A double register is specified by the same number as the odd register in the pair. For example, double register 5 consists of registers 5 and 4 taken as a pair.

An address in memory in the ROM 14 or in the read-write memory 38) is always a 16-bit number, and can be either a byte address or a word address. A byte address is a 16-bit number which specifies one of the memory bytes (for example, one out of 65, 536 possible byte locations in memory). An even byte address occupies the left half of a memory word, while an odd byte address occupies the right half. A word address is a 16-bit number which specifies one of the possible memory word locations. Word addresses are always even numbers, never odd. A word has the same address as the even byte it contains. In one specific embodiment of the extended microprocessor system, the memory has up to 32,768 memory words, or 65,536 memory bytes. Each 16-bit memory word contains two 8-bit memory bytes. The addressing scheme numbers bytes sequentially, rather than words. A memory word then assumes the address of its even numbered byte.

The memory reference instructions shown in FIG. 4 may refer to bytes or to words in the memory. These instructions can treat two bytes as a single 16-bit word only if both bytes are in the same word in the memory. It is not possible for a single instruction to access bytes 1 and 2 for example, but it can access bytes 0 and 1, bytes 2 and 3, etc.

For the memory reference instructions, the 16-bit operand address is indirectly fixed by the instruction A-field and by the addressing mode specified by the mode field of the instruction and by bits 10 and 11 thereof.

There are four addressing modes for MEMORY REFERENCE instructions. The addressing modes are as follows:

1. REGISTER DIRECT (I=0, X=0) In this mode, the operand address is contained in the double register specified by operand A.
2. REGISTER INDIRECT (I=1, X=0) As in the Register Direct mode, operand A specifies a double register. However, rather than containing the operand address itself, the double register contains the address of the operand address. The least significant bit of the indirect address is forced to zero to insure that the address of the address is an even number. The operand address itself may be even or odd.
3. DIRECT INDEXED (I=0, X=1) In this mode, operand A specifies a double register. The 16-bit operand address is formed by adding the contents of the double register to the contents of the second word of the instruction. Note that a direct indexed instruction requires two memory words.

There are two modes which are subsets of the direct indexed mode:

Direct—If the operand A field contains the number $30_{10}$, then the operand address is contained in the second word of the instruction.

P-Relative—If the operand A field contains the number $31_{10}$, the operand address is calculated by adding the contents of the program counter to the contents of the second word of the instruction.

Note that the double register consisting of registers $30_{10}$ and $31_{10}$ can never be specified as operand A since register $31_{10}$ is the condition code register.

4. PRE-INDEXED (I=1, X=1) As in the direct indexed mode, operand A specifies a double register, and a 16-bit number is formed by adding the contents of the double register to the contents of the second word of the instruction. This number is interpreted not as the operand address itself, but as the address of the operand address. The least significant bit of the number is forced to a zero to make it even. The operand address itself may be even or odd.

There are two modes which are subsets of the pre-indexed mode:

Indirect—If the operand A field contains the number $30_{10}$, the second word of the instruction is interpreted as the address of the operand address. The operand address may be even or odd, but the LSB of its address is forced to a zero to make it even.

P-Relative Indirect—If the operand A field contains a $31_{10}$, the address of the operand address is calculated by adding the contents of the program counter to the contents of the second word of the instruction. The operand address may be even or odd, but the LSB of its address is forced to a zero to make it even.

Note from the above that any time indirect addressing is invoked, the indirect address is forced to be even by clearing its least significant bit (LSB). This is because all memory words have even addresses, and odd memory words do not exist.

The MEMORY REFERENCE instructions include four different JUMP instructions, two LOAD instructions, two STORE instructions, and a NO OPERATION instruction.

The four JUMP instructions are: the JUMP TO SUBROUTINE instruction described above; JUMP UNCONDITIONALLY; JUMP ON TRUE; and JUMP ON FALSE. The JUMP UNCONDITIONALLY instruction unconditionally loads the program counter 62 with a 16-bit address determined by the double register 12 specified by the A-field of the instruction and by the 2-bit mode field of the instruction. Bit 0 of the effective address is ignored, since the program counter 62 must always be even. Bits 1 through 15 of the effective address replace bits 1 through 15 of the program counter 62. The designator bits in the designator register 13 are left unchanged. The JUMP ON TRUE INSTRUCTION conditionally loads the program counter 62 with a 16-bit memory address determined by the double register 12 specified by the A-field of the instruction and the address mode in the mode field in the instruction. The JUMP from the instruction is taken if and only if the following Boolean expression is logically true $$C_0S_0 + C_0C_1S_1 + C_2S_2 + C_3S_3$$

where $C_i$ is the $i$-th bit of the designator register 13 and $S_i$ is the $i$-th bit of the instruction word. This instruction allows testing of the designator bits. The contents of the designator register 13 are left unchanged.

The JUMP ON FALSE instruction conditionally loads the program counter 62 with a 16-bit memory address determined by the double register 12 specified by the A-field of the instruction and the address mode in the mode field of the instruction. The JUMP is taken if and only if the Boolean expression given immediately above is logically false. This instruction also allows testing of the designator bits in the designator register 13.

The two load instructions of the memory reference class of instructions are: LOAD BYTE; and LOAD WORD. The LOAD BYTE instruction uses as a source the memory byte whose 16-bit address is determined by the double register 12 specified by the A-field of the instruction and the address mode in the mode field of the instruction. The destination in this instruction is the 8-bit register 12 specified by the B-field of the instruction. The LOAD BYTE instruction loads the destination register with the contents of a byte of memory. The byte address may be even or odd. The designator bits in the designator register 13 are left unchanged. The LOAD WORD instruction uses as source the memory word whose 16-bit address is determined by the double register 12 specified by the A-field of the instruction, and by the address mode in the mode field of the instruction and uses destination in the double register 12 specified by the B-field of the instruction. The instruction loads the 16-bit double register specified by the B-field of the instruction with the contents of a 16-bit memory word. The memory word address must be even, so bit 0 of the source is ignored. The designator bits are unchanged.

The STORE instructions are: STORE BYTE; and STORE WORD. The STORE BYTE instruction uses a source the 8-bit register 12 specified by the B-field of the instruction and uses as destination the MEMORY BYTE whose 16-bit address is determined by the double register 12 specified by the A-field of the instruction, and by the address mode in the mode field of the instruction. The instruction stores the contents of the source register 12 into a byte of memory. The source register contents are not disturbed. The byte address may be even or odd; the designator bits are left unchanged. The STORE WORD instruction uses as source the 16-bit double register 12 specified by the B-field of the instruction and uses as destination the memory word whose 16-bit address is determined by the double register 12 specified by the A-field of the instruction and by the address mode in the mode field of the instruction. The instruction stores the contents of the 16-bit double register specified by the B-field into a MEMORY WORD. The source register contents are not disturbed. The memory address must be even so bit 0 of the MEMORY WORD ADDRESS is ignored. The designator bits are left unchanged. The final memory reference instruction is the NO OPERATION INSTRUCTION. This instruction contains 16 ones, and causes no operation to be performed. Its execution changes no memory words, registers, or designator bits.

A brief description of the flow of control information and data in the basic microprocessor system was given in conjunction with the description of FIG. 2 above. Now, a more detailed description of the flow of control in the basic microprocessor system is given in conjunction with FIG. 5 and FIG. 6. A still more detailed description of the timing of the control signals discussed here is given further below in this specification.

Figure 5:
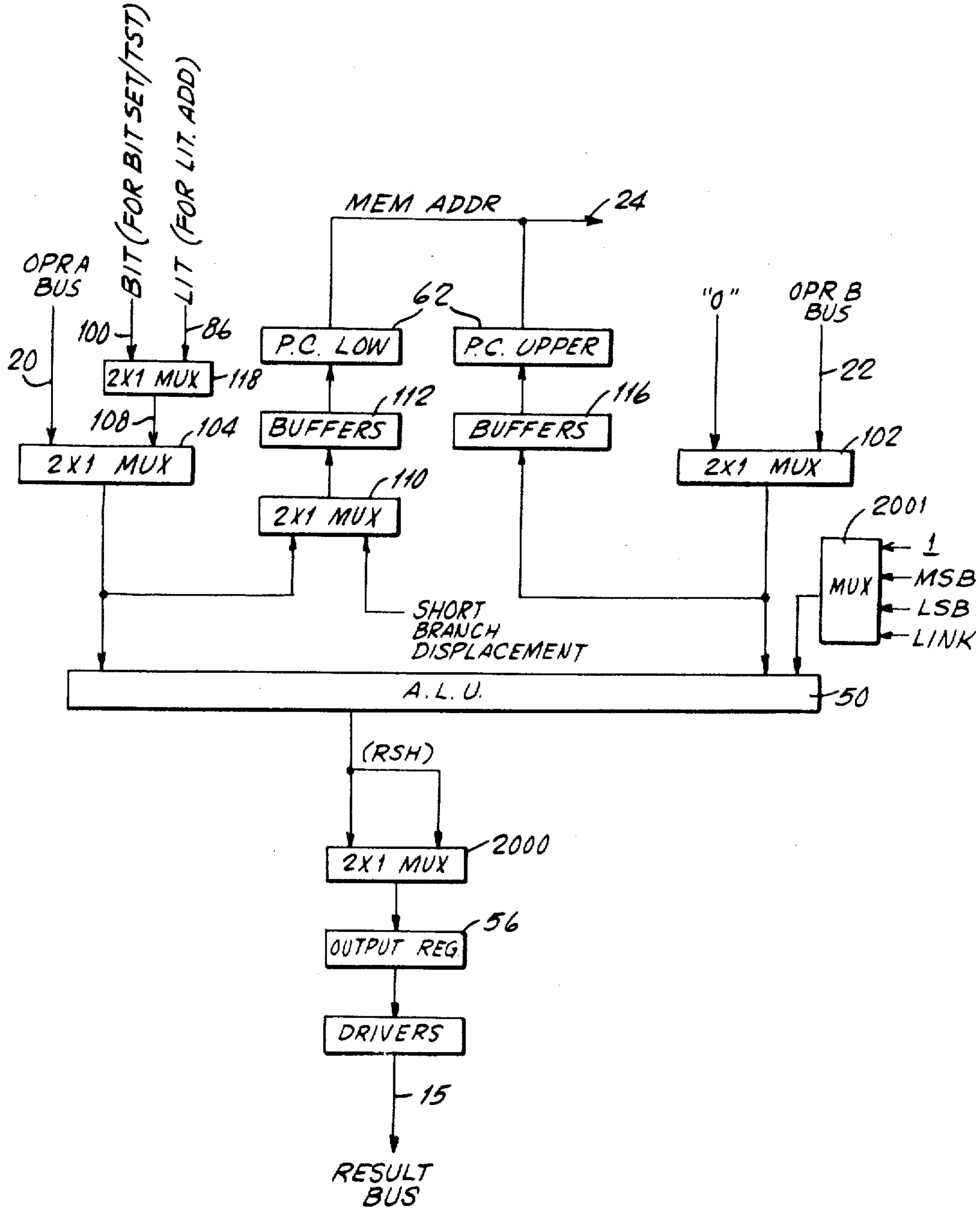
FIG. 5 is a more detailed block diagram of selected elements of the basic microprocessor system shown in FIG. 2.
Figure 6:
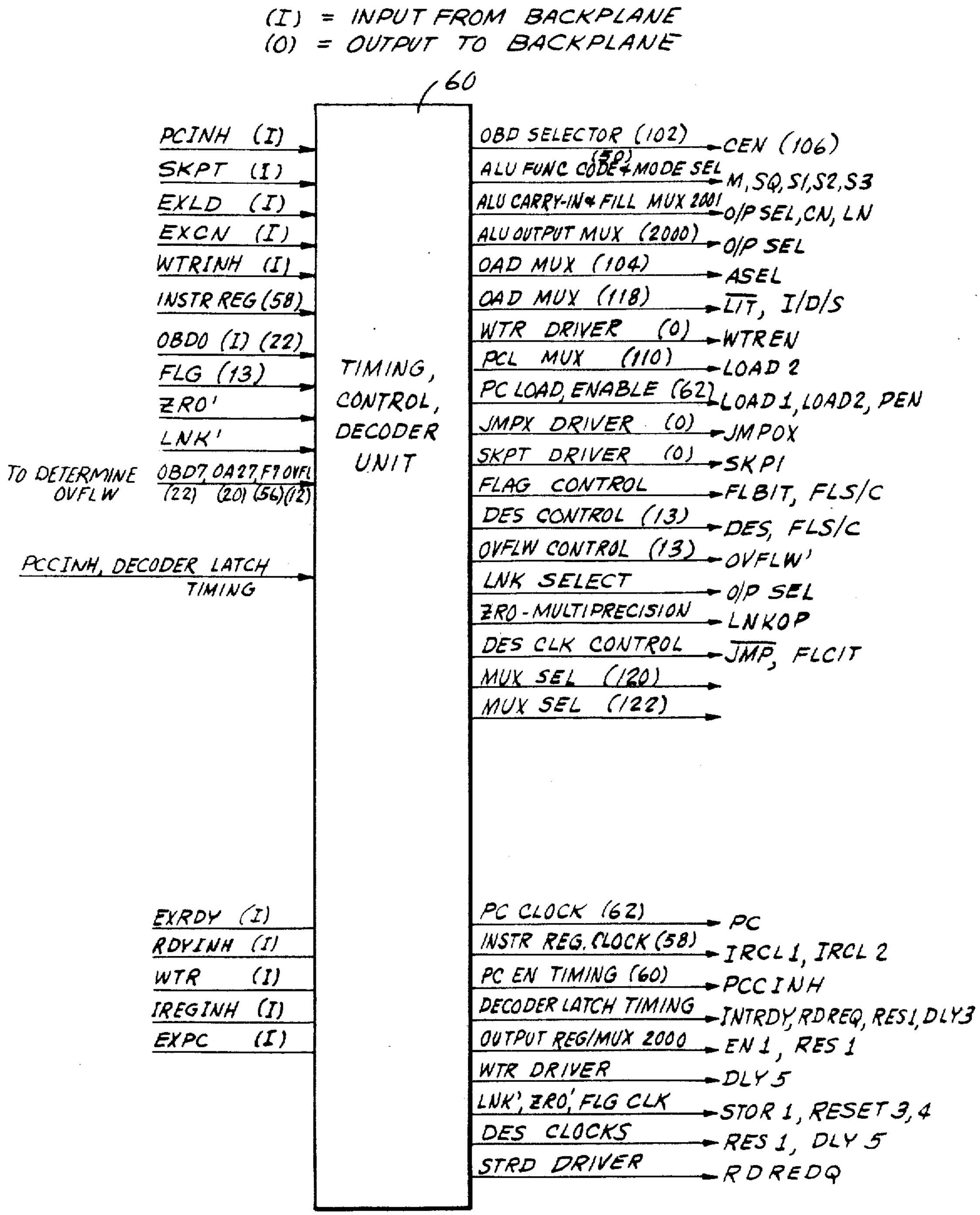
FIG. 6 is a block diagram of a timing, control and decoder unit shown in FIGS. 2 and 3.

Referring to FIG. 2, 5 and 6, where the same units are identified by identical reference numerals, a cycle of the basic microprocessor system starts with the issuance of a control signal EXRDY by the ROM 14. The EXRDY signal means that an instruction has been specified by a 16-bit word transferred to the ROM 14 from the program counter 62 via the memory address bus 24, a control signal STRD has been applied to the ROM 14 from the timing control and decoding unit 60 over the control line 26, and the ROM 14 has placed valid data on the memory data bus 28. After the EXRDY control signal is issued, and if the basic microprocessor system is ready (for example, if it has not been inhibited or is not in the middle of executing a previous instruction) the timing chain starts. It is noted, in reference to FIG. 6, that the EXRDY signal is applied to the timing, control and decoder unit 60. The first control signals of the timing chain are the instruction register clock signal and the PC CLOCK signals issued from the unit 60 in FIG. 6. The instruction register clock signals cause the contents of the memory data bus 28 to be read into the instruction register 58, and the PC clock signals increment the contents of the program counter 62, unless this is the second cycle of a branch, or load program counter instruction, in which case the program counter 62 is loaded appropriately with a 16-bit or an 8-bit address. The time delays inherent in the circuitry between the program counter 62 and the ROM 14 are such that the data on the memory data bus 28 does not change before the instruction register clock signals are discontinued.

At this time two simultaneous paths start: one involves extending the instruction which is now in the instruction register 58, and the other one involves fetching the next sequential instruction from the ROM 14.

The first path starts with the A and B fields of the instruction which is now in the instruction register 58 appearing on the address A and address B buses 16 and 18. The 5-bit binary number on the address A bus 16 and the 5-bit binary number on the address B bus 18 are applied to conventional decoders through which the registers 12 are connected to the address A and B buses 16 and 18. Each of the registers 12 has two such decoders: one for interfacing with the address A bus 16 and one for interfacing with the address B bus 18. The function of the decoders is to translate the 5-bit binary numbers appearing on each of the address A and address B buses into a signal causing a particular register to transfer its contents on the operand A or operand B buses 20 and 22. Unconditionally, the registers 12 which are addressed by the five bit addresses on the address A and B buses 16 and 18 transfer their contents on the operand A and operand B buses 20 and 22 respectively. It is noted that by convention register 30 is not allowed to read its contents onto the operand A bus 16.

Figure 7:
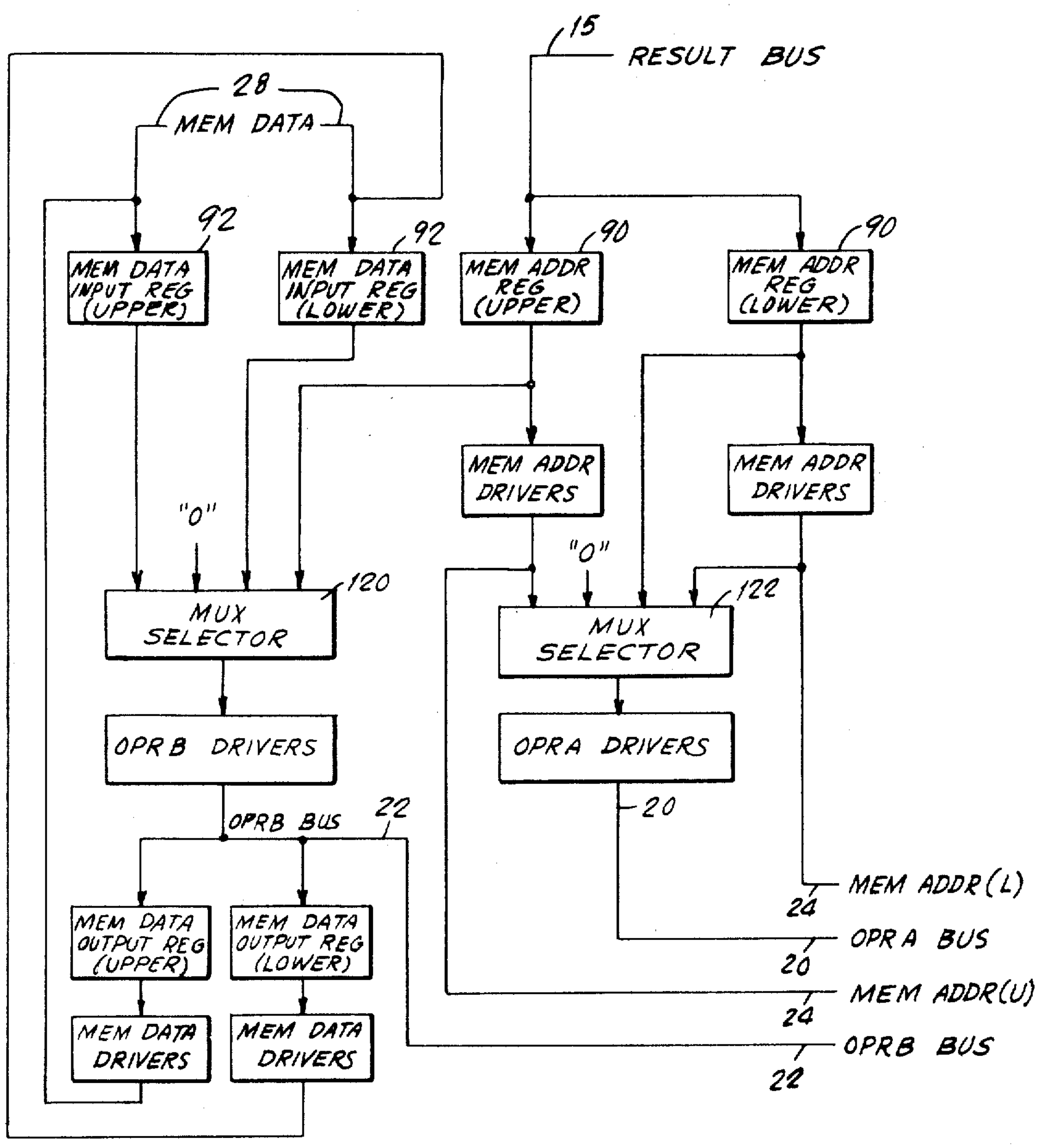
FIG. 7 is a more detailed block diagram of selected elements of the extended microprocessor system shown in FIG. 3.

The contents of the operand A and B buses 20 and 22 are presented to the ALU 50 depending on control signals applied to the multiplexers 104, 118 and 102 (FIG. 7). Each of the multiplexers 104, 118 and 102 is in effect a gating device which passes to its output a selected one of its two inputs depending on the control signal applied to it. The control signals from the timing, control and decoding unit 60 which are applied to the multiplexers 104, 118 and 102 are identified in FIG. 6 by the appropriate reference numerals appearing in parenthesis on the appropriate outputs of the unit 60 in FIG. 6.

At the time the contents of the selected registers 12 are presented to the ALU 50 over the operand A and B buses 20 and 22, as passed by the multiplexers 104, 118 and 102, the ALU 50 also receives the function code and mode select control signals from the decoder 60 (FIG. 6). The function code and mode select control signals are the ALU 50- compatible signals corresponding to the operation code and mode field (if any) of the instruction which is now in the instruction register 58. After the inherent delay of the ALU 50 necessary for carrying out the specified operation, the result appears on the output thereof (FIG. 5) and is applied to a selector 2000 which selects either the direct output of the ALU 50 or the shifted-to-the-right output of the ALU 50. The control signal for the multiplexer 2000 is from the decoder 60 (FIG. 6); if a right shift is selected, the fill-in bit comes from the multiplexer 2001 (FIG. 5) whose inputs are: (1) a logical zero from a logical zero generator (not shown), (2) the most significant bit of the operand prior to shifting; (3) the present link designator bit in the designator register 13, and (4) the lowest order bit of the operand prior to shifting. The multiplexer 2001 selects one of the four inputs depending on the control signals on the appropriately numbered line from the decoder 60 in FIG. 6. Now the first timing signal of this path occurs. This timing signal is labelled Output Register/Multiplexer (FIG. 6) and is applied to the multiplexer 2000 and to the output register 56 to cause the output of the multiplexer 2000 to be latched into the output register 56.

At this point the basic microprocessor system is substantially read to start a new cycle. This is possible because the data which is in the output register 56 at this time and is placed thereby on the result bus 15 is not needed for the initial time period of the next cycle (e.g., the following instruction can be read into the instruction register 58 and can start propagating toward the ALU 50 while the contents of the output register 56 resulting from the current instruction are being read into the appropriate register 12).

Regarding the second flow path indicated above, after the program counter 62 is incremented at the start of the current instruction, and the new address therefrom appears on the memory address bus 24 and is applied to the memory, then the timing control and decoder unit 60 (FIG. 6) issues another STRD signal a specified period of time after the incrementing of a program 62, which period of time is enough for the memory to decode the word on the memory address bus 24. At this point the first instruction discussed herein is being executed and is at the point where the result of it is being written into a register 12, and the next instruction has been addressed (by the programmer counter 62) and a STRD read request signal for it has been issued. If the memory is fast enough to have the addressed and requested instruction ready at the completion of the current instruction cycle, the next instruction cycle can start immediately. If the memory is slower, such that the requested next instruction is not available from the memory at the completion of the cycle of the current instruction, the basic microprocessor has to wait for the next EXRDY signal from the memory which signal would indicate that the memory has valid data available on the memory bus 28, which valid data is that next instruction.

Referring to FIGS. 5 and 6, a description is now given of the operation of the multiplexer 104, 118, 110, 102, 2001 and 2000 in the course of executing the types of instructions discussed earlier in this specification. The multiplexer 118 has inputs 86 and 100. Input 86 is an 8-bit bus carrying the contents of bit positions 5 through 12 of the instruction register 58. Referring to FIG. 4 and to class of instructions labelled "literal," the 8-bit binary number on the bus 86, which is an input to the multiplexer 118, is the literal value in bit positions 5–12 of the instruction. The other input of the multiplexer 118 is an 8-bit bus 100 which is derived from a conventional 3-to-8 decoder whose input is the 3-bit N-field of the bit manipulation instruction shown in FIG. 4. In particular, the three bits from the N-field of a bit manipulation instruction stored in the instruction register 58 are applied to a conventional 3-to-8 decoder whose output is an 8-bit number having seven 0's and one 1 which is in the bit position identified by the three bit input. Thus, the 8-bit number applied to the multiplexer 118 is a binary number having a single logical 1 in the bit position identified by the N-field of a bit manipulation instruction stored in the instruction register 58. As discussed earlier, the multiplexer 118 passes only one of its two inputs, depending on a control signal labelled OAD, MULTIPLX (118) from the unit 60 in FIG. 6.

The multiplexer 104 also has two inputs: one input is the 8-bit number on the operand A bus 20, and the other input is the output of the multiplexer 118 discussed immediately above. The multiplexer 104 passes to the ALU 50 only one of its inputs, depending on the state of the control signal labelled OAD, MULTPLX (104) from the unit 60 in FIG. 6.

The multiplexer 102 has two inputs: one input is an 8-bit bus carrying all zeros and the other input is the 8-bit operand B bus 22. The multiplexer 102 passes to the ALU 50 only one of its inputs, depending on the state of the control signals labelled OBD SELECTOR (102) from the unit 60 in FIG. 6.

The multiplexer 110 has two inputs: one is the 8-bit number from the output of the multiplexer 104, and the other input is an 8-bit bus carrying the 8-bit number in the literal field of an instruction of the short jump class of instructions (FIG. 4). The multiplexer 110 passes to its output only one of its two inputs, depending on the state of the control signal label PCLMULTPLX (110) from the unit 60 in FIG. 6. The buffers 112 and 116 are conventional buffers whose outputs are applied respectively to the lower 8 bits and to the upper 8 bits of the program counter 62.

The multiplexer 2001 has four inputs: a logical 1 from a suitable generator, the most significant bit of the operand on the operand B address bus 22, the least significant bit of the same operand, and the link bit from the designator register 13. depending on the state of the control signal labelled ALU CARRY IN AND FILL MULTIPLEX (2001) from the timing, control and decoder unit 60 in FIG. 6, the multiplexer 2001 passes to the ALU 50 only one of its inputs.

The multiplexer 2000 has two inputs: the 8-bit bus directly from the output of the ALU 50; and the same 8-bit bus, but shifted by hardware to the right by one bit position. The multiplexer 2000 selects one of its inputs depending on the state of the control signal labelled ALU output multiplex (2000) and originating from the timing, control and decoder unit 60 in FIG. 6.

Thus, referring to FIGS. 2, 4 and 5, when instructions of the dual operand class are executed, the multiplexers 104 and 102 pass to the ALU 50 the operand A and operand B buses 20 and 22 respectively. When a literal instruction is being executed, the multiplexer 102 passes to the ALU 50 the contents of the operand B bus 22, and the multiplexer 118 and 104 pass to the ALU 50 the literal value field of the instruction. When a single operand instruction is being executed, the multiplexer 102 passes to the ALU 50 the contents of the operand B bus 22. When a bit manipulation instruction is being executed, the multiplexer 102 passes the contents of the operand B bus 22 and the multiplexer 118 passes the contents of the bus 100, while the multiplexer 104 passes the contents of the output 108 of the multiplexer 118. When a short jump instruction is being executed, the multiplexer 110 blocks out the output of the multiplexer 104. The multiplexer 2001 allows the appropriate one of its four inputs, depending on the requirements of the instruction discussed in detail earlier.

Referring to FIG. 7, which is similar to FIG. 5 but shows details of the extended microprocessor system of FIG. 3, there are two multiplexers, 120 and 122. The multiplexer 120 has four inputs: an 8-bit bus carrying bits 8–15 of the memory data input register 92; a zero bus carrying an 8-bit binary zero; and 8-bit bus carrying the contents of bit positions 0 through 7 of the memory data input register 92; and an 8-bit bus carrying the contents of bit positions 8–15 of the memory address register 90 or the contents of bits 8–15 of the memory address bus 24. Depending on the state of the control signal which is labelled MUX SEL (120) in FIG. 6, the multiplexer 120 passes only one of its four inputs. The multiplexer 122 in FIG. 7 has the following four inputs: an 8-bit bus carrying either the contents of bit positions 8–15 of the memory address register 90 or bits 8–15 of the memory address bus 24; an 8-bit zero bus; and 8-bit carrying the contents of bit positions 0–7 of the memory address register 90; and an 8-bit bus with bits 0–7 of the memory address bus 24. Depending on the state of the control signal labelled MUX SEL (122) in FIG. 6, the multiplexer 122 passes only one of its four inputs.

A more detailed description of the control flow and timing of the memory reference instructions (which are possible only with the extended microprocessor system illustrated in FIG. 3) is now given in conjunction with FIGS. 8–17. FIGS. 8–17 are in flow chart form; each of the states 0–30 marked in the figures corresponds to one cycle of the basic microprocessor system illustrated in FIG. 2.

Figure 8:
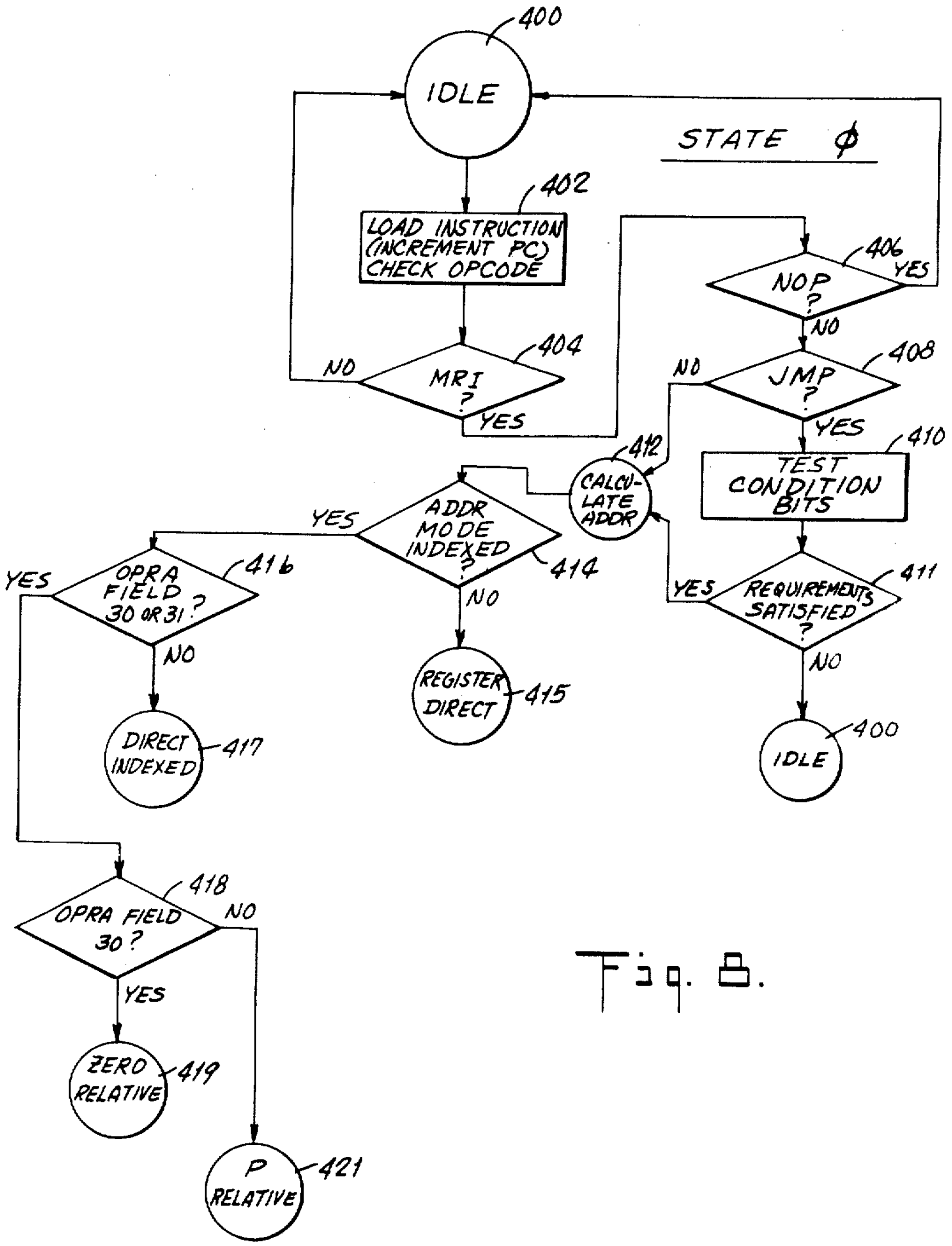
FIGS. 8 through 17 are flow charts of the execution of memory reference instructions of the extended microprocessor system shown in FIG. 3.

Referring to FIG. 8, step 400 which is labelled IDLE refers to the idle state of the extended microprocessor system, i.e., the system is not currently executing a memory reference instruction (FIG. 4). When an instruction is read from the ROM 14 or from the memory 38, it is loaded, at step 402, simultaneously in the instruction register 58 (FIG. 3) and in the memory input register 92. At step 404 a test is made to determine if the instruction in the memory instruction register 58 is a memory reference instruction. If it is not, the system stays in the idle state 400. If it is a memory reference instruction, at step 406 a test is made to determine if it is a NO OPERATION instruction. If it is a NO OPERATION instruction, the system goes through the initial decoding state, and at the end of it returns to the idle state 400. If the test at step 406 determines that the instruction is not a NO OPERATION instruction, a test is made at step 408 to determine if it is a JUMP instruction. If it is a JUMP instruction, the designator bits in the designator register 13 are tested at step 410 against the lower bits of the instruction and if the test is not satisfied, for example, if the test indicates that no JUMP is to be taken, the system returns to the idle state 400. If at step 408 the instruction tested was not a JUMP instruction, or if at step 411 the requirements for a JUMP instruction are satisfied, then at step 412 a procedure starts to determine which address mode should be used. Still during the initial decoding, at step 414 a test is made to determine if the addressing mode is indexed addressing mode. If the addressing mode tested at step 414 is not indexed mode, a register direct calculation starts at step 415. If at step 414 the answer is yes, it is determined at step 416 if the operand A field of the instruction specifies registers 30 or 31. If it does not specify one of these two registers, a direct index calculation starts at step 417. If the operand A field tested at step 416 specifies registers 30 or 31, at step 418 a determination is made if it specifies register 30. If the answer is yes, a zero relative addressing mode calculation starts at step 419. If it does not specify register 30, a P-relative addressing mode calculation starts at step 421. It is noted that the tests at steps 414, 416 and 418 occur in fact simultaneously, and are discussed here sequentially only for illustration purposes, the determinations made in the course of the procedure in FIG. 8 and the initial decode cycle of the extended processor.

After the initial decode cycle illustrated in FIG. 8, the address calculations indicated in FIG. 8 at steps 415, 417, 419 and 421 start.

Figure 9:
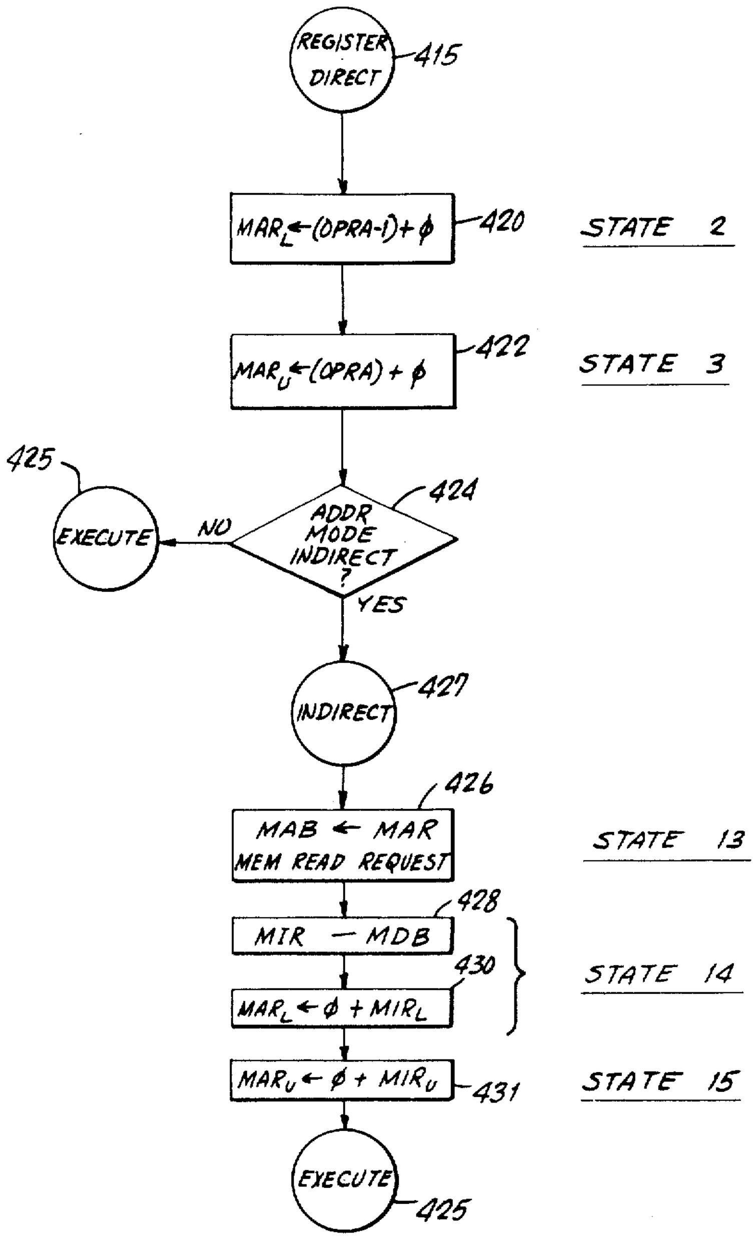

FIG. 9 shows the register direct calculating mode. In this mode the operand A address bus 16 (FIG. 3) receives the contents of the A-field of the instruction minus one, and thus the operand A data bus 20 (FIG. 3) receives the data of the register 12 specified by the operand A address bus 16. The operand B data bus 22 is forced to carry eight zeros. A cycle of the basic microprocessor system takes place at step 420; this cycle is labelled state 2 in FIG. 9. During this cycle at step 420, the contents of the operand A and operand B data buses 20 and 22 are added, and the result is placed in bit positions 0–7 of the memory address register 90 (FIG. 3). At step 422, the operand A address bus 16 receives the contents of the A-field of the instruction, the register 12 specified thereby is read onto the operand A data bus 20, and the contents of the operand A and operand B data buses 20 and 22 (note that the operand B data bus carries eight zeros) are added, with the result being placed in bit positions 8– 15 of the memory address register 90. At step 424 a test is made to determine if the addressing mode is indirect. If the mode is not indirect, an execute cycle starts at step 425. If the mode is indirect, the calculation of an indirect address starts at step 427.

Still referring to FIG. 9, the address calculated at steps 420 and 422 (each of these steps takes one cycle of the basic microprocessor of FIG. 2) has been placed in the memory address register 90 as a 16-bit word. Now at step 426 the address which is in the memory address register 90 is placed on the memory address bus 24, and a memory read request is issued. Step 426 takes one cycle of the basic microprocessor. After step 426, the specified instruction is read out of the memory 14 or 38, and is placed in the memory input register 92 at step 428. At step 430, the operand A data bus 20 is forced to zero, and the operand B bus 22 carries bit positions 0 through 7 of the memory input register 92. These bits 0 through 7 are stored in bit position 0 through 7 of the memory address register 90. At step 431, a similar procedure is used to load the contents of bits positions 8–15 of the memory input register 92 into bit positions 8–15 of the memory address register 90. Steps 428 and 430 take one cycle of the basic microprocessor system, and step 431 takes another cycle. After step 431, the address resulting from this indirect mode has been calculated and is present in the memory address register 90. Execution of the instruction identified thereby can now start at step 425.

Figure 10:
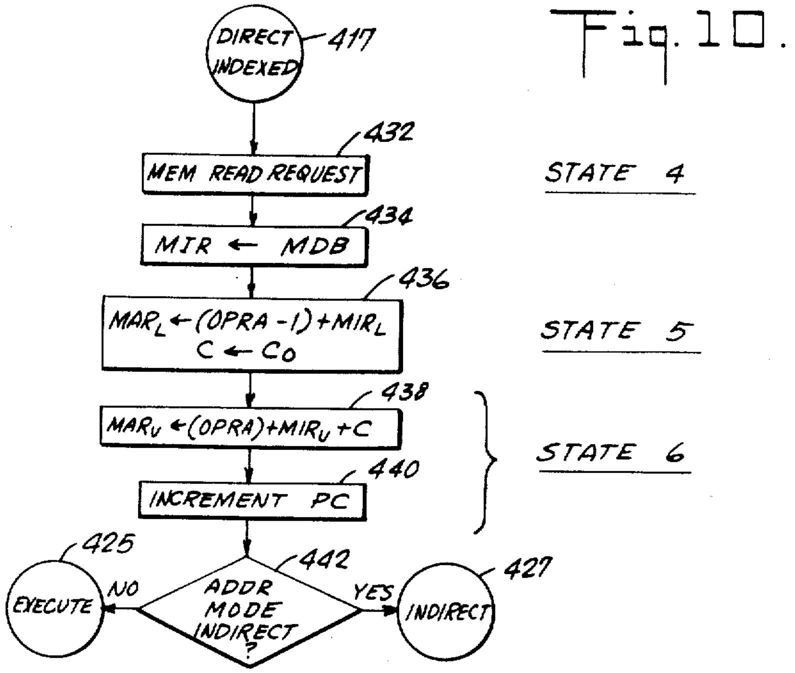

FIG. 10 shows the direct indexed mode address calculation procedure which starts when step 417 in FIG. 8 is reached. Referring to FIG. 10, the direct indexed mode involves two words; a 16-bit instruction word and a 16-bit optional word. It is noted that the program counter 62 has already been incremented at step 402 in FIG. 8 to point at the optional word of the instruction. Then at step 432 in FIG. 10 the basic microprocessor system is cycled once to read out the optional word of the instruction, and to place it in the memory input register 92 for use at step 432. The contents of the instruction register 58 are not altered, i.e., the instruction register 58 still contains the first word of the current instruction. At steps 436 and 438, the optional word of the instruction is added to the contents of the two registers specified by the A-field of the first word of the instruction, and the result is placed in the memory address register 90. This is done in two steps: in the first step the lower half of the memory address register 90 is loaded, and in the second step the upper half of the memory address register is loaded. This is done at steps 436 and 438 in FIG. 10. At step 440, the program counter is incremented to point to a new instruction word. At step 442 a test is made to determine if the addressing mode is indirect. If the answer is yes, an indirect mode address calculation is carried out as discussed in connection with FIG. 9. If the mode is not indirect, execution starts at step 425.

Figure 11:
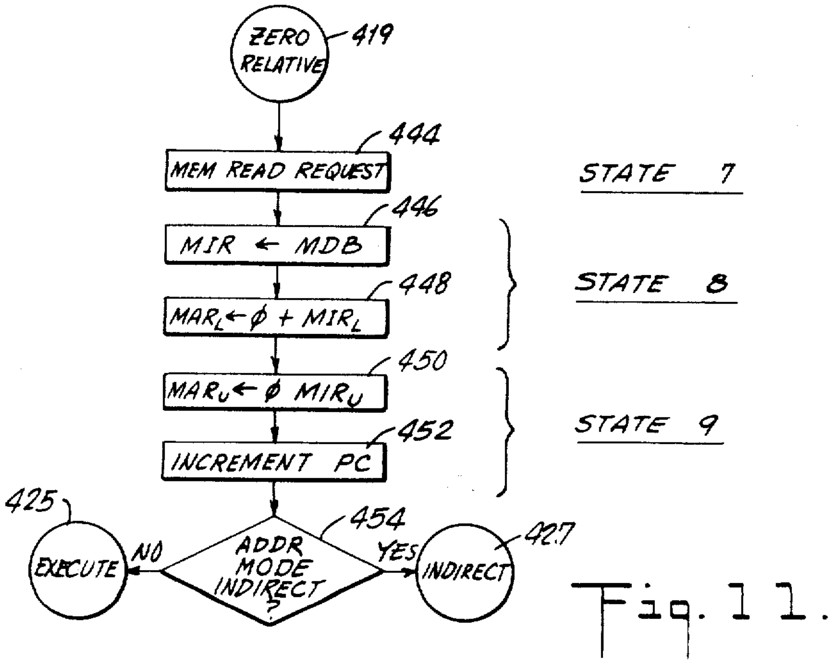

FIG. 11 shows the calculation of the zero relative address mode which was reached at step 419 in FIG. 8. Referring to FIG. 11, the optional word of the two-word instruction is read out of the memory 14 or 38 as a result of a memory read request issued at step 44. At step 446, the memory data bus 28 contents are loaded into the memory input register 92; the instruction register 58 is not affected, so that it still contains the first instruction word. At steps 448 and 450 the memory address register 90 is loaded with the contents of the memory input register 92, and during the second basic microprocessor cycle used to accomplish this, the program counter 62 is incremented at step 452 to point to a new instruction word. At step 454 a test is made to determine if the address mode is indirect. If the answer is no execution cycle starts at step 425. If the answer is yes, the indirect mode address calculation discussed in connection with FIG. 9 starts at step 427.

Figure 12:
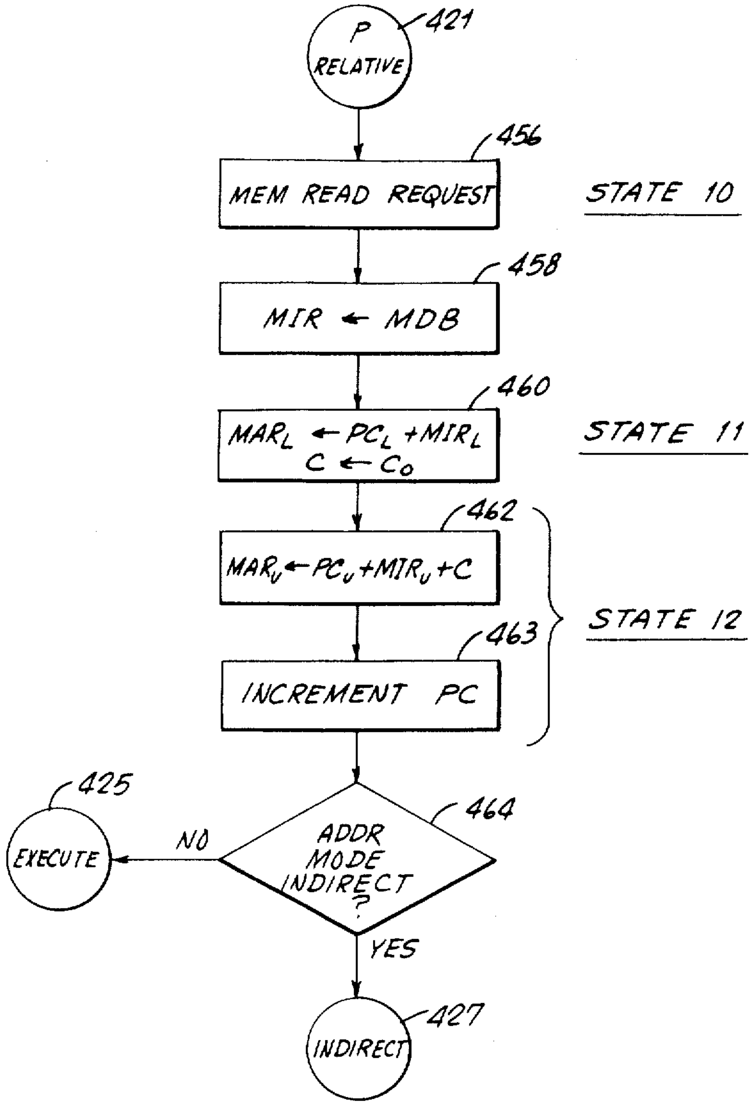

FIG. 12 shows a P-relative mode address calculation which is reached at step 421 of FIG. 8. Referring to FIG. 12, the second or optional word of the instruction is read out of the memories 14 or 38 as a result of a request issued at step 456. At step 458 the memory data bus 28 contents are loaded into the memory input register 92. At steps 460 and 462, the contents of the memory input register 92 are added to the current contents of the program counter 62, and the result is placed in the memory address register 90. This takes two cycles of the basic microprocessor system; during the second of these two cycles, at step 464, the program counter 62 is incremented. Now the program counter 62 is pointing to the next sequential instruction and the memory address register 90 contains an address which has been calculated as a result of the P relative mode address calculation. At step 464 a test is made to determine if the addressing mode is direct. If the answer is no, an execution starts at step 425. If the answer is yes, an indirect mode calculation starts at step 427 and is carried out as described in connection with FIG. 9.

Figure 13:
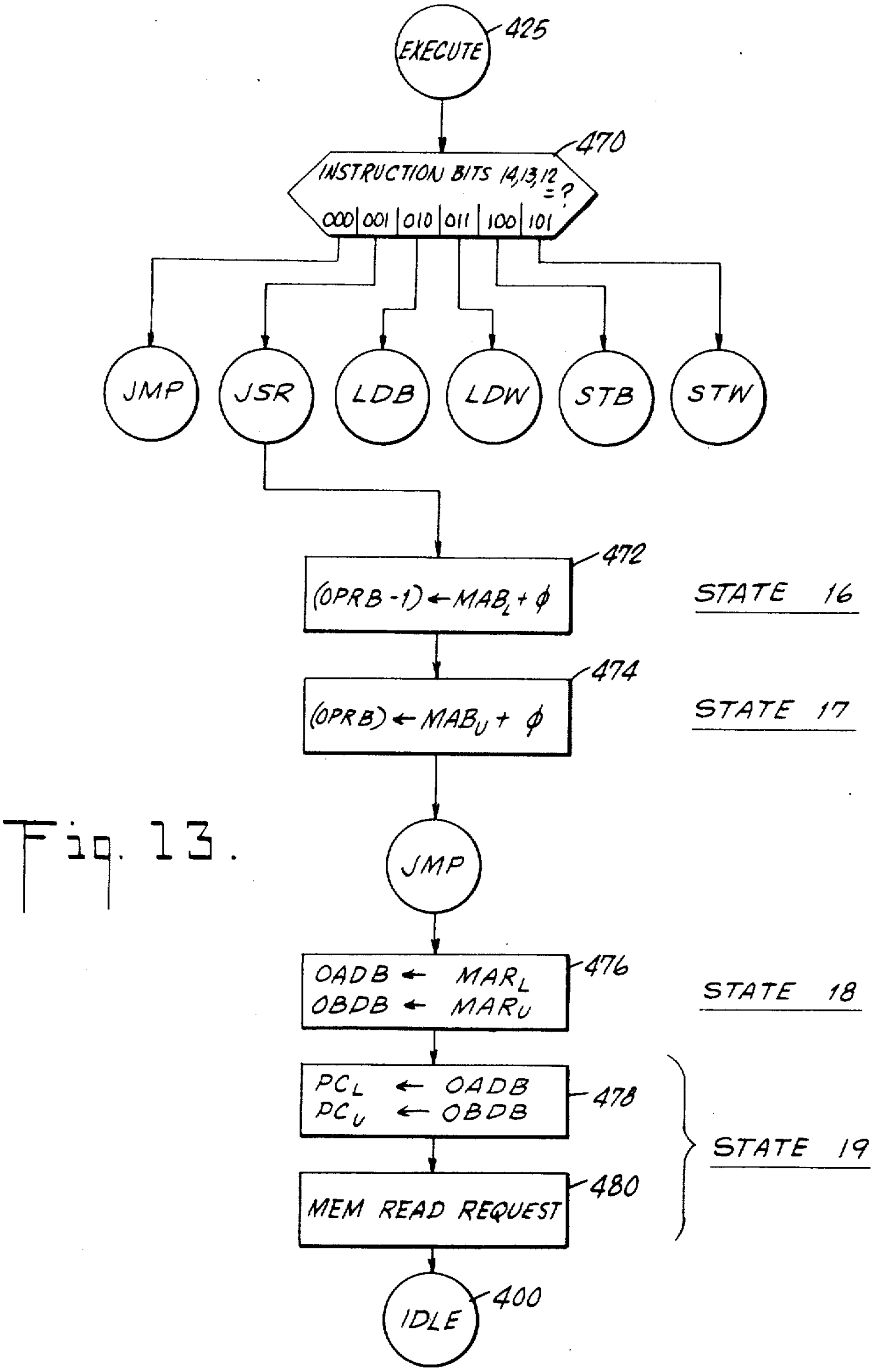

FIG. 13 shows the execution of a memory reference instruction after the procedure is described in connection with FIGS. 8 through 12. Referring to FIG. 13, the execution starts at step 425 and at step 470, before actual execution starts, a determination is made as to which executing state will be selected. There are six possible executing states: JUMP, JUMP TO SUBROUTINE, LOAD BYTE, LOAD WORD, STORE BYTE and STORE WORD. FIG. 13 illustrates the JUMP TO SUBROUTINE state. This generally involves going to a different location in memory, and it is desirable to store the contents of the program counter 62 for future use, so that a return can be made if necessary to the original sequence of instructions which existed prior to the JUMP TO SUBROUTINE instruction. To this end, by means of two cycles of the basic microprocessor system at steps 472 and 474, the lower and upper halfs of the contents of the program counter 62 are transferred through the memory address bus 24 and through the address gating 96 onto the operand A data bus 20, each 8-bit byte from the program counter 62 is added to the zero contents of the operand B bus 22, and the result is placed in the two registers specified by the B-field of the original instruction. After steps 472 and 474, transfer is made to the execution of a JUMP instruction, which is the same as the execution of a straight JUMP instruction discussed in connection with FIG. 2. At step 476, the contents of the lower and upper half of the memory address register 90, which at this time contains a calculated address, are placed onto the operand A and operand B data busses 20 and 22 respectively. At step 478 the contents of the operand A and operand B buses 20 and 22 are placed into the lower and upper half of the program counter 62 respectively. At step 480 a memory read request is issued to read from the memory 14 or 38 another instruction, which is the instruction specified by the new contents of the program counter 62 which are placed therein during step 478. After step 480, the extended microprocessor system returns to the idle state 400.

Figure 14:
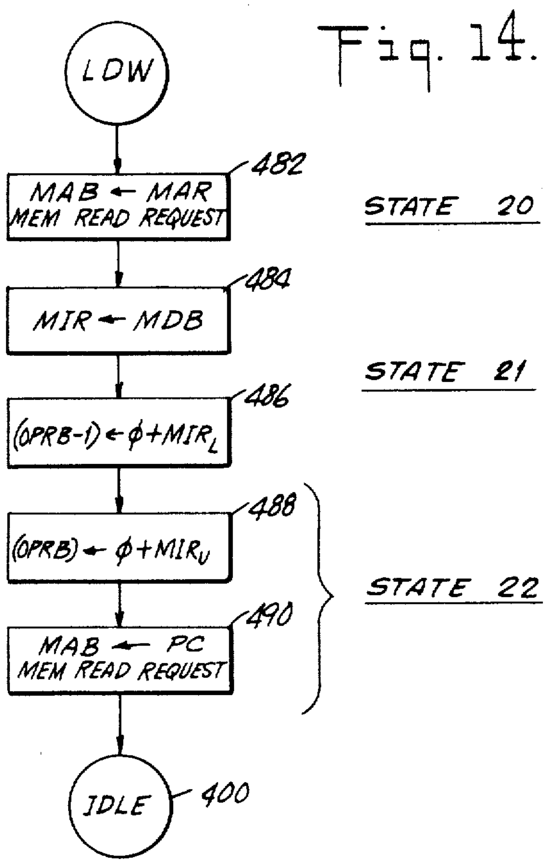

FIG. 14 illustrates the execution of a LOAD WORD instruction which follows step 470 of FIG. 13. Referring to FIG. 14, at step 482 the memory address register 90 contents are transferred to the memory address bus 24, and a memory read request is issued. The word read from the memory 14 or 38 as a result of this request is placed, at step 484 in the memory input register 92. At steps 486 and 488, by means of two instruction cycles of the basic microprocessor system, the lower and upper halves of the memory input register 92 are transferred into the even and odd registers respectively, which are specified by the B-field of the original instruction word. During the time the instruction cycle of step 488 is carried out, the program counter 62 contents are transferred at step 490 to the memory address bus 24, and a memory address request is issued to read from the memory 14 or 38 the next sequential instruction. Then the extended microprocessor system returns to the idle state at step 400.

Figure 15:
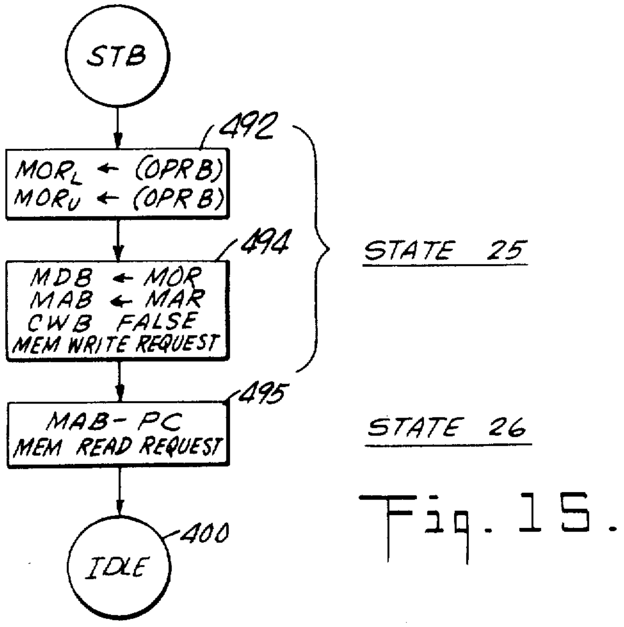
Figures 16, 17:
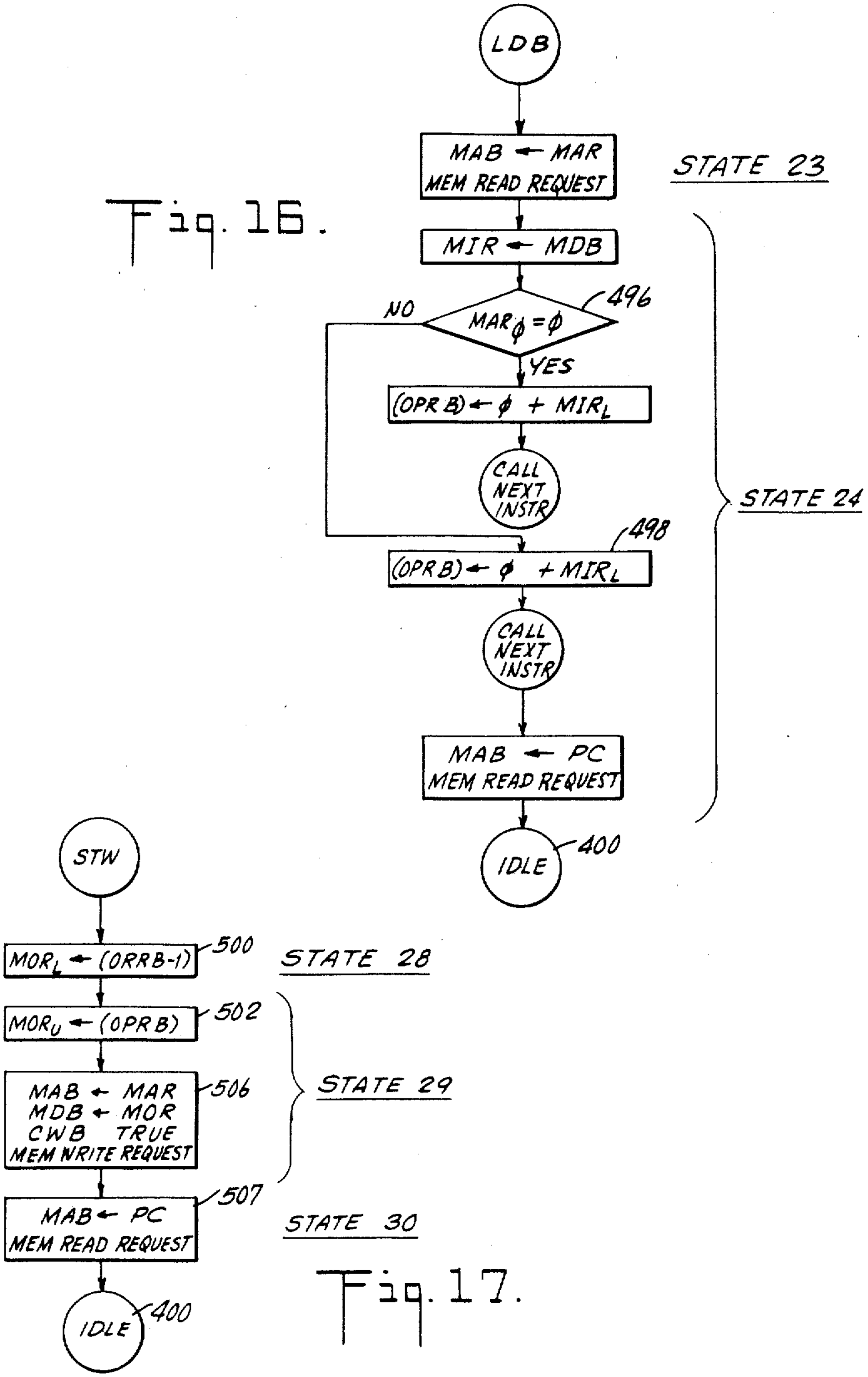

FIG. 15 shows the execution of a STORE BYTE instruction which follows step 470 of FIG. 13. Referring to FIG. 15, at steps 492 and 494 the contents of the operand B data bus 22 are loaded into both halves of the memory output register 91. Simultaneously, at step 494, the contents of the memory output register 94 are transferred on the memory data bus 28 and the contents of the memory address register 90 are transferred onto the memory address bus 24 to provide the address in the memory 38 where the byte transferred to the memory data bus 28 from the memory output register 94 is to be stored. At the same time, the clear write both signal is in a state which indicates to the memory 38 that only one of the two bytes which are on the memory data bus 28 is to be stored in the memory 38. The appropriate byte location in the memory 38 which is to store one of the two bytes on the memory data bus 28 is determined by the lowest order bit on the memory address bus 24. During this time a memory write request is issued to the memory. After step 494, at step 495 the contents of the program counter 62 are transferred to the memory address bus 24 to read from the memory 14 or 38 the next sequential instruction, and a memory read request is issued. After step 495, the extended microprocessor system returns to the idle state 400. FIG 16 shows the procedure for executing a LOAD BYTE instruction which follows the execution of step 470 in FIG. 13. Referring to FIG. 16, a procedure is essentially the same as the LOAD WORD procedure discussed in connection with FIG. 14, except that at step 496 a test is made to determine which half of the 16-bit word which is on the memory data bus 28 and has to be loaded into the memory input register 92. At step 496 the bit tested is the lowest order bit of the contents of the memory address register 90. If that bit is zero, this indicates that the upper half of the word is to be loaded; this upper half is loaded into the upper half of the memory input register 92 and is placed on the operand B data bus 22 to be added to zero in the arithmetic logic unit 50. The result is placed in the register 12 specified by the B field of the instruction. If the answer at step 496 is no, that is, if the lower half of the 16-bit word on the memory data bus is to be loaded, at step 498 the contents of the lower half of the memory input register 92 are placed on the operand B data bus 22, they are added to zero in the ALU 50, and the result is placed on the result bus 15, and therefore into the register specified by the B field of the instruction. A memory read request is next issued and the contents of the program counter 62 are placed on the memory address bus 24 to read out the next sequential instruction from the memory 14 or 38. Then the extended microprocessor system returns to the idle state 400. Referring to FIG. 17, at step 500, the even register of the register pair specified by the B-field of the instruction is loaded in the lower half of the memory output register 94. At step 502 the odd register of the register pair is loaded into the upper half of the memory output register 94, and at step 506 the contents of the memory address register 90 are placed on the memory address bus 24, the contents of the memory output register 94 are placed on the memory data bus 24, a memory write request is issued to the memory 38 to store the word present on the memory data bus 28, and a clear write both signal goes to a state indicating that both bytes on the memory data bus 28 are to be stored. During the next cycle of the basic microprocessor system, at step 507, the contents of the program counter 62 are placed on the memory address bus 24 to read the next sequential instruction from the memory 14 or 38, and the extended microprocessor system returns to the idle state 400.

As discussed in connection with FIG. 1, the illustrated embodiment of the invention includes an optional maintenance panel 48 which provides the capability of monitoring and controlling instruction execution of the basic and extended processor systems. The maintenance panel 48 provides full access to all functions to which the basic microprocessor 10 and the extended microprocessor 32 have access. This includes direct and full access to all registers 12, all buses, and all memory locations in the ROM 14 and in the read-write memory 38. For monitoring purposes, the maintenance panel can monitor any selected memory locations, or any selected register. Additionally, it can monitor any selected instruction by means of a novel feature called P-STOP and discussed in detail below. For control purposes execution, the maintenance panel 48 removes the microprocessors 10 and 32 from driving their associated buses and control lines and takes over driving these buses and control lines.

The maintenance panel 48 is on a conventional plug-in board and is removable from the system illustrated in FIG. 1. The maintenance panel interfaces with the system such that its presence is not required for normal operation of the system; and, when the maintenance panel 48 is plugged in and is used for monitoring purposes, it does not degrade system performance. The maintenance panel 48 provides the capability of visually displaying the state of the instruction address and instruction data buses.

Figure 18:
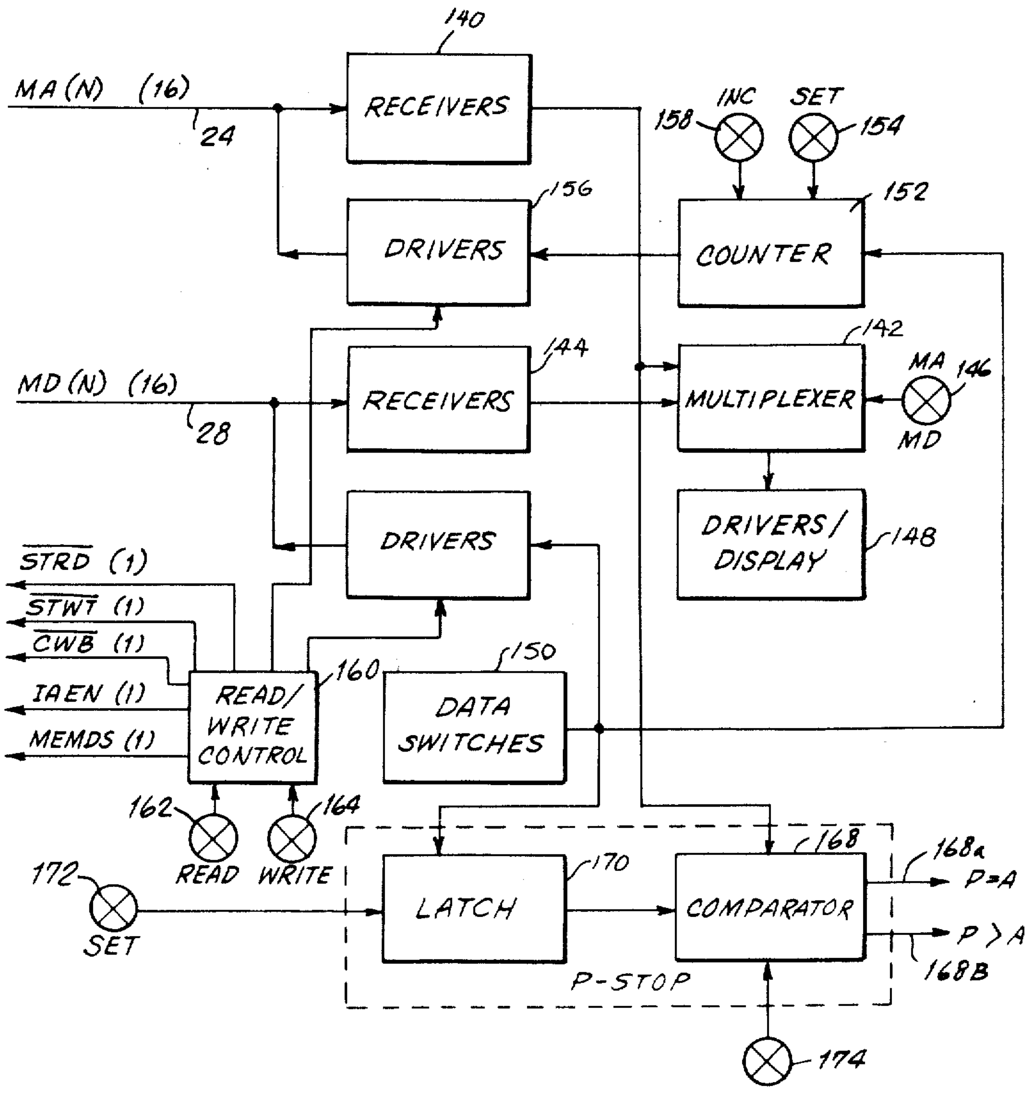
FIGS. 18 through 21 are block diagrams of a maintenance panel forming a part of the system shown in FIG. 1.

Referring to FIG. 18, the maintenance panel 48 connects with the 16-bit memory address bus 24 and with the 16-bit memory data bus 28. For monitoring purposes, the 16-bit signal carried on the memory address bus 24 goes through receivers 140 which serve as signal isolators and is applied in parallel to a multiplexer-selector 142. The 16 lines of the memory data bus 28 are applied to a similar set of receivers 144 and the outputs of the receivers 144 are applied to the same multiplexer-selector 142. Under the control of a manual switch 146, the multiplexer-selector 142 applies to a display unit 148 either the signals carried on the memory address bus 24 or the signals carried on the memory data bus 28. The display 148 is a conventional 16 position display showing the state of each of the 16 bits of the number supplied to it from the multiplexer-selector 142.

The maintenance panel 48 also provides the capability of performing read and write operations of any available memory locations. For this purpose, the portion of the maintenance panel 48 which is shown in FIG. 18 includes 16 manual switches 150. The outputs of the switches 150 are applied to a 16-bit counter 152 which can be loaded, when enabled by a manual set switch 154, with a number corresponding to the state of the 16 switches 152. When the counter 152 is so loaded, its output is applied through drivers 156 to the memory address bus 24, to address thereby a memory location identified by the contents of the counter 152. The counter 152 is provided with a manual increment switch 158 which is used to increment by one the contents of the counter 152 so as to access sequential memory locations. A read/write control 160 is provided to generate control signals for reading from memory or for writing into memory. The control 160 is in turn controlled by a manual read switch 162 and a manual write switch 164. When reading from memory is desired (this can be from the ROM 14 or from the read-write memory 38), the read switch 162 is set and the control unit 160 generates a STRD signal to cause reading from memory. For writing into the memory 38, the write switch 164 is set, such that the control unit 160 issues a control signal STWT which initiates writing into memory. When writing into memory, the data to be written in is determined by the setting of the 16 manual switches 150. The read-write control unit 160 also generates three other control signals. One of these three signals is labelled CWB in FIG. 18, and means that both 8-bit bytes which are on the memory data bus 28 are to be written into the memory 38; the second of these three signals is labelled IAEN and removes the basic and extended processors 10 and 32 from driving their associated buses, and the third signal is labelled MEMDS and removes the memories 14 and 38 from driving the memory data bus 28. The control signal IAEN is present for both the reading from memory and writing into memory functions, while the control signal MEMDS is on only when writing into memory.

Still referring to FIG. 18, the maintenance panel 48 provides the novel capability of stopping instruction execution when a predetermined state of the memory address bus 24 is reached. To this end, the signals on the memory address bus 24 are provided, through the receivers 140, as one input of a comparator 168. The other input of the comparator 168 is from a latch unit 170 which receives as an input the states of the 16 switches 150. The latch unit 170 is under the control of a manual switch 172 to latch in the states of the switches 150 when the manual switch 172 is set. Thus, an address in the memory (either the ROM 14 or the read-write memory 38) may be selected by means of manually setting the switches 150; this address can be latched into the latch unit 170 under the control of the set switch 172, and it may be presented to the comparitor 168. When the actual address on the memory address bus 24 is equal to the address provided on the comparitor 168 from the latch unit 170, the output of the comparitor 168 which is labelled **168*a* is energized. When the actual address on the memory address bus 24 is greater than or equal to the address provided from the output of the latch unit 170, the output of the comparitor 168 which is labelled 168*b* is energized. A manual three position switch 174 is provided to control the outputs of the comparitors 168. In one position of the switch 174, the comparitor 168 provides no output regardless of its inputs; in another position of the switch 174, the comparitor 168 can provide a signal only on its output 168*a* (i.e., its output 168*b* is disabled); and in a third position of the switch 174, the comparitor unit 168 can provide a signal only on its output 168*b* (i.e., the output 168*a* is disabled). The signals on the lines 168*a* and 169*b* from the comparitor 168 are used as P-stop signals (e.g., program stop signals), as described below in connection with FIG. 21**.

Figure 19:
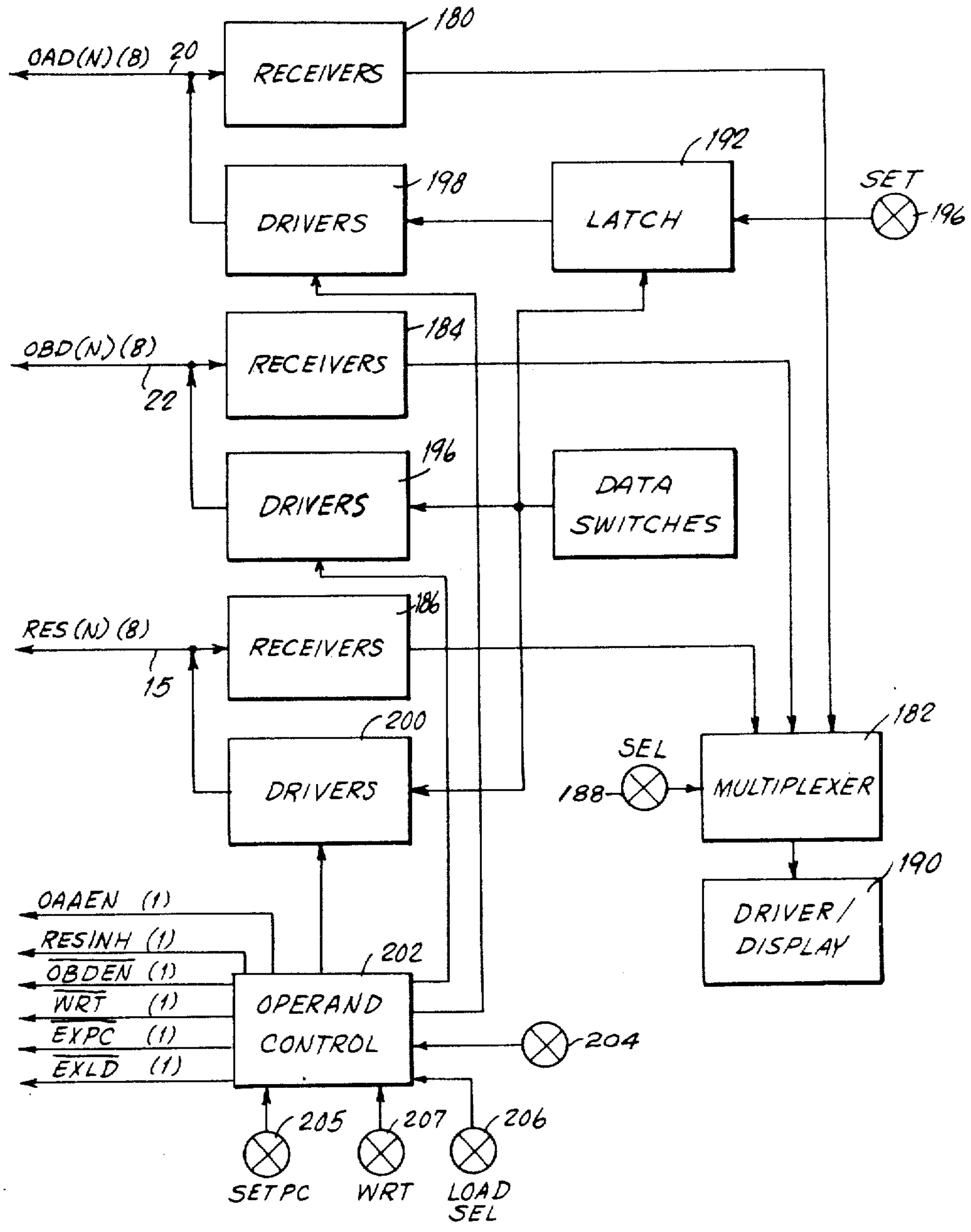

The maintenance panel 48 also provides the capability of visually displaying the states of the operand A and operand B buses 20 and 22 and of the result bus 15. Referring to FIG. 19, the 8-bit number carried on the operand A bus 20 is supplied to a multiplexer 182 through receivers 180 which serve as isolators. The other inputs of the multiplexer 182 are the 8-bit number from the operand B data bus 22 which passes trhough similar receives 184, and the 8-bit number on the result bus 15 which also passes through similar receivers 186. Depending on the position of a three-position selector switch 188, the multiplexer selector 182 presents to a display unit 190 either the operand A data from the operand A data bus 20, or the operand data from the bus 22, or the result data from the result bus 15. The display unit 190 is an 8-stage display showing the state of each of the 8 bits of a byte supplied to it from the multiplexer selector 182.

The maintenance panel 48 also provides the capability of loading either (1) the operand A and B buses 20 and 22 simultaneously, or (2) the result bus 15. The data to be placed on the operand A bus 20 is from a latch unit 192 which is loaded with the states of manual switches 194. The latch unit 192 is enabled by the manual switch 196 to latch in the states of the data switches 194. The data for the operand B bus 22 is derived from the same switches 194, as applied to the operand B bus 22 through drivers 196. The contents of the latch unit 192 are applied to the operand A bus 20 through drivers 198. The same data switches 194 can be used to apply an 8-bit signal to the result bus 15 through drivers 200. Displaying and loading the operand A and operand B buses 20 and 22 and the result bus 15 is under the control of a unit 202 which in turn is set by manual switches 204, 206, 205 and 207. The switch 204 determines if a display and a load function is to be carried out by the circuit shown in FIG. 19. The two position load selector switch 206 determines whether to (1) load buses 20 and 22 simultaneously, or (2 ) load bus 15; the switch 207 determines if any of the registers 12 is to be written into; and the switch 205 determines if the program counter 62 is to be set. The operand control unit 202 issues the following control signals: OAAEN to allow the basic processor 10 to drive the address A bus 16; RESINH to inhibit the microprocessors 10 and 32 from driving the result bus; OBDEN to disable the registers 12 from driving the operand B data bus 22; WTR to cause the data appearing on the result bus 15 to be written into the register addressed by the operand B address bus 18; EXPC for externally clocking the program counter 62; and EXLD to cause the program counter 62 to be loaded upon its next clock pulse with the operand A data in its lower 8 bits and with operand B data in its upper 8 bits, except that bit zero is not loaded.

Figure 20:
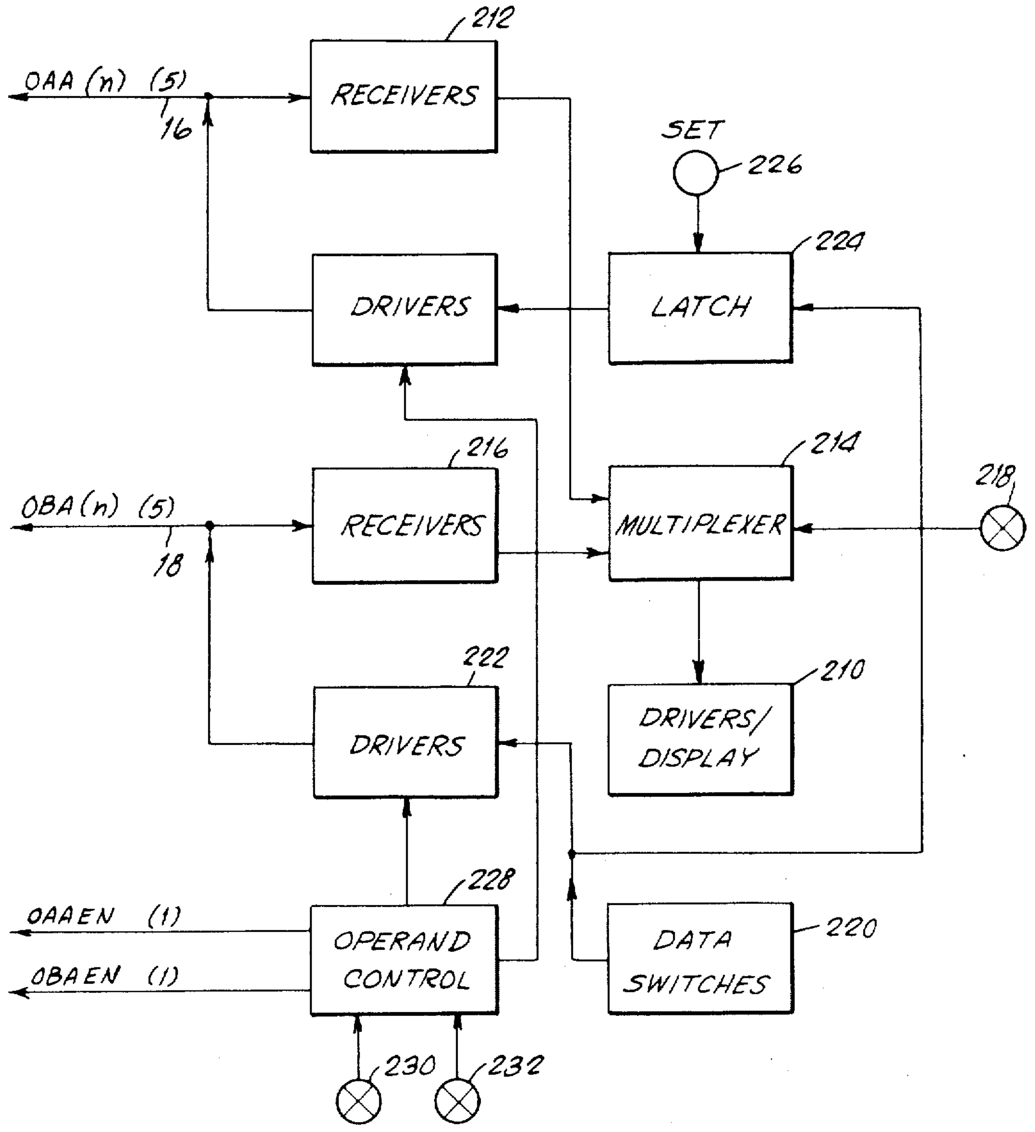

Referring to FIG. 20, the operand address buses 16 and 18 can be displayed or selectively loaded. For displaying the contents of the address A and B buses 16 and 18, the five-bit numbers appearing on each of the buses 16 and 18 go through receivers 212 and 216 respectively and are applied as the two inputs of a multiplexer selector 214 which is under the control of a manual switch 218. Depending on the state of the manual switch 218, the multiplexer selector 214 passes to a display unit 210 either the A-address date from the bus 16 or the B-address data from the bus 18. The display 210 is a conventional 5-stage display showing the states of the bits applied to it. To load the operand A or the operand B buses 16 and 18, the data switches 220 (five manual switches) are set to the desired number and the output of the switches 220 is applied to the operand B address bus 18 through drivers 222 and is also applied to a latch unit 224 which is under the control of a manual switch 226. The latch unit 224 is loaded with the state of the data switches 220 when the set switch 226 is manually set to loading position. An operand control unit 228 is in turn controlled by a manual load switch 230 and a load selector switch 232.

To load in a number on the operand A address bus 16, the number is set on the data switches 220, the set which 226 is set to latch that number in the latch unit 224, the load switch 230 is set to loading position, and the load selector switch 232 is set to select loading the operand A address bus 16. The number on the data switches 220 is then loaded on the operand A address bus 18. To load the operand B address bus 16, the load switch 230 is set to load, the load selector switch 232 is set to select the operand B address bus 18, and the number on the data switch 22 is then placed on the operand B address bus 18 through the drivers 220. The operand control unit 222 issues a control signal labelled OAAEN to enable the operand A bus 16, and a control signal labelled OBAEN to enable the operand B bus 18.

Figure 21:
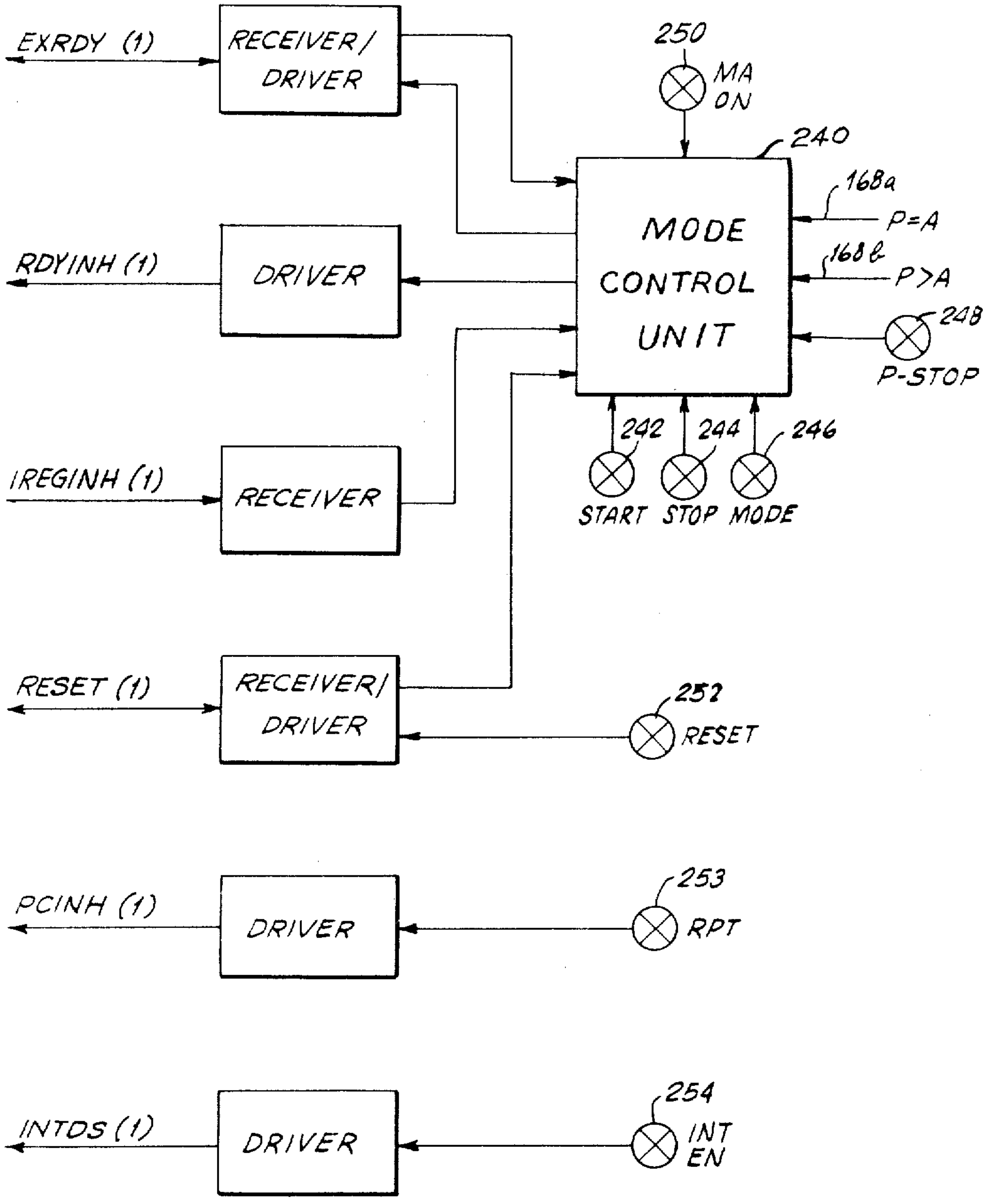

FIG. 21 shows the major control signals associated with the maintenance panel 48. These control signals are as follows: EXRDY which is used to initiate a microprocessor cycle; RDYINH which inhibits the start of a new microprocessor cycle; IREGINH issued by the extended processor 32 to prevent the instruction register 58 from being updated, and indicating that a memory reference instruction is being executed; RESET which resets the microprocessors; PCINH which inhibits the program counter from updating; and INTDS which controls the recognition of an external interrupt condition. The control signals RESET, PCINH, and INTDS are issued under the control of manual switches 252, 253 and 254, respectively. The remaining control signals are issued under the control of a mode control unit 240 which in turn is controlled by manual switches 242, 244, 246 and 248, and by the control signals **168*a* and 168*b* from the P-stop circuit shown in FIG. 18. An additional manual switch 250 turns on the maintenance unit 48. The switches 242 and 244 are used to start and stop the microprocessors respectively; the mode switch 246 is used to select one of the following three modes; sequence step, instruction step and run; and the P-stop switch 248 is used to cause program stop operation. The run mode permits instruction execution to be performed without intervention from the maintenance panel 48. In the run mode, instruction execution commences when the start switch 242 is depressed, and continues until the stop switch 244 is depressed, or the selected P-stop condition is detected. The instruction step mode permits a single instruction to be executed every time the start switch 240 is depressed. The sequence step mode permits a complete cycle of the basic microprocessor 10 to be performed every time the start switch 242 is depressed. This may consist of the execution of a portion of an instruction of the extended microprocessor (or the execution of a complete basic microprocessor instruction). A control signal IREGINH may be received by the maintenance panel 48** to indicate that memory reference instruction is being executed.

The program stop capability allows stop instruction execution when a predetermined state of the memory address bus 24 is detected. A three-position switch 248 (FIG. 21) disables the program stop circuitry, or selects either of the two stop conditions, i.e., selects either of the two lines **168*a* or 168*b***. The two stop conditions are (1) address bus state equal to a selected address, and (2) address bus state equal to or greater than a selected address.

Another novel aspect of the disclosed system relates to allowing a mix of memories without any modifications of the microprocessor part of the system and without any modifications in the general system architecture. Still another novel aspect relates to the so-called jump-continue capability of the disclosed system.

Figure 22:
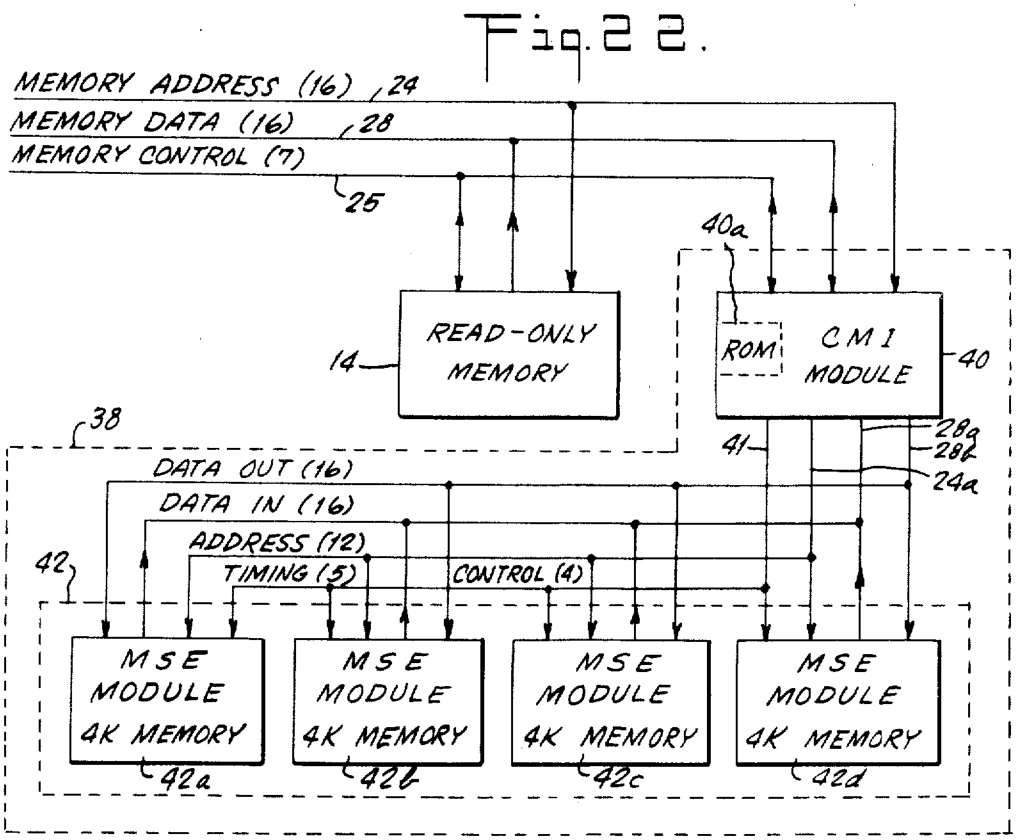
FIG. 22 is a block diagram of the memory portion of the system illustrated in FIG. 1.
Figure 23:
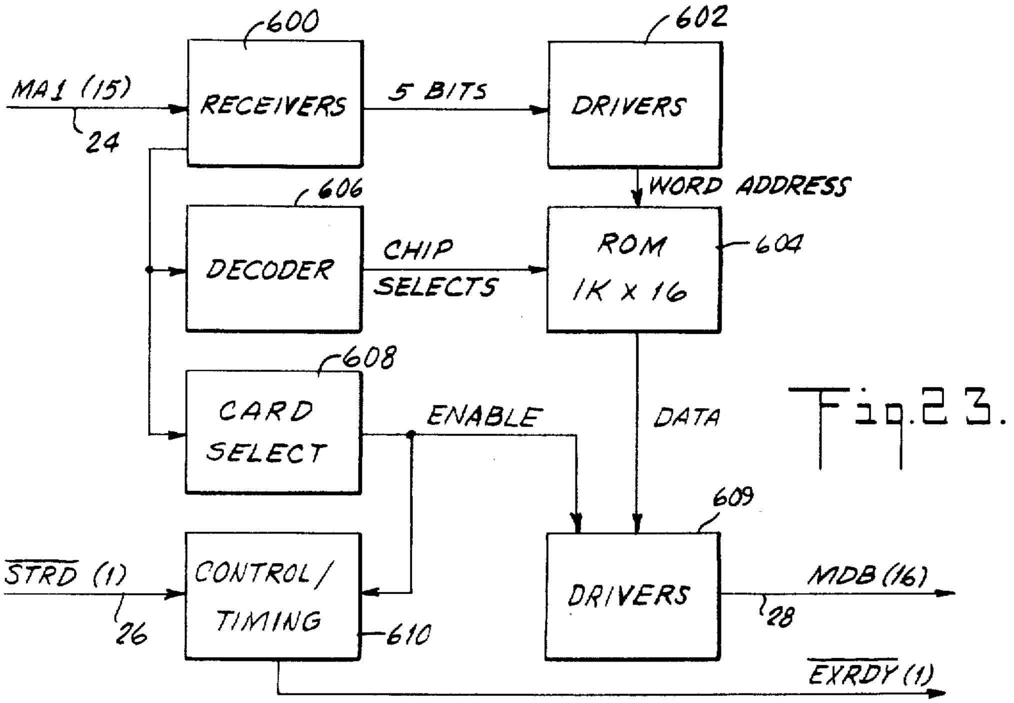
FIGS. 23 and 24 are more detailed block diagrams of portions of the memory shown in FIG. 22.

Referring to FIG. 22, the read only memory 14 communicates with the memory address bus 24, with the memory data bus 28, and with the memory control bus 25 as indicated, and the core interface 40 communicates with the same three buses. In turn, the core interface 40 communicates with each of a number of core stacks 42*a*, 42*b*, 42*c*, etc., by means of a data-in bus 28*a*, a data-out bus 28*b*, an address bus 24*a*, and by means of a timing and control bus 41. The core interface 40 and the core stacks 42*a*, 42*b*, 42*c*, etc., together comprise the read-write memory 38. The core memory interface 40 may include a small amount of read only memory 40*a*, such as 256 words of read only memory, the purpose of which is explained further below in this specification. Referring to FIG. 22 and the read only memory 14, the 15 bits on the memory address bus 24 pass through a set of receivers 600 which serve as isolating gates, and the low five bits (bits 1–5) from the receivers 600 are applied, through drivers 602, to a read only memory stack 604 to select one out of 32 eight-bit words within all memory chips. The upper 10 bits from the receivers 600 go through a decoder 606 the outputs of which are used to select a particular pair of 64 memory chips forming the memory stack 604. The high 7 bits from the receivers 600 are also applied to a card select circuit 608 which issues a control signal to drivers 609 to enable the drivers for the memory chip from which the address word is to be read to place the addressed word on the memory data bus 28. The signal from the card select circuit 608 is also applied to a control and timing circuit 610 that also receive the STRD control signal which is a command to the memory 14 to read out an addressed word. The control and timing circuit 610 ends the control signal STRD and the signal from the card select circuit 608 and issues, when both inputs are present, an output control signal which is the EXRDY control signal indicating that the data of the addressed word in the read only memory 14 is available on the memory data bus 28. It is noted that the EXRDY signal is issued only after the time delay necessary for the addressed word to be available on the memory data bus 28.

Figure 24:
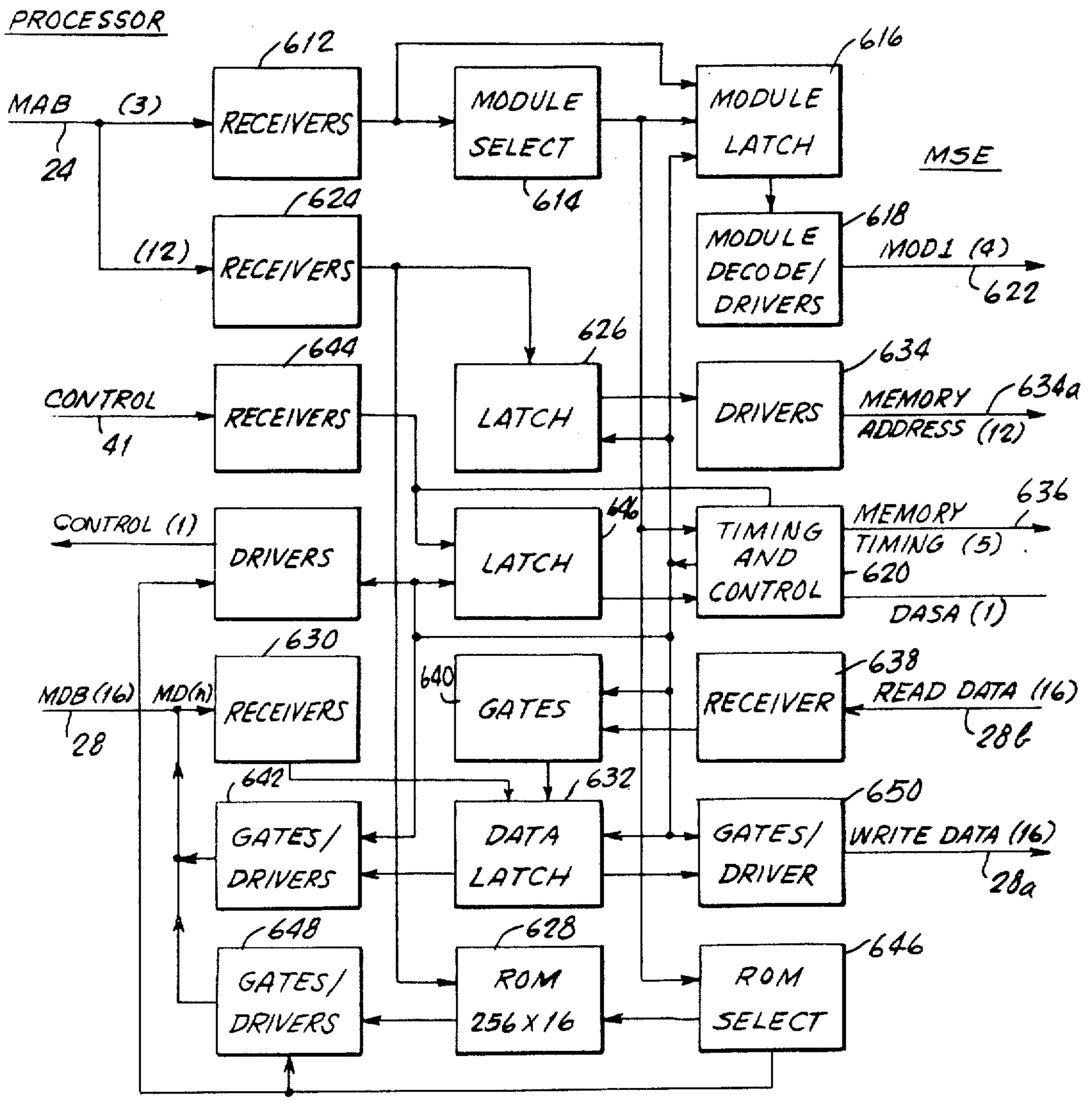

The core interface 40 is shown in greater detail in FIG. 24, where the connections between the processor system and the core interface are on the left-hand side of the drawing and the connections between the core interface 40 and the core stack 42 are on the right-hand side of the drawing. Referring to FIG. 24, the address of a word in the read-write memory 38 is specified by the high 15 bits on the memory address bus 24. The top 3 bits are applied, through receivers 612 serving as isolating gates, to a module select circuit 614 to select one of up to eight possible core stacks, each of which has 4,000 words capacity, where each word is 16 bits. The high 3 bits of the memory address from the module select circuit 614 are latched into a module latch 616, and are subsequently transferred to a module decode drivers 618 which, under the control of a control signal from a timing and control circuit 620 suitably activate the core stack select bus 622 to select the 4,096 word core memory stack specified by the top three bits of the memory address on the memory address bus 24. Bits 1 through 12 of the memory address on the memory address bus 24 are used to specify which of the 4,096 words on the selected core memory stack is addressed. These 12 bits pass through receivers 624 and are latched in a latch 626, and are also applied to a small read-only memory section 628. The 16-bit memory data bus 28 communicates with receivers 630 whose output is applied to a data latch 632. The following nine control signals appear on separate control lines of the control bus 41: MAO; CWB; STRD; STWT; MEMDS; JUMP*; DMAR; DMAO; and RESET.

For reading out data from the core memory stacks 42, the address of the word which is to be read out is specified by the address on the memory address bus 24. The top three bits of this memory address activate one of the four lines 622 to select one of the four core stacks 42 shown in FIG. 22. Bits 1 through 12 of the memory address on the address bus 24 are latched into the latch 626 and are applied therefrom to drivers 634 whose output is a 12-bit memory address placed on the bus 634*a* and identifying the selected one of the 4,096 words on the core stack 42 selected by one of the lines 622. Memory timing is generated from the timing and control circuit 620 and is applied to the core stacks through a 5-bit control bus 636. The word from the core stack which is selected by the lines 622 and by the bus 634*a* appears on the read-data bus 28*b*, passes through receivers 638 which serve as isolators, and through gates 640 which are under the control of the timing and control circuit 620, and is latched into the data latch 632. Again under the control of the timing and control circuit 620, the contents of the data latch 632 are applied to the memory data bus 28 through gates drivers 642 which are also under the control of the timing and control circuit 620. Reading from the memory stacks 42 is initiated by a control signal STRD appearing on the control bus 41 and applied, through receivers 644, to a latch 646 and to the timing and control circuit 620, which also receives the output of the latch 646.

For reading out of the small read-only memory section 628 (FIG. 24), the read only memory select unit 646 receives the top three bits of the address on the memory address bus 24. When these three bits indicate that the read only memory 628 is to be accessed, the select unit 646 causes the read only memory 628 to be addressed by the low 12 bits of the memory address output from the receivers 624, and to read out the contents of the addressed 16-bit word through the gates-drivers 648, which are in turn under the control of the read-only memory select unit 646, onto the memory data bus 28.

For writing a word into the memory stacks 42, the control signal applied to the control bus 41 is the STWT control signal to indicate a write-in operation. The address of the memory location into which a word is to be written appears on the memory address bus 24, and the word which is to be written in appears on the memory data bus 28. As described in connection with the readout operation, the address on the memory address and the word on the memory data bus 28 is transferred through the receivers 630 into the data latch 632, and from the data latch 632 through the gates-drivers 650 onto the write data bus 28a, and to the selected word location in the selected memory stack 42.

In order to increase effective processing speed, the disclosed system includes circuitry allowing acceptance of memory cycle initiate commands for the next memory cycle during the restore time of the present memory cycle. Provision is also made to reset this continue circuitry and to generate an external ready EXRDY control signal if the data to be read during the next requested memory cycle is not actually required, as in the case of satisfied conditional branch instructions.

Figure 25:
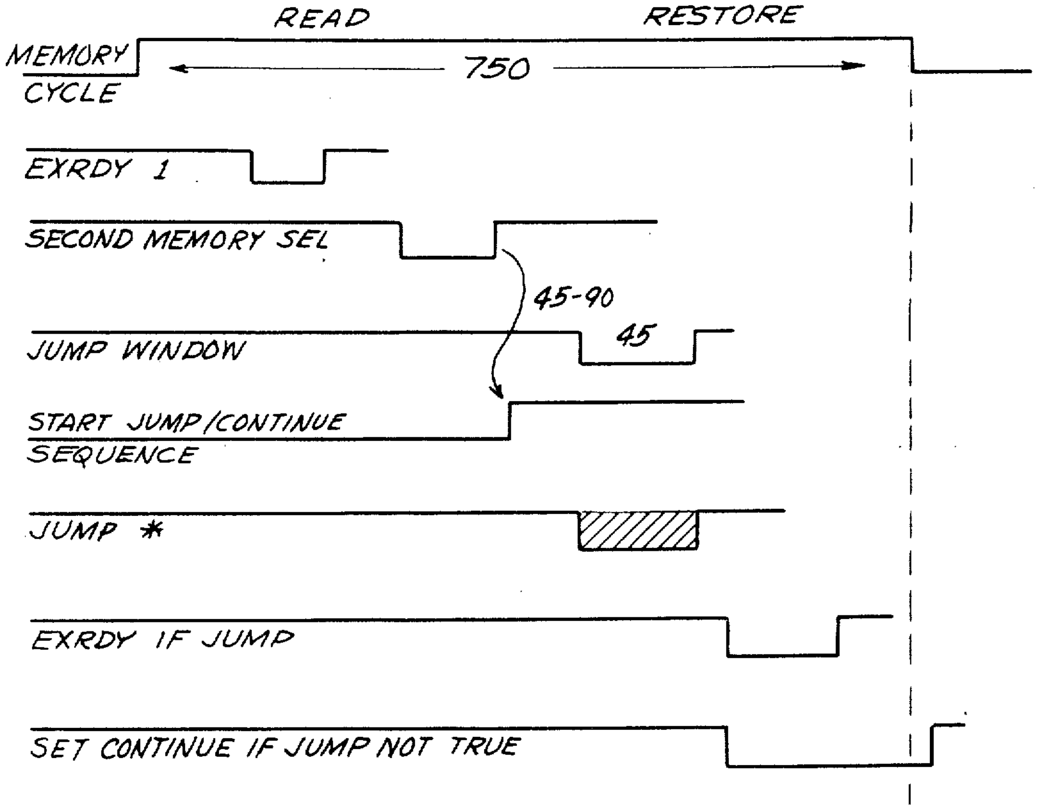
FIG. 25 is a timing chart of a jump-continue operation of the memory shown in FIG. 24.

Referring to the timing diagram of FIG. 25, the top curve which is labelled "memory cycle" shows an exemplary 750 nanoseconds memory cycle which is initiated by a STRD signal and is composed of a read part and a restore part. The curve labelled EXRDY 1 shows the signal which appears shortly after the start of the memory cycle to indicate that the requested data is available on the memory data bus 28. The curve labelled SECOND MEMORY SELECT shows a second STRD signal which appears, as discussed earlier, during the current memory cycle to initiate the next memory cycle. Shortly after the second memory cycle is initiated, a START JUMP-CONTINUE SEQUENCE signal appears, and shortly after that, a jump window is provided during which a JUMP* signal may appear to indicate that the condition in a conditional branch instruction which would result in a branch was true or a LPC Instruction is in progress. If the JUMP* control signal appears during the jump window, then a second EXRDY signal is allowed to issue to indicate that a dummy cycle of the basic microprocessor 10 should begin. If the JUMP* control signal does not appear (indicating that no jump is to be taken) the JUMP-CONTINUE SEQUENCE signal is set, and this prevents the second EXRDY signal from appearing. Thus, the next sequential memory location which contains the next instruction to be executed is called up during the next memory cycle which has been initiated by the aforementioned STRD signal.

Figure 26:
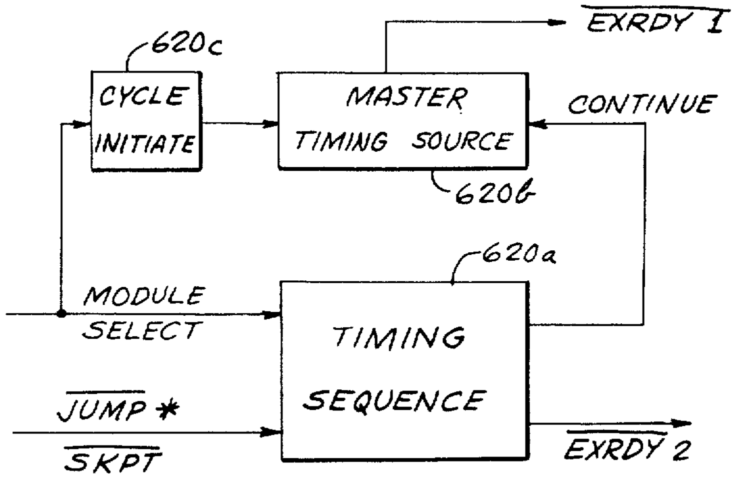
FIG. 26 is a more detailed block diagram of a portion of the memory shown in FIG. 24.

The control circuitry for the jump-continue capability is illustrated in FIG. 26. The circuitry in FIG. 26 is in fact a part of the timing and control circuit 620 shown in FIG. 24. A memory cycle is initiated from the cycle initiate circuitry 620*c* in FIG. 26, and this is applied to a master timing source 620b. A fixed time delay after the cycle initiate signal from the unit 620*c*, the master timing source 620*b* issues the EXRDY1 signal shown in the curve in FIG. 25 which is so labelled. Subsequently, the cycle initiate unit 620*c* issues the second memory select signal shown in FIG. 25 in response to either a STRD or STWT signal, which is again applied to the master timing source 620*b*. The timing sequence unit 620*a* in FIG. 26 issues thereafter the START JUMP-CONTINUE SEQUENCE signal shown in FIG. 25. Then, if a true JUMP* control signal is applied to the timing sequence unit 620*a* in FIG. 26 during the jump window shown in FIG. 25, the timing sequence unit 620*a* in FIG. 26 issues the EXRDY2 control signal to indicate that the data on the instruction to which a jump is made is available on the memory data bus 28. If a false JUMP* control signal appears instead to indicate that there shall be no jump because the condition for the jump is not satisfied, then the START JUMP-CONTINUE SEQUENCE signal is set, and the timing sequence unit 620*a* of FIG. 26 issues a control signal on the line labelled "CONTINUE" in FIG. 26 to allow reading out the instruction which immediately follows the instruction read out during the memory cycle initiated by the initial start-read signal.

The major control signals associated with the memories 14 and 38 are as follows:

STRD (start read): This signal initiates a read from memory. It is received by the read only memory 14, by the core interface 40, and by the direct memory access unit 11 (FIG. 1).

STRDINH (start read inhibit): This signal is used to inhibit the basic microprocessor 10 from issuing a STRD control signal, as for example during the execution of certain subcycles of memory reference instructions.

STWT (start-write): This signal is used to initiate a write into memory. The signal is issued by the extended microprocessor 32, by the maintenance panel 48, and by the direct memory access unit 11. It is received by the core interface 40 and by the direct memory access unit 11.

CWB (clear-write both): This signal is used by the extended microprocessor 32 and by the direct memory access unit 11 to select whether the memory write is a full word operation or a byte operation, with the half word being selected by a control signal MAO. The control signal CWB remains stable while the control signal STWT is active. The CWB control signal is initiated by the extended microprocessor 32, by the maintenance panel and by the direct memory access unit 11. It is received by the core interface 40 and by the direct memory access unit 11.

MEMDS (memory disable): This signal inhibits the memory from driving the memory data buses. It may be used to free the memory data buses prior to a start write request. The signal is initiated by the extended microprocessor 32, by the maintenance panel 48 or by the direct memory access unit 11. It is received by the read only memory 14 and by the core interface 40.

DMAO: This signal indicates that a direct memory access operation is in progress. It inhibits the extended microprocessor 32 from driving the memory address and memory data buses 24 and 28 and disables the jump continue feature of the memory 38. It is initiated by the direct memory access unit 11 and is received by the extended microprocessor 32 and by the core interface 40.

DMAR (direct memory access request): This signal is used to inhibit initiation of a memory cycle during transfer of control from the processor 32 to the direct memory access unit 11. It allows the direct memory access unit 11 to sense the memory control signals to determine how to transfer control back to the processor 32 at the start of the direct memory access operation. The signal is initiated at the end of the direct memory access operation. The signal is initiated by the direct memory access 11 and is received by the core interface 40 and processor 32.

IAEN (instruction address enable): This signal enables the basic microprocessor 10 to drive the memory address bus 24. It is false during direct memory access operations, portions of memory reference instruction executions, and during memory operations from the maintenance panel 48. The signal is initiated by the extended microprocessor 32, by the maintenance panel 48 and by the direct memory access unit 11. It is received by the basic microprocessor 10.

JUMP*: This signal is true when a nonmemory reference program branch is being executed (either a load program counter instruction, or a satisfied branch instruction). These non-memory reference program branch instructions require two cycles of the basic microprocessor 10, the second of which is essentially a dummy cycle during which the program counter is updated and the new memory location is read. The contents of the memory data bus 28 at the beginning of this second cycle are ignored. The restore portion of the core member cycle is long enough to allow execution of both cycles of the basic microprocessor 10. Thus, to avoid initiating a dummy core memory cycle, the core interface contains the jump continue circuitry discussed in connection with FIGS. 24 and 25 which generates an EXRDY control signal when this JUMP* control signal is true. The JUMP* control signal is also used by the extended microprocessor 32 to indicate that a dummy basic microprocessor cycle is in progress and the memory data should be ignored. In a microprocessor system including only the basic microprocessor 10, registers 12 and the read-only memory 14, a SKPT control signal is internally ORed by means of a jumper with the JUMP* generating circuitry to avoid a dummy memory cycle as above. This is not done in a system including the extended microprocessor 32, since the instruction which is being skipped may be a two-word instruction. Thus, the next instruction in sequence is called to determine how many memory locations to skip. The control signal JUMP* is initiated by the basic microprocessor 10 and is received by the extended microprocessor 32, by the core interface 40, and by the direct memory access unit 11.

SKPT: This signal is used to indicate that the upcoming instruction should be skipped. In a basic microprocessor system, it is internally ored with the JUMP* generator as discussed immediately above. SKPT is initiated by the basic microprocessor 10 and by the extended microprocessor 32, and is received by the basic microprocessor 10, by the extended microprocessor 32, and by the direct memory access unit 11.

A number of control signals are associated with the operand A and B address buses 16 and 18, with the operand A and B data buses 20 and 22, and with the result bus 15. These are:

OAAEN (operand A address enable): This signal enables the basic microprocessor 10 to drive the operand A address bus 16. It is initiated by the extended microprocessor 32 and by the maintenance panel 48, and is received by the basic microprocessor 10.

OBAEN (operand B address enable): This signal enables the basic microprocessor 10 to drive the operand B address bus 18. It is initiated by the extended microprocessor 32 and by the maintenance panel 48, and is received by the basic microprocessor 10.

OBDEN (operand B data enable): This signal enables the registers 12 to drive the operand B data bus 22. It is initiated by the extended microprocessor 32 and by the maintenance panel 48, and is received by the basix micro-processor 10 by the extended microprocessor 32 and by any other portion of the system which may contain registers serving as registers 12.

WTR (write register): This signal is used by the processors 10 and 32 and by the maintenance panel 48 to cause the data appearing on the result data bus 15 to be written into the register addressed on the operance B address bus 18. The WTR control signal is initiated by the basic microprocessor and by the maintenance panel 48 and is received by the basic microprocessor 10, by the extended microprocessor 32, and by any other part of the system which may contain registers 12.

WTRINH (write register inhibit): This signal inhibits the basic microprocessor 10 from issuing a WTR control signal. It is initiated by the extended microprocessor 32 and is received by the basic microprocessor 10.

Additional signals associated with the system illustrated in FIG. 1 are as follows:

EXPC (external program count): This signal is used to externally clock the program counter 62 (FIG. 2). On the leading edge of this control signal, the program counter 62 increments, or if the control signal EXLD is true, it loads the operand A data into the lower 8 bits and the operand B data into the upper 8 bits of the program counter 62, except that bit 0 is not loaded. Additionally, the program counter 62 is not incremented if a control signal PCINH is true. The signal EXPC is initiated by the maintenance panel 48 and is received by the basic microprocessor 10.

PCINH (program counter inhibit): This signal prevents the program counter 62 from incrementing. It does not inhibit program counter loading. PCINH is initiated by the extended microprocessor 32 and by the maintenance panel 48 and is received by the basic microprocessor 10.

EXLD (external load): This signal causes the program counter 62 to be loaded upon its next clock pulse with the operand A data in the lower 8 bits and with the operand B data into the upper 8 bits, except that bit 0 is not loaded. EXLD is initiated by the extended microprocessor 32 or by the maintenance panel 48 and is received by the basic microprocessor 10.

CO (carry out): This signal represents the carry out data from the arithmetic logic unit 50. It is initiated by the basic microprocessor 10 and is received by the extended microprocessor 32.

EXCN (external carry in): This signal is true except during a memory reference instruction execution when it is used to control the carry into the arithmetic logic unit 50. It is initiated by the extended microprocessor 32 and is received by the basic microprocessor 10.

INT (interrupt): This signal causes the extended microprocessor 32 to transfer instruction addressing to the auxiliary program counter 98 (FIG. 3). This signal is initiated in case of interrupt execution and is received by the extended microprocessor 32.

INTEN (interrupt enable): This signal allows the INT signal to be recognized by the extended microprocessor 32. The signal is initiated by the basic microprocessor 10 and by the maintenance panel 48, and is received by the extended microprocessor 32.

EX1 (external 1): This signal is used as a data input to bit 6 of the designator register. It is initiated by an external device and is received by the basic microprocessor 10.

IREGINH (instruction register inhibit): This signal is used to prevent the instruction register 58 (FIG. 2) from being updated, and also to indicate that a memory reference instruction is being executed. It is initiated by the extended microprocessor 32 and is received by the basic microprocessor 10, and maintenance panel 48.

RESINH (result data bus inhibit): This signal inhibits the basic microprocessor 10 from driving the result data bus 15. It is initiated by the maintenance panel 48 and is received by the basic microprocessor 10.

EXRDY (external ready): This signal initiates a new processor cycle. It is initiated by the memory 14 of the memory 38, or the maintenance panel 48 and is received by the basic and extended microprocessors 10 and 32.

EXRDY 2 (external ready 2): This signal initiates only a basic microprocessor 10 cycle. It is received by the basic microprocessor 10.

RDYINH (ready inhibit): This signal inhibits the start of a new processor cycle. It is initiated by the extended microprocessor 32 by the maintenance panel 48 and by the direct memory access unit 11 and is received by the basic and extended microprocessors 10 and 32.

RDYINH2 (ready inhibit 2): This signal inhibits the start only of a cycle of the basic microprocessor 10. It is initiated by the extended microprocessor 32 and received by the basic microprocessor 10.

EXSYN (external sync): This signal marks the end of a cycle of the basic microprocessor 10. It is initiated by the basic microprocessor 10.

RESET: This signal initiates the processor circuitry and inhibits processor cycling. If the control signal INTEN is true when RESET is true, the processor 32 is placed in the interrupt state, ready to fetch the first interrupt instruction; otherwise the processor 32 is ready to fetch instruction 0000. It is initiated by the maintenance panel 48 or by means of an external interrupt and is received by the core interface 40, by the basic and extended microprocessors 10 and 32 and by the direct memory access unit 11.

The relative timing between the major control signal discussed above during processor start up and during basic operations of the processors is as follows. Processor start up is initiated by the occurrence of a STRD signal. After the RESET signal, the memory address is either 0000 or the first interrupt instruction address. Thus, the STRD control signal calls the appropriate instruction from memory, and memory generates an EXRDY signal which starts the processor. If the memory which is addressed is the read only memory 14, the memory data is valid without a STRD signal, and the processor may be started by either a STRD or an EXRDY signal. Thus, in a system which includes only the basic microprocessor 10, without core memory, the processor is started either by a STRD signal, or by an EXRDY, or by an EXRDY2 signal.

A cycle of the basic microprocessor 10 consists of the instruction execution, a parallel instruction fetch, and an overlapping write into register. The operations with respect to memory are asynchronous, with each memory having its own internal timing. However, if a particular memory is sufficiently fast to keep ahead of the processor cycling, back to back processor cycles are allowed, and there is no need for explicit external memory cycle timing.

Figure 27A:
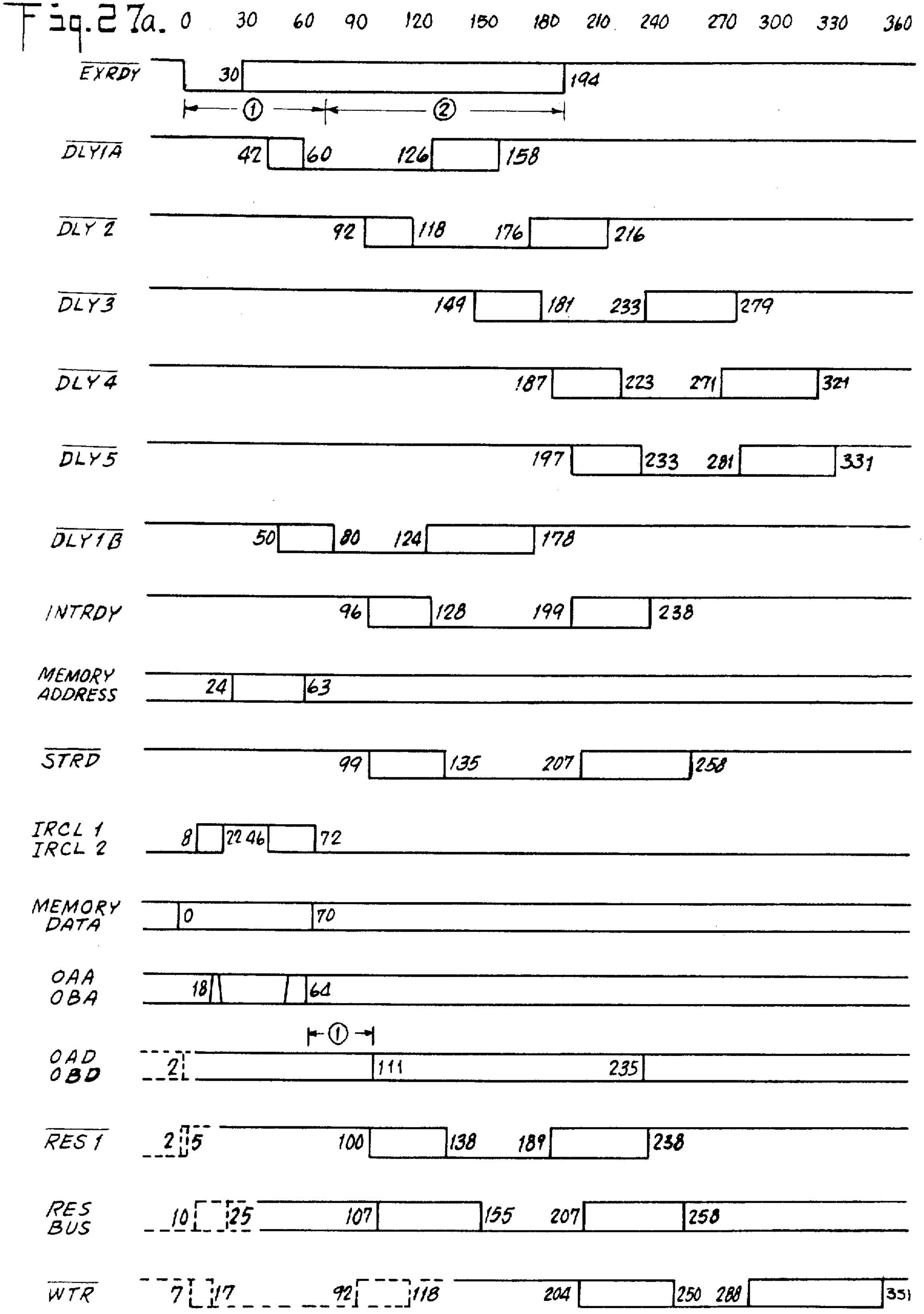
FIGS. 27a–27g are timing charts of certain control signals of the system shown in FIG. 1.

Instruction execution is pipeline timed, with five major timing marks from which the internal timing is derived. These timing marks are shown in FIG. 27*a* and are identified by the sumbols DLY1A, DLY2, DLY3, DLY4 and DLY5. The timing marks are generated from a device such as a conventional delay line, and timing is initiated by an EXRDY control signal in conjunction with an INTRDY control signal which is set by the timing mark DLY5. The timing diagrams of FIGS. 27*a* - 27*g* are marked in arbitrary time units which may be nanoseconds, or may be some arbitrarily selected time units.

Referring to FIG. 27*a*, to guarantee proper cycle start for the basic microprocessor 10, the EXRDY control signal is true for a defined period of time, such as 30 units of time. Further cycle starts are inhibited by the true state of the signal DLY1A or by the false state of the signal INTRDY. Thus, during the period marked 1 in FIG. 27*a*, a false to true transition of of EXRDY is prohibited. During period 2, EXRDY is irrelevent except that is must be false at the end of period 2 to guarantee that another cycle is not started. If back-to-back cycles are desired, EXRDY may remain true (no transitions from true to false are necessary). Back-to-back cycles in this matter can occur in a cycle time of 197–233 units of time. Cycle timing with respect to DLY5 is the same as shown with respect to EXRDY (INTRDY follows DLY 5 by 2–5 units of time). There are two requirements on the memory data signals. The memory data must be valid at or before the corresponding EXRDY signal, and it must remain valid for a minimum period of time, for example 70 units of time, after the leading edge of the EXRDY signal.

Referring to FIG. 27*a*, the signals labeled IRCL1 and IRCL2 are the clock signals for the memory data buffer latches shown in FIG. 24. As shown in FIG. 27*a*, the minimum time from the memory address buses being valid to start of the next cycle is 146 units of time. Thus, if a memory has an access time faster than that exemplary 146 units of time, the memory may initiate the next EXRDY at any point during period 2 shown in FIG. 27*a*, or the memory may generate EXRDY by repeating the STRD signal with the trailing edge delayed appropriately (EXRDY must remain true for a minimum of 30 units of time after the start of the cycle).

After a cycle starts, there is a certain time period until the operand address buses are valid, such as for example, a time period of 64 units of time. Operand data is needed at a certain time from cycle start, such as for example 111 units of time. The data must remain valid until the results of the instruction execution are suitably stored (which is initiated by the RESI control signal going false) (see FIG. 27*a*). The WTR signal shown in FIG. 27*a* may go true up to a certain period of time, such as 18 units of time, before the result bus is valid, but there is a minimum period, such as 67 units of time, during which the result bus is valid and WTR is true. The result bus signal shown in FIG. 27*a* remains valid until a minimum time period, such as 107 time units, after the next cycle is initiated. If back-to-back cycles are being run, the write register portion of the cycle overlaps with the beginning of the next cycle as shown in FIG. 27*a*. Data being written into the register must be available to the operand bus by a certain period of time, such as 111 units of time, into that next cycle.

Figure 27B:
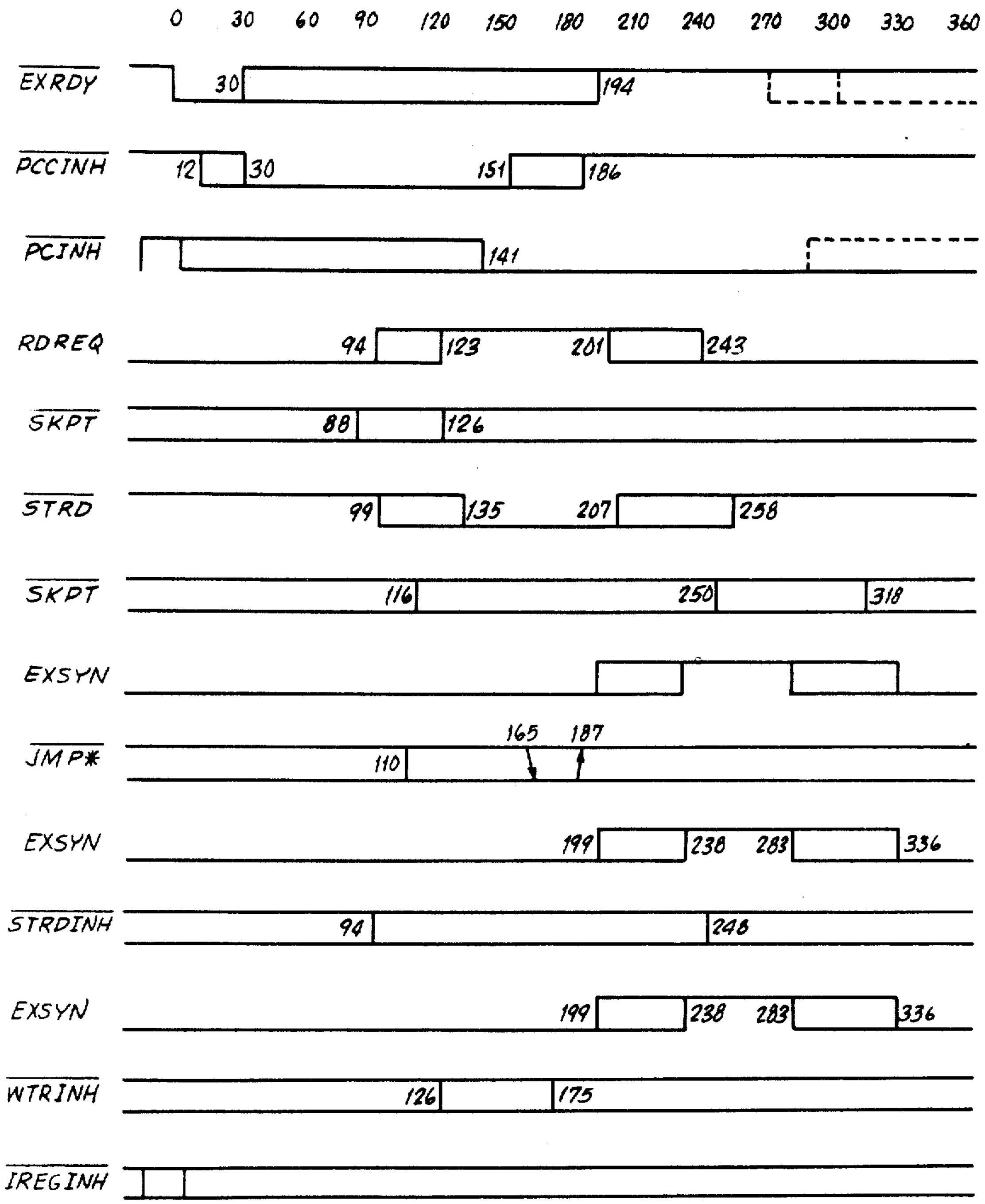

Referring to FIG. 27*b*, the control signal PCINH, which is a control signal to the program counter 62 is recognized only if the clock input to the counter is or was true at some time during the period that the signal PCINH is true. For example, if the processor is stopped (and thus the clock to the counter is false) when PCINH transitions from false to true, the PCINH inhibit will not be recognized until after the clock next transitions to true. Thus, in the case, the PCINH will not be effective with regard to the immediately following clock pulse, but will be effective on the second clock pulse and also on further pulses if PCINH remains true. It is noted that PCINH does not inhibit loading of the program counter, it only inhibits incrementing. In contrast, a true-to-false transition of the inhibit siganl PCINH is recognized independently of the state of the clock. Since the clock pulse to the program counter is very short, and internal inhibit (PCCINH) is set at the beginning of each cycle (when the clock is high) and is not released until near the end of the cycle. If PCINH goes true any time before the internal signal is released, it will be recognized. PCINH must remain true until a minimum period of time, for example, 17 units of time, after the start of the next cycle, to guarantee the program counter inhibit. If PCINH is true and has been recognized, but it is not desired to inhibit program counter on the next cycle, PCINH must go false a minimum period of time, such as 30 units of time, before the next cycle starts and must remain a minimum period of time, such as 32 units of time.

Figure 27C:
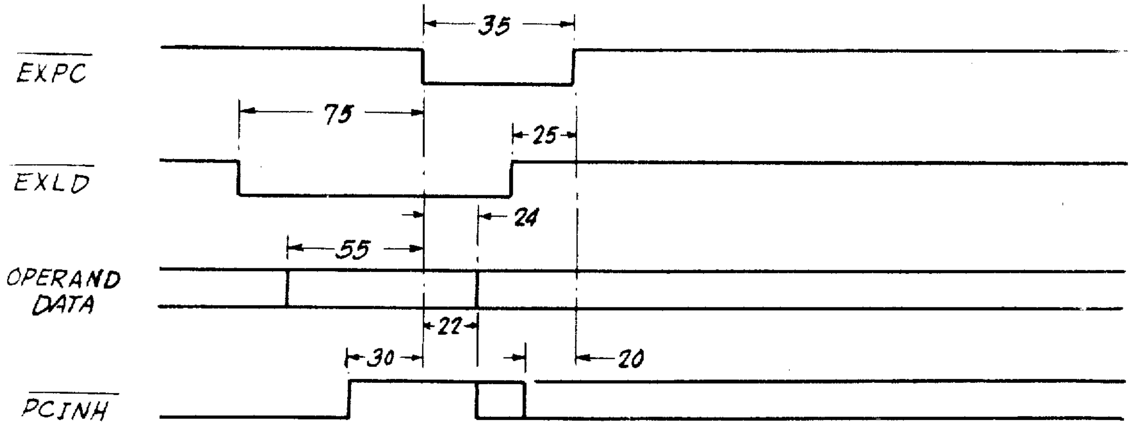

To increment the program counter 62, the control signal EXPC shown in FIG. 27*c* may be pulsed while PCINH is false. If loading the program counter is desired, the control signal EXLD (FIG. 27*c*) is true as shown. EXLD is never true unless a load is desired. An erroneous transition of EXLD from false-to-true and back to false may cause a program counter error at the next clock. PCINH need not be false to load the program counter. For PCINH to be recognized as true after an EXPC pulse, it must be true for a minimum period of time, such as 20 time units, prior to EXPC going false.

Figure 27D:
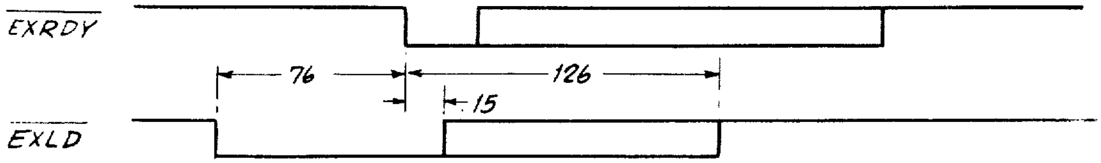

Referring to FIG. 27*d*, a control signal EXLD may be used to cause the program counter to load instead of increment during a normal cycle execution of the basic microprocessor 10. This may be used in conjunction with the extended microprocessor 32.

Referring back to FIG. 27*b*, the control signal SKPT is an input to the basic microprocessor 10. If it is desired to have the basic microprocessor 10 execute a dummy cycle (WTR, jumps and skips are inhibited) the control signal SKPT is held true during the period 1 indicated in FIG. 27*b* so that is is latched by an internal storage device such as a flip-flop clocked at the false to true transition of the control signal RDREQ, shown in FIG. 27*b*. If a dummy cycle is not desired, SKPT must be closed during period 1 shown in FIG. 27*b*. If the immediately preceding cycle executed the first half of a satisfied branch or load program counter instruction, the jump cannot be inhibited by the SKPT control signal. In fact, the internal skip associated circuitry will already be set.

When SKPT is an output from the basic microprocessor 10, if the instruction being executed in the present cycle is a satisfied skip instruction, the SKPT signal is true a maximum period of time, such as 37 units of time, after the STRD signal from the present cycle transitions back to false; otherwise, the SKPT signal is false at that time. The SKPT signal remains valid until a minimum period of time, such as 114 units of time, after the start of the next cycle. If back-to-back cycles are being executed, the desired period is a minimum period of time, such as 69 units of time long.

Still referring to FIG. 27*b*, the JUMP* control signal is valid at a maximum period of time, such as 187 units of time, after the start of the cycle, and remains valid until a minimum period of time, such as 110 units of time, into the next cycle. If JUMP* is true, it is valid at a certain period of time, such as 165 units, after cycle start.

Still referring to FIG. 27b, the STRDINH control signal is valid at or before the start of the cycle plus a period of time, such as 94 units of time, and must remain valid until EXSYN plus a period of time such as 8 units or another period of time such as 8 units or another period of time such as 243 time units after cycle start, whichever occurs first.

Still referring to FIG. 27*b*, the control signal WTRINH prevents the basic microprocessor 10 from issuing a WTR signal. This WTRINH signal is sampled and matched during a certain period, such as the period of 126–175 units of time after the start of the cycle. Additionally, the control signal IREGIH is sampled and latched during a certain period of time, such as from 9 units preceding EXRDY to 6 units after EXRDY.

Figure 27E:
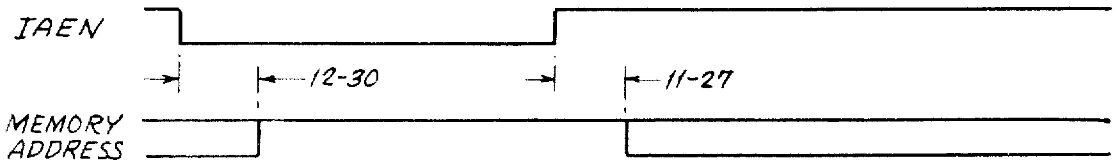

Referring to FIG. 27*e*, when the control signal IAEN is true, the address bus drivers of the basic microprocessor 10 are enabled. When the control signal IAEN is false, these drivers are disabled to allow another unit to control the memory address. This other unit may for example be the maintenance panel 48.

Figure 27F:
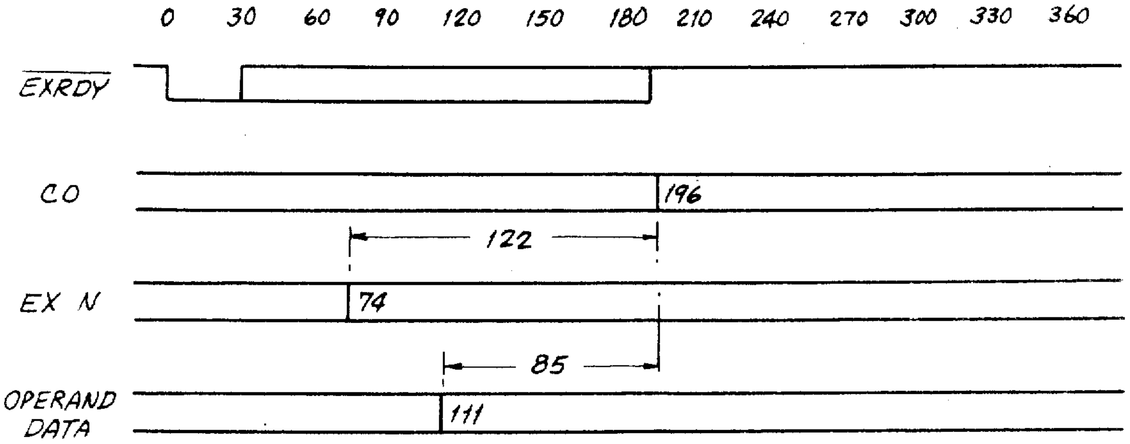

Referring to FIG. 27*f*, the control signal CO is valid at a maximum period of time such as 196 units of time after cycle start, assuming the control signal EXCN and the operand data are valid as shown, and remains valid until either the operand data, the instruction register 48, or EXCN change. EXCN is high during all instruction executions of the basic microprocessor 10. It may be used to control the carry in to the arithmetic unit 50 of the basic microprocessor 10 during execution of subcycles of the extended microprocessor 32. Still referring to FIG. 27*f*, bit 6 of the designator register (register 13) is loaded with the data from the EX1 bus at the end of each cycle of the basic microprocessor 10 unless register 13 is addressed on the operand B address bus by the instruction just executed and that instruction is not a branch, loaded into bit 6 of the designator register 13, the signal EX1 whown in FIG. 27*d* must be valid during period 1 labeled on FIG. 27*b*. If EX1 changes during that period, either a 0 or a 1 may be loaded into bit 6.

Figure 27G:
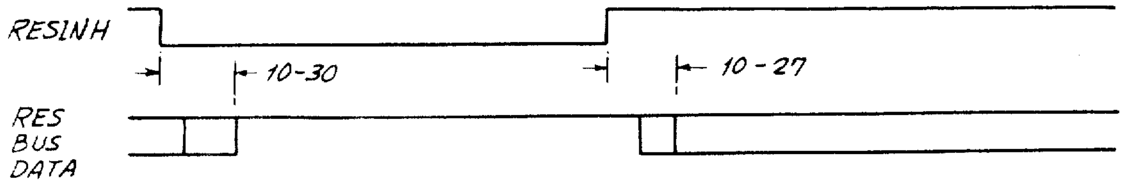

Referring to FIG. 27*g*, the control signal RESINH is used with consideration of the timing as shown, where the units of time may be nanoseconds or arbitrary units of time.

Interrupts are handled in the disclosed system by sampling an INT control signal at the beginning of each cycle of the basic microprocessor 10 which is not a subcycle of a memory reference instruction of the extended microprocessor 32 (note that the cycle during which a memory reference instruction is initially loaded into the instruction counter 58 is considered a subcycle of a memory reference instruction). If the control signal INT, and another control signal INTEN are true at the beginning of a cycle of the basic microprocessor 10, the control signals RDYINH, RDYINH 2, and PCINH which have been discussed earlier transition to the true state. The cycle which has started is executed normally, the program counter 62 is incremented, and the next sequential instruction is called. At the end of the cycle, the control signal SKPT is sampled on the false to true transition of an internal timing signal which is initiated in response to the control signal EXSYN. At this point, the processor is in a stop condition due to the inhibit signal RDYINH. Since the next sequential instruction has been called, an EXRDY control signal is due from memory. To avoid unknown conditions, another internal timing signal is triggered to time out the period during which the control signal EXRDY is expected. The desired timing is dependent on the access time of the particular memory which is used and may, for example, be about 500ns.

If the control signal SKPT is true when sampled, the control signal PCINH returns to the false state, the attempt to interrupt is abandoned, and upon the return of the last mentioned internal timing signal to the true state, the processor is restarted by an internally generated EXRDY signal for normal execution of the SKPT instruction. This procedure can be tried again at the start of the next instruction.

If the SKPT signal is false when sampled, the contents of the first location addressed by the auxiliary program counter 98 (FIG. 3) are called. An EXRDY control signal is generated when the last mentioned internal timing signal transitions back to its true state. This is followed by the control signal IAEN going to its false state, the auxiliary program counter 98 is enabled, and the control signal SKPT is recognized as true by the extended microprocessor 32. This causes the basic microprocessor 10 to execute a dummy cycle used to delay the real start of the basic microprocessor 10 in order to allow time for the memory address bus 16 to be switched from the main program counter 62 to the auxiliary program counter 98. Normal processor operation takes place from this point on, with the auxiliary program counter 98 used to address instructions in memory. After the auxiliary program counter 98 addresses the necessary number of instructions in memory, control is returned to the main program counter 62. Interrupts from external devices are handled by connecting an external device to the back side of a selected register 12, which then becomes dedicated to that external device only.

What is claimed is:

1. Digital computer apparatus comprising a basic processor system including an addressable memory for storing instructions and for reading out selected stored instructions from addressed memory locations; a processor having an instruction register operative with said memory for receiving therefrom and for storing instructions, said processor including means for performing jump instructions in which a jump is taken from a current instruction to a nonsequential next instruction and including means for initiating the fetch from memory of the next sequential instruction while said processor determines if said current instruction is a jump instruction, and means for aborting the fetch of said next sequential instruction when said processor does respond to a jump instruction and for initiating the fetch from memory of said nonsequential next instruction.

2. The digital computer apparatus of claim 1 including a program counter operative to cause the memory to read out a new instruction during the execution of a current instruction, thereby providing for overlap between the execution of one instruction and the reading out of another instruction from the memory.

3. The digital computer apparatus of claim 2 including timing, control and decoding means for causing writing the result of a current instruction into a selected addressable register while decoding the operation code of another instruction, thereby providing for time overlap between the storing of the result of a current instruction and the decoding of the next instruction.

4. The digital computer apparatus of claim 1, with said memory having a cycle comprising a read part and a restore part, and with said means for aborting the fetch of the next sequential instruction being operative during the restore part of said cycle if the jump instruction is provided.

5. The digital computer apparatus of claim 1, with said memory having a cycle of operation comprising a read out part and a restore part, with said means for initiating the fetch from memory of the next sequential instruction being operative in relation to said read part of said cycle while the processor determines that a jump instruction has been provided, and with said means for aborting the fetch of the next sequential instruction being operative in relation to the restore part of said cycle when the jump instruction is provided.

6. The digital computer apparatus of claim 1, with said means for initiating the fetch from memory of the next sequential instruction being operative while said processor determines if the current instruction is a jump instruction, and with said means for aborting the fetch of said next sequential instruction being operative in relation to the normal operating cycle of the processor such that when a jump is not to be taken the accessing of the next sequential instruction takes place.

7. The digital computer apparatus of claim 1, including a program counter operative with the memory to read out a new instruction during the execution of the current instruction to reduce the time required for such operations.

8. The digital computer apparatus of claim 3, with said selected addressable register being specified by the current instruction while decoding the operation code and source register address of the next instruction thereby providing for time overlap between writing the result of a current instruction into said addressable register and the decoding of the next instruction.

* * * * *